United States Patent
Stabrawa et al.

(12) 
(10) Patent No.: US 12,554,524 B2
(45) Date of Patent: Feb. 17, 2026

(54) EXTERNAL MEMORY AS AN EXTENSION TO VIRTUALIZATION INSTANCE MEMORY

(71) Applicant: Kove IP, LLC, Chicago, IL (US)

(72) Inventors: Timothy A. Stabrawa, Lombard, IL (US); Andrew S. Poling, Lombard, IL (US); Darren Allen Bock, Evanston, IL (US); John Overton, Chicago, IL (US)

(73) Assignee: Kove IP, LLC, Chicago, IL (US)

( * ) Notice: Subject to any disclaimer, the term of this patent is extended or adjusted under 35 U.S.C. 154(b) by 718 days.

(21) Appl. No.: 17/859,389

(22) Filed: Jul. 7, 2022

(65) Prior Publication Data
US 2023/0008874 A1    Jan. 12, 2023

Related U.S. Application Data

(60) Provisional application No. 63/220,502, filed on Jul. 10, 2021.

(51) Int. Cl.
G06F 9/455    (2018.01)

(52) U.S. Cl.
CPC .. *G06F 9/45558* (2013.01); *G06F 2009/4557* (2013.01); *G06F 2009/45579* (2013.01); *G06F 2009/45583* (2013.01)

(58) Field of Classification Search
CPC ......... G06F 9/45558; G06F 2009/4557; G06F 2009/45579; G06F 2009/45583
See application file for complete search history.

(56) References Cited

U.S. PATENT DOCUMENTS

| | | | |
|---|---|---|---|
| 7,756,943 B1* | 7/2010 | Wong | G06F 9/544 709/212 |
| 9,921,771 B2* | 3/2018 | Stabrawa | G06F 3/067 |
| 2006/0090161 A1* | 4/2006 | Bodas | G06F 9/5044 718/100 |
| 2013/0339589 A1* | 12/2013 | Qawami | G11C 13/0004 711/103 |
| 2017/0147227 A1* | 5/2017 | Stabrawa | G06F 3/065 |
| 2019/0294340 A1* | 9/2019 | Stabrawa | G06F 3/067 |
| 2020/0174814 A1* | 6/2020 | Saxena | G06F 9/5077 |

* cited by examiner

*Primary Examiner* — Sean D Rossiter
(74) *Attorney, Agent, or Firm* — Crowell & Moring LLP

(57) ABSTRACT

Methods are provided comprising: mapping a portion of a local primary memory to an address space of a virtualization instance at a client device, wherein the address space is addressable by a processor of the client device, and wherein the virtualization instance is executed via the processor of the client device; mapping a first portion of external memory to the address space, wherein the external memory is memory that is external to the client device but treated as primary memory at the client device, and wherein a second portion of the external memory is not in any address space addressable by the processor of the client device; providing a performance indication data structure indicating a performance difference between the portion of the local primary memory mapped to the address space and the first portion of external memory mapped to the address space; and causing data to migrate between the external memory and the local primary memory based on the performance indication data structure by the virtualization instance, wherein the data is caused to migrate by the virtualization instance and/or a logic configured to operate with the virtualization instance.

22 Claims, 22 Drawing Sheets

FIG. 13A
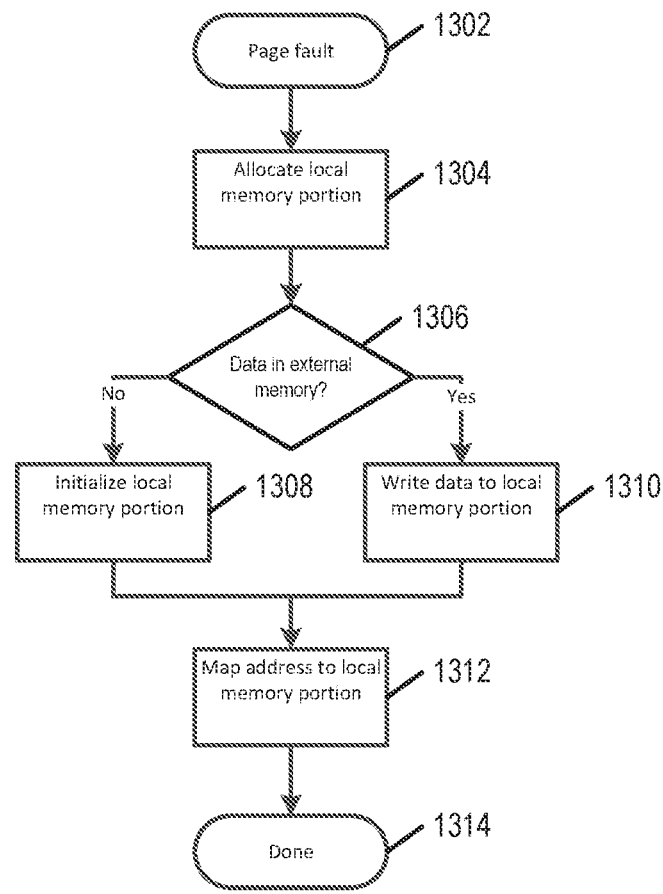
FIG. 13B
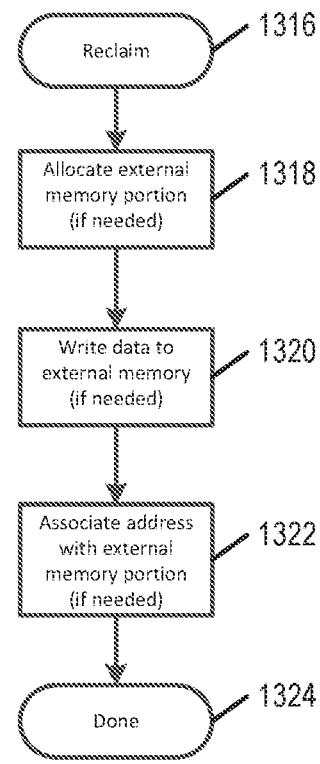
FIG. 13

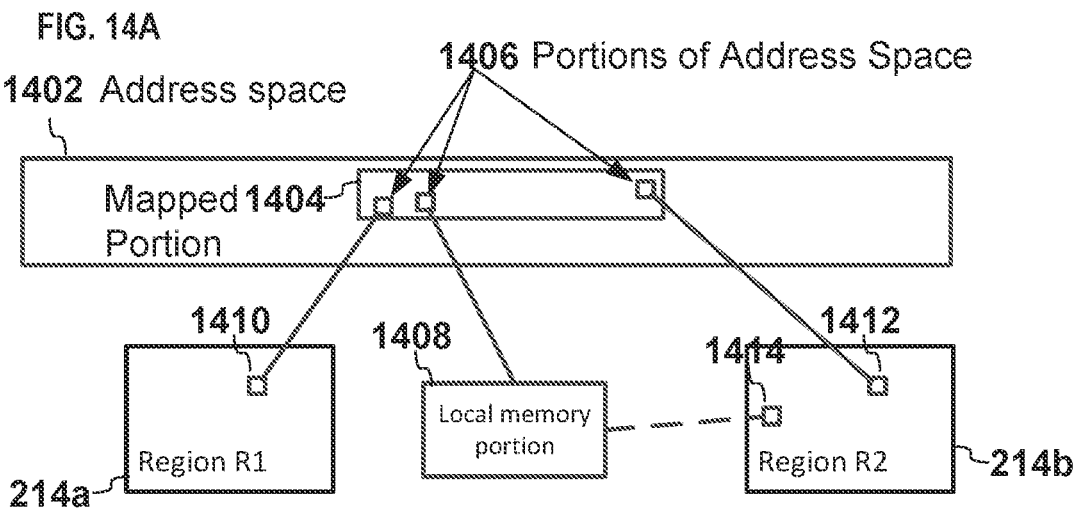
FIG. 14A
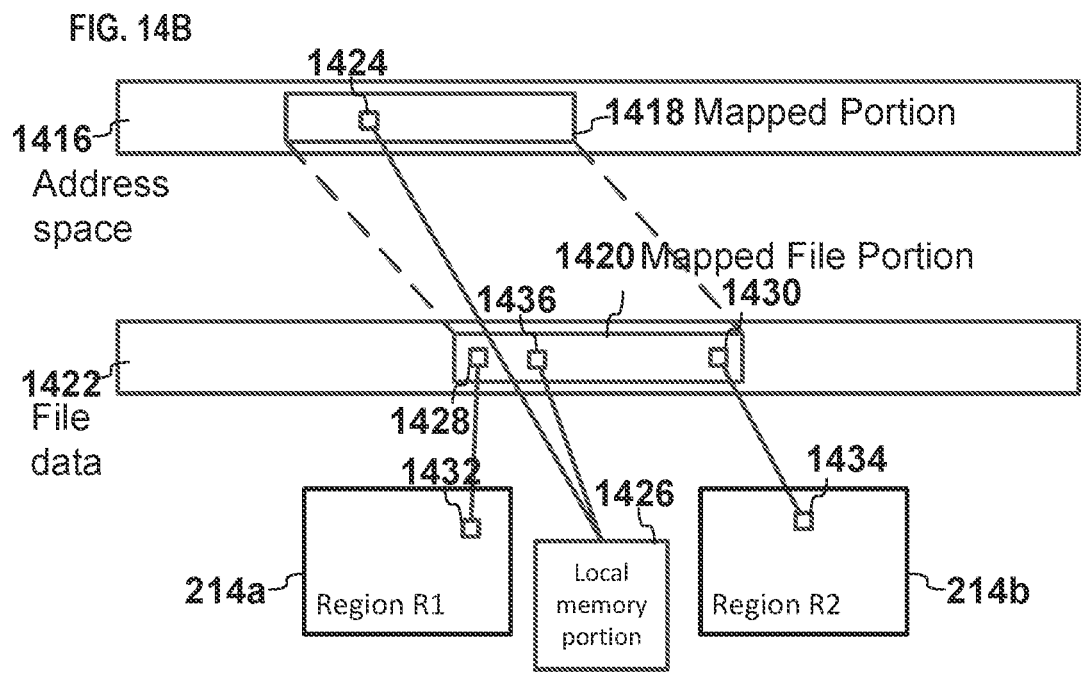
FIG. 14B
FIG. 14

EXTERNAL MEMORY AS AN EXTENSION TO VIRTUALIZATION INSTANCE MEMORY

CROSS-REFERENCE TO RELATED APPLICATIONS

This application is a non-provisional of, and claims priority under 35 USC § 119(e) to, U.S. provisional application 63/220,502, filed Jul. 10, 2021, the entire contents of which are incorporated by reference.

BACKGROUND

1. Technical Field

This application relates to memory and, in particular, to external memory.

2. Related Art

Under some circumstances, computing systems may encounter a scenario where memory usage nearly equals, equals, or exceeds available local primary memory. Such computing systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 13A and FIG. 13B illustrate example flow diagrams for handling a page fault for portions of an address space and/or for reclaiming portions of local primary memory using external primary memory;

FIG. 14A and FIG. 14B illustrate example mappings and/or associations between address spaces, file data, local primary memory, and/or external primary memory for example systems in which some portions of an address space are mapped to local primary memory and/or some portions of the address space are associated with external primary memory;

DETAILED DESCRIPTION

The present disclosure provides a technical solution to solve a technical problem of providing scalable primary memory to a computing system. The primary memory may scale on demand. The primary memory may be external to the computing system. Further, a technical solution is described to solve a technical problem of efficiently using available primary memory capacity. Various other technical problems and their respective technical solutions are also provided and will be evident to persons skilled in the art. For example, the technical solution may enable multiple clients to share a single region and/or external memory allocation when using a memory allocation interface. Alternatively or in addition, the technical solution may enable applications that use a memory allocation interface to be migrated from one physical machine to another, without losing metadata related to allocated portions.

For example, it may be beneficial to provide primary memory to a local machine from an aggregated "pool" of memory, which may be referred to as a 'memory pool'. The memory pool may be external to the local machine. The memory pool may involve multiple memory appliances, and the memory pool may scale to an infinite or arbitrarily large number of memory appliances without performance irregularities due to the scaling. The technical solutions described may enable an installation, such as a server cluster, or an administrator to provision primary memory to servers or persons, associated with the installation, with dynamic policies like quotas. Further, the technical solutions described may enable dynamic allocation of memory by applications from the memory pool on demand, whenever needed. The technical solutions described may further enable primary memory of a local machine, such as a single server to balloon to any size needed and shrink back to original size when the larger memory capacity is no longer needed, irrespective of the original memory capacity of the server and substantially without a limit on how large the memory pool may become.

Figure 1:
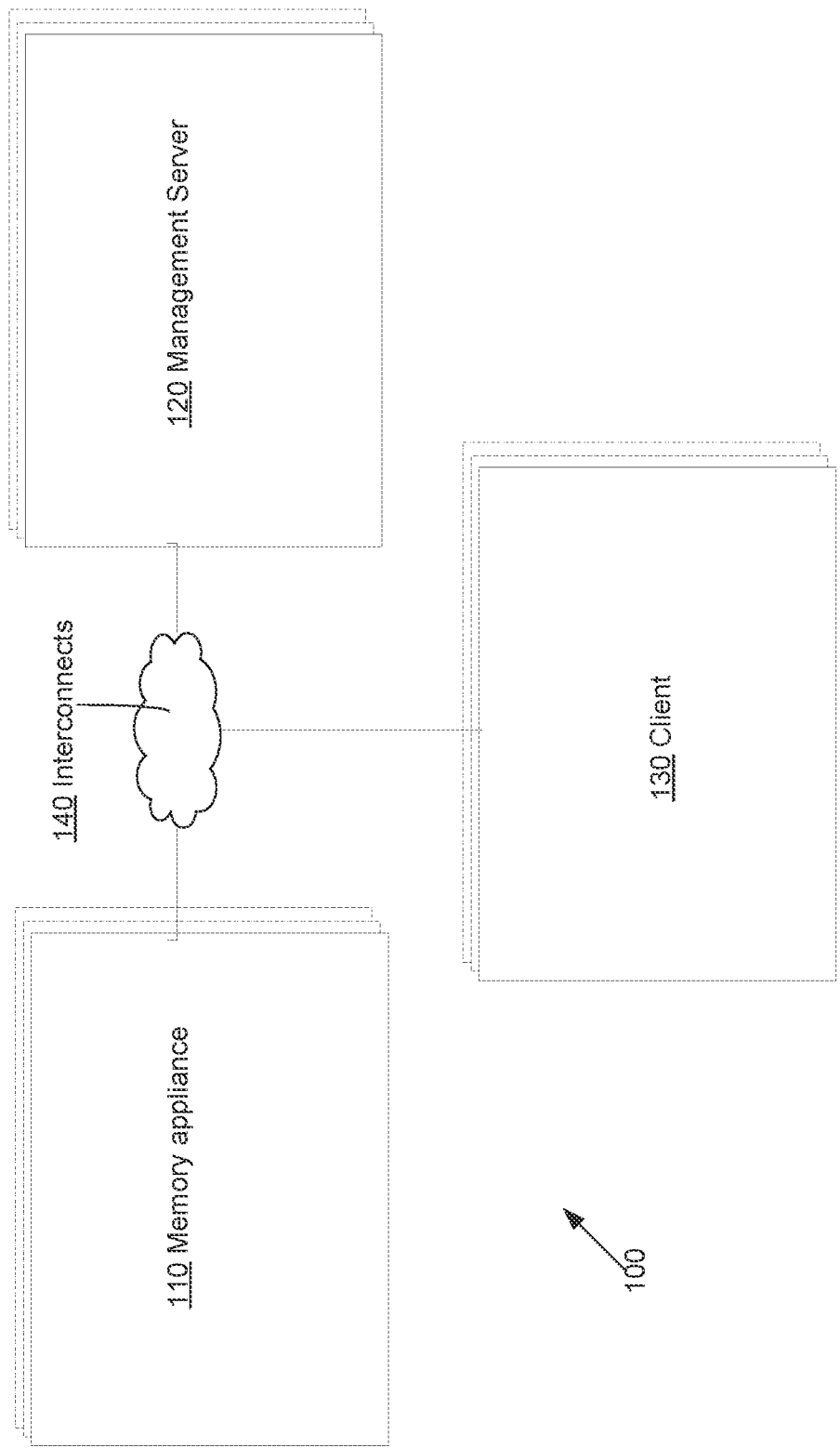
FIG. 1 illustrates a hardware diagram of an example external memory system.

FIG. 1 illustrates a hardware diagram of an example external memory system 100. The external memory system may include a memory appliance 110, a management server 120, a client 130, and one or more interconnects 140. The external memory system may include more, fewer, or different elements. For example, the external memory system may include multiple clients, multiple memory appliances, and/or multiple management servers. Alternatively, the external memory system may include just the client, just the memory appliance, and/or just the management server.

The memory appliance 110 may include memory that may be externally allocatable as primary memory. Henceforth, throughout this disclosure, unless specified otherwise, "memory" refers to primary memory. The management server 120 may be a memory pool manager, responsible to allocate and/or manipulate memory allocations for the client 130 using the memory appliance 110. The client 130 may be a machine or a device requesting external memory. The client 130 may contain local memory that operates as the primary memory of the client 130. However, the external memory allocation may be requested by the client to scale the capacity of the primary memory available locally. Alternatively, or in addition, the client 130 may operate the locally available primary memory as a cache memory when accessing the externally allocated memory from the memory appliance 110. For example, cache memory may be used by the client to reduce average time to access data from the externally allocated memory. The locally available primary memory may be faster than the externally allocated memory and may be used to store copies of data from frequently used memory locations of the externally allocated memory. For example, the client may read data from or write data to a location in the externally allocated memory. The client may first check whether a copy of the data is in the cache memory, such as the locally available memory. If so, the client may read the data from or write the data to the cache memory, which may be faster than reading from or writing to the externally allocated memory.

The memory appliance 110, the management server 120, and the client 130 may communicate with each other over the interconnects 140. The communication may be unidirectional or bi-directional. An interconnect may electrically couple the memory appliance 110, the management server 120, and/or the client 130. Each of the interconnects 140 may include a physical component that transports signals between two or more devices. For example, an interconnect may be a cable, a wire, a parallel bus, a serial bus, a network, a switched fabric, a wireless link, a point to point network, or any combination of components that transport signals between devices. Alternatively or in addition, the memory appliance 110, the management server 120, and the client 130 may communicate over a communication network, such as a switched fabric, a Storage Area Network (SAN), an InfiniBand network, a Local Area Network (LAN), a Wireless Local Area Network (WLAN), a Personal Area Network (PAN), a Wide Area Network (WAN), a circuit switched network, a packet switched network, a telecommunication network or any other now known or later developed communication network. The communication network, or simply "network", may enable a device to communicate with components of other external devices, unlike buses that only enable communication with components within and/or plugged into the device itself. Thus, a request for primary memory made by an application executing on the client 130 may be sent over the interconnect 140, such as the network. The request may be sent to devices external to the client 130, such as the management server 120 and/or the memory appliances 110. In response to the request, the application that made the request may be allocated memory from memories of one or more memory appliances that are external to the client 130, instead of being allocated a portion of memory locally available inside the client 130 itself.

The management server 120 may dynamically allocate and/or manipulate external memory allocations for the client 130. An external memory allocation may reference one or more regions in the memory appliance 110. The management server 120 may allocate and/or manipulate the regions in the memory appliance 110 using region access logic requests. The client 130 may allocate and/or manipulate external memory allocations and/or regions using allocation logic requests.

Multiple memory appliances may be "pooled" to create a dynamically allocatable, or allocable, external memory pool. For example, new memory appliances may be discovered, or as they become available, memory of, or within, the new memory appliances may be made part of the memory pool. The memory pool may be a logical construct. The memory pool may be multiple memory appliances known to and/or associated with the management server 120. The memory appliances involved in the memory pool may not know about each other. As additional memory appliances are discovered, the memory of the memory appliances may be added to the memory pool, in other words, the portions of the memory of the memory appliances is made available for use by the requesting client 130. The client 130 may be able to request dynamically allocatable external memory from the memory pool which may be available for use, even though the external memory exists on other machines, unknown to the client 130. The client 130, requesting memory, at time of requesting the memory, may be unaware of the size of the memory pool or other characteristics related to configuration of the memory pool. The memory pool may increase or decrease at any time without a service interruption of any type to the memory consumers, such as the machines requesting memory.

The external memory allocations may span multiple memory appliances. Thus, the external memory system 100 makes available memory capacity, larger than what may be possible to fit into the requesting client 130, or a single memory appliance 110, or a single server. The memory capacity made available may be unlimited since any number of memory appliances may be part of the memory pool. The memory pool may be expanded based on various conditions being met. For example, the maximally price-performant memory available may be selected to grow the memory pool in a maximally cost-efficient manner. Alternatively, or in addition, memory appliances may be added at any moment to extend the capacity and performance of the aggregate pool, irrespective of characteristics of the memory appliances. In contrast, the individual client 130, such as a server computer, may be limited in physical and local memory capacity, and moreover, in order to achieve the largest memory capacity, expensive memory may have to be used or installed in the individual client 130 absent dynamically allocatable external memory.

Instead, with dynamically allocatable external memory, such as the memory pool, one no longer needs to buy expensive large servers with large memory capacity. One may instead buy smaller more energy-efficient and cost-effective servers and extend their memory capacity, on demand, by using dynamically allocatable external memory.

The memory pool may be managed by the management server 120. The management server 120, using various components, may provision external primary memory to the client 130 or multiple clients that request external memory allocation. The memory pool manager may provision external memory to different clients at different times according to different policies, contracts, service level agreements (SLAs), performance loads, temporary or permanent needs, or any other factors.

For example, the client 130 may be server cluster. By using external memory allocation and provisioning, the server cluster need not require servers to have sufficient pre-existing local memory in order to process all anticipated loads. A typical approach to have each individual server to have full capacity memory leads to over-purchasing memory for all servers in order to satisfy exceptional cases needed by some servers, some of the time. Instead, with external memory, the server cluster may provision portions of external memory where and when needed, thereby saving money, space, and energy, by providing on-demand memory to any capacity. The server cluster may even support memory capacities impossible to physically fit into a single machine.

In another example, external memory may be dynamically allocated according to performance ratings of the external memory. For example, higher-performance external memory may be provisioned for some purposes, and/or lower-performance, but larger capacity and/or lower cost, external memory for other purposes.

The memory pool may provide dynamic memory allocation so that the client 130 may request to receive external memory, and when the external memory is no longer needed, the client 130 may release the external memory back to the memory pool. The dynamic memory allocation may enable the client 130 to allocate a provisioned amount of external memory for various purposes on the client 130 at various times, on-the-fly, according to client-logic needs rather than based on an installation policy, or local, internal memory of a particular server.

The client 130 may access the dynamically allocatable external memory through one or more of a variety of interfaces. The different interfaces to access the external memory may vary the lowest level addressing used to address the external memory. The client 130 may be provided with different sub-interfaces for each respective access interface. For example, the access interface(s) may provide physical mapping, programmatic APIs, or any other application-specific interface, to use the external memory so as to solve a multitude of diverse problems in optimal ways for every case. The different access interfaces may even be employed at the same time, and even against the same external memory allocation.

Depending upon the interface used, external memory operations may not be constrained to memory page size. For some interfaces, external memory operations may be as small as a single byte or character and scale to any degree.

In an example, the dynamically allocatable external memory may enable multiple clients to share an external memory allocation. The multiple clients, in this case, may access and/or operate on the data in the shared external memory allocation at the same time. Thus, external and scalable shared memory may be provided to the multiple clients concurrently.

One or more clients may be logically grouped together and/or may be operated upon as a group. A group of one or more clients may be considered a client group. Accordingly, actions described throughout this disclosure as being performed upon and/or by one or more clients may alternatively or in addition be performed upon and/or by one or more client groups.

As described throughout this disclosure, external memory operations may be carried out via direct communication, referred to as a client-side memory access, between the client 130 and the memory appliance 110 that is part of the memory pool. The client-side memory access provides a consistent low latency, such as at least one of: one round-trip time, switching time, and/or communication interface processing time. The client-side memory access also provides determinacy, or in other words a predictable performance, such as a determinate amount of time for a given memory operation to be performed. Thus, by using the client-side memory access, the dynamically allocatable external memory provides a high level of determinacy and consistent performance scaling even as more memory appliances and external memory clients are deployed and/or used for dynamic load balancing, aggregation, and/or re-aggregation.

Throughout this text, the terms hypervisor, operating system-level virtualization logic, container hosting logic, jail hosting logic, and/or zone hosting logic may be used interchangeably to refer to a portion of the client logic responsible for providing interfaces and/or abstractions to facilitate sharing access to the physical resources of the client with one or more application logics. Also, the terms virtual machine, operating system-level virtualization, container, jail, and/or zone may be used interchangeably to refer to the portion of the application logic which utilizes the interfaces and/or abstractions provided by the client logic. The virtualization instance may be an instance of any form of operating system virtualization. The virtualization may provide userspace isolation or userspace compartmentalization. Examples of the virtualization instance may include a virtual machine, operating system-level virtualization, container, jail, and/or zone. The virtualization logic may be any logic configured to execute and/or implement the virtualization instance. Examples of the virtualization logic may include a hypervisor and the operating system-level virtualization logic.

Dynamically allocatable external memory may also be persistent, meaning the data stored in the external memory is durable over time. This extends the memory paradigm to include the persistence aspects of external storage while retaining the performance of memory. This provides performance of memory with conveniences of a storage paradigm.

Figure 2:
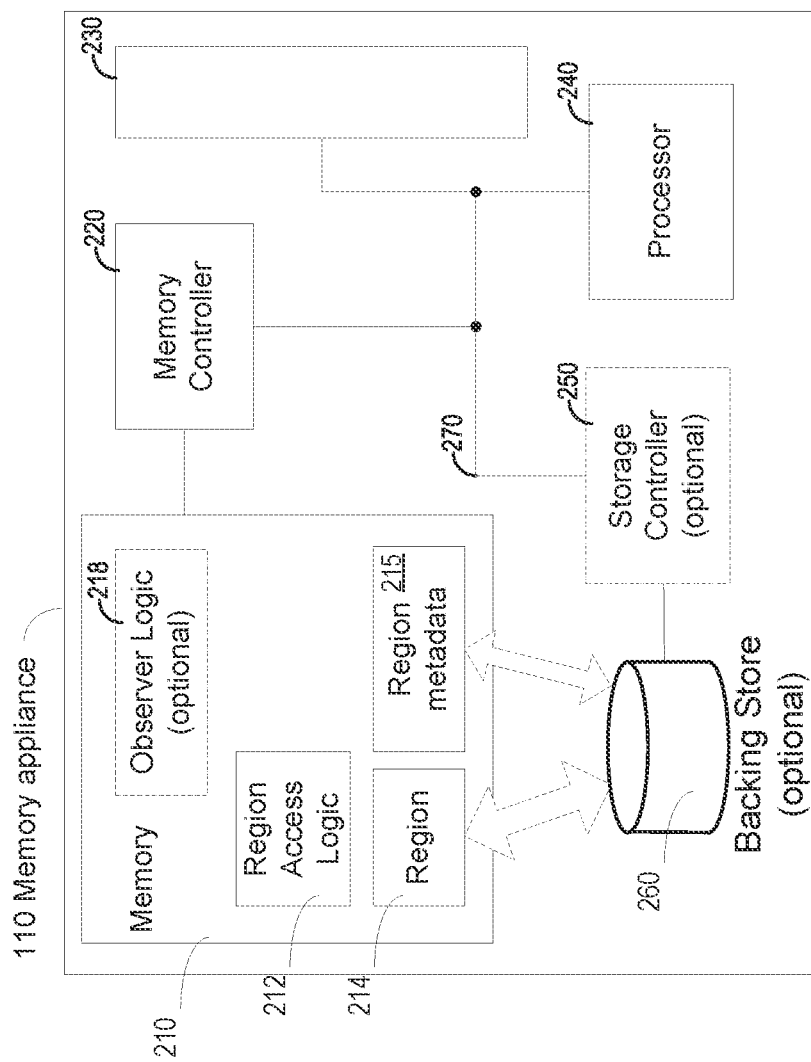
FIG. 2 illustrates an example memory appliance.

FIG. 2 illustrates the example memory appliance 110. By way of example, the system 100 for dynamically allocatable external memory may store data of one or more regions in one or more memory appliances. The memory appliance 110 may be a server, a device, an embedded system, a circuit, a chipset, an integrated circuit, a field programmable gate array (FPGA), an application-specific integrated circuit, a virtual machine, a virtualization instance, a container, a jail, a zone, an operating system, a kernel, a device driver, a device firmware, a hypervisor service, a cloud computing interface, and/or any other hardware, software, and/or firmware entity which may perform the same functions as described. The memory appliance 110 may include a memory 210, a memory controller 220, a communication interface 230, a processor 240, a storage controller 250, and a backing store 260. In other examples, the memory appliance may contain different elements. For example, in another example, the memory appliance 110 may not include the storage controller 250 and the backing store 260. The memory 210 may further include a region access logic 212, one or more regions 214, region metadata 215, and an observer logic 218. The observer logic 218 may not be present in other example memory 210. The region access logic 212 and/or the observer logic 218 may be referred to as a region access unit and/or an observer unit respectively. The memory appliance may include more, fewer, or different elements. For example, the memory appliance 110 may include multiple backing stores, multiple storage controllers, multiple memories, multiple memory controllers, multiple processors, or any combination thereof. The memory appliance 110 may store data received over the one or more interconnects 140.

The region access logic 212 in the memory appliance 110 may register the regions 214 or portions of the regions with one or more communication interfaces 230. Alternatively, or in addition, the region access logic 212 may provide and/or control access to the region 214 by one or more clients and/or one or more management servers. A communication interface in the client 130 may provide client-side memory access to the memory 210 of the memory appliance 110, to the regions 214, and/or to portions of the regions in the memory appliance 110. One or more interconnects or networks may transport data between the communication interface of the client 130 and the communication interface 230 of the memory appliance 110. For example, the communication interfaces may be network interface controllers or host controller adaptors.

A client-side memory access may bypass a processor, such as a CPU (Central Processing Unit), at the client 130 and/or may otherwise facilitate the client 130 accessing the memory 210 on the memory appliance 110 without waiting for an action by the processor included in the client 130, in the memory appliance, or both. For example, the client-side memory access may be based on the Remote Direct Memory Access (RDMA) protocol. The RDMA protocol may be carried over an InfiniBand interconnect, an iWARP interconnect, an RDMA over Converged Ethernet (RoCE) interconnect, an Aries interconnect, a Slingshot interconnect, and/or any other interconnect and/or combination of interconnects known now or later discovered. Alternatively, or in addition, the client-side memory access may be based on any other protocol and/or interconnect that may be used for accessing memory. A protocol that may be used for accessing memory may be a CPU protocol/interconnect, such as HyperTransport, Quick Path Interconnect (QPI), Ultra Path Interconnect (UPI), and/or Infinity Fabric. Alternatively, or in addition, a protocol that may be used for accessing memory may be a peripheral protocol/interconnect, such as Peripheral Component Interconnect (PCI), PCI Express, PCI-X, ISA, Gen-Z, CXL, and/or any other protocol/interconnect used to interface with peripherals and/or access memory. The communication interfaces may provide reliable delivery of messages and/or reliable execution of memory access operations, such as any memory access operation carried out when performing the client-side memory access. Alternatively, or in addition, delivery of messages and/or execution of memory access operations may be unreliable, such as when data is transported between the communication interfaces using the User Datagram Protocol (UDP). The client 130 may read, write, and/or perform other operations on the memory 210, to the regions 214 within the memory 210, and/or to portions of the regions using client-side memory access. In providing client-side memory access, the client 130 may transmit requests to perform memory access operations to the memory appliance 110. In response, the memory appliance 110 may perform the memory access operations. Similar to as done by the storage device of U.S. patent application Ser. No. 13/036, 544, filed Feb. 28, 2011, entitled "High performance data storage using observable client-side memory access" by Stabrawa, et al., which published as US Patent Application Publication US2012/0221803 A1, and which is hereby incorporated by reference, the memory appliance 110 may observe or otherwise identify the memory access operations. In response to identifying the memory access operations, the memory appliance 110 may, for example, copy the data of the region 214 to one or more backing stores 260 independently of performing the memory access operations on the memory 210. A backing store 260 may include one or more persistent non-volatile storage media, such as flash memory, phase change memory, 3D XPoint memory, memristors, EEPROM, magnetic disk, tape, or some other media. The memory 210 and/or the backing store 260 (if included) may be subdivided into regions.

The memory appliance may be powered by a single power source, or by multiple power sources. Examples of the power source include a public utility, internal or external battery, an Uninterruptible Power Supply (UPS), a facility UPS, a generator, a solar panel, any other power source, or a combination of power sources. The memory appliance may detect the condition of the one or more power sources that power the storage device.

The memory 210 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a phase change memory, 3D XPoint memory, a memristor memory, any type of memory configured in an address space addressable by the processor, or any combination thereof. The memory 210 may be volatile or non-volatile, or a combination of both.

The memory 210 may be a solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 220 in the memory appliance 110, via an interconnect bus 270, such as the interconnect 270 in the memory appliance 110.

Solid state memory may include random access memory that permits stored data to be read and/or written in any order (for example, at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, V-NAND, Z-NAND, phase change memory (PRAM), 3D XPoint memory, EEPROM, FeRAM, MRAM, CBRAM, PRAM, SONOS, RRAM, Racetrack memory, NRAM, Millipede, T-RAM, Z-Ram, TTRAM, and/or any other randomly-accessible data storage medium known now or later discovered.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include Serial Advanced Technology Attachment (SATA) or Small Computer System Interface (SCSI) interfaces; Flash or DRAM drives that include SCSI over Fibre Channel interfaces; DRAM, Flash, and/or 3D XPoint memory drives that include NVMe interfaces; DRAM drives that include SATA or SCSI interfaces, USB (universal serial bus) flash drives with USB interfaces, and/or any other combination of solid state memory and storage controller known now or later discovered.

The memory 210 may include the region access logic 212, the region 214, and the region metadata 215. In an example, each portion of the memory 210 that includes a corresponding one of the region access logic 212, the region 214, and the region metadata 215 may be of a different type than the other portions of the memory 210. For example, the memory 210 may include a ROM and a solid state memory, where the ROM includes the region access logic 212, and the solid state memory includes the region 214 and the region metadata 215. The memory 210 may be controlled by the memory controller 220. The memory 210 may include more, fewer, or different components. For example, the memory may include the observer logic 218.

The processor 240 may be a general processor, a central processing unit (CPU), a server, a microcontroller, an application specific integrated circuit (ASIC), a digital signal processor, a field programmable gate array (FPGA), a digital circuit, an analog circuit, or any combination thereof. The processor 240 may include one or more devices operable to execute computer executable instructions or computer code embodied in the memory 210 or in other memory to perform features of the external memory system. For example, the processor 240 may execute computer executable instructions that are included in the observer logic 218 and the region access logic 212.

The processor 240, the memory controller 220, and the one or more communication interfaces 230 may each be in communication with each other. Each one of the processor 240, the memory controller 220, and the one or more communication interfaces 230 may also be in communication with additional components, such as the storage controller 250, and the backing store 260. The communication between the components of the memory appliance 110 may be over an interconnect, a bus, a point-to-point connection, a switched fabric, a network, any other type of interconnect, or any combination of interconnects 270. The communication may use any type of topology, including but not limited to a star, a mesh, a hypercube, a ring, a torus, a fat tree, a dragonfly, or any other type of topology known now or later discovered. Alternatively or in addition, any of the processor 240, the memory 210, the memory controller 220, and/or the communication interface 230 may be logically or physically combined with each other or with other components, such as with the storage controller 250, and/or the backing store 260.

The memory controller 220 may include a hardware component that translates memory addresses specified by the processor 240 into the appropriate signaling to access corresponding locations in the memory 210. The processor 240 may specify the address on the interconnect 270. The processor 240, the interconnect 270, and the memory 210 may be directly or indirectly coupled to a common circuit board, such as a motherboard. In one example, the interconnect 270 may include an address bus that is used to specify a physical address, where the address bus includes a series of lines connecting two or more components. The memory controller 220 may, for example, also perform background processing tasks, such as periodically refreshing the contents of the memory 210. In one example implementation, the memory controller 220 may be included in the processor 240.

The one or more communication interfaces 230 may include any one or more physical interconnects used for data transfer. In particular, the one or more communication interfaces 230 may facilitate communication between the memory appliance 110 and the client 130, between the memory appliance 110 and the management server 120, between the memory appliance 110 and any other device, and/or between the management server 120 and any other device. The one or more communication interfaces 230 may communicate via the one or more interconnects. The one or more communication interfaces 230 may include a hardware component. In addition, the one or more communication interfaces 230 may include a software component. Examples of the communication interface include a Direct Memory Access (DMA) controller, an RDMA controller, a Network Interface Controller (NIC), an Ethernet controller, a Fibre Channel interface, an InfiniBand interface, a SATA interface, a SCSI interface, a USB interface, an Ethernet interface, an *Aries* interface, a Slingshot interface, an Omni-Path interface, a Gen-Z interface, a CXL interface, a PCI Express interface, a PCI-X interface, a PCI interface, a Silicon Photonics interface, an optical communications interface, a wireless communications interface, and/or any other physical communication interface known now or later discovered. The one or more communication interfaces 230 may facilitate client-side memory access, as described throughout this disclosure.

The region 214 may be a configured area of the memory 210 that is accessible via a memory access protocol and/or storage protocol now known or later discovered. Storage protocols and memory access protocols are described elsewhere in this disclosure. The region 214 may be a logical region which maps a sequence of data blocks to corresponding memory locations in the memory 210. Therefore, in addition to the data blocks themselves, the region 214 may include region information, such as a mapping of data blocks to memory locations or any other information about the data blocks. The data blocks of the region 214, which may be configured by the region access logic 212, may all be stored in the memory 210. The volume information may or may not be included in the memory 210. Accordingly, when the region 214 is said to be included in the memory 210, at least the data blocks of the region 214 (the data stored in the region) are included in the memory 210. Alternatively, or in addition, the volume information may be included in the region metadata 215.

The region metadata 215 may include properties, configuration parameters, and/or access parameters related to the region 214.

Properties may include the size of the region, references to portions within the memory allocated to the region 214, and/or any other aspects describing the region 214, its data, its memory, and/or its backing store.

Configuration parameters may include an indication of whether or not the region 214 may be persisted to the backing store 260, an indication of what logic and/or method may be used to persist the region 214 to the backing store 260, an identifier which may be used to locate persisted data related to the region 214, and/or any other parameters used to specify how the region 214 may behave or be treated.

Access parameters may include a list of zero or more communication interfaces 230 included in the memory appliance 110 which may be used to access the region 214, a list of zero or more clients, memory appliances, and/or management servers which are allowed to access the region 214, a list of zero or more communication interfaces of clients, memory appliances, and/or management servers which are allowed to access the region 214, a password which may be used to authenticate access to the region 214, an encryption key which may be used to authenticate access to the region 214, access permissions, and/or any other parameters used to specify how the region may be accessed.

Access permissions may include a mapping of access method to permissions granted and/or revoked. Access methods may include: via a specified communication interface 230 included in the memory appliance 110; via a specified communication interface of a client, memory appliance, and/or management server; by a specified client; by a specified memory appliance; by a specified management server; using a specified password; using a specified encryption key; and/or any other identifiable method used to access the region.

Permissions may include data read access, data write access, metadata read access, metadata write access, destroy access, and/or any other capability that may be selectively granted and/or revoked to a client, a memory appliance, and/or a management server. For example, the access parameters may include access permissions that indicate that a particular management server may read the metadata for the region 214, but may not read and/or write the data of the region 214. In a second example, the access parameters may include access permissions that indicate that a particular client may read the data for the region 214, but may not write the data for the region 214.

The storage controller 250 of the memory appliance 110, of the management server 120, and/or of the client 130 may include a component that facilitates storage operations to be performed on the backing store 260. A storage operation may include reading from or writing to locations within the backing store 260. The storage controller 250 may include a hardware component. Alternatively or in addition, the storage controller 250 may include a software component.

The backing store 260 of the memory appliance 110, of the management server 120, and/or of the client 130 may include an area of storage comprising one or more persistent media, including but not limited to flash memory, phase change memory, 3D XPoint memory, Memristors, EEPROM, magnetic disk, tape, or other media. The media in the backing store 260 may potentially be slower than the memory 210 on which the region 214 is stored.

The storage controller 250 and/or backing store 260 of the memory appliance 110 may be internal to the memory appliance 110, a physically discrete component external to the memory appliance 110 and coupled to the backing store 260, included in a second memory appliance or in a device different from the memory appliance 110, included in the management server 120, included in the client 130, part of a server, part of a backup device, part of a storage device on a Storage Area Network, and/or part of some other externally attached persistent storage. Alternatively, or in addition, a region included in a different memory appliance may be used as the backing store for the memory appliance 110.

One or more memory appliances may be logically grouped together and/or may be operated upon as a group. A group of one or more memory appliances may be considered a memory appliance group. Accordingly, actions described throughout this disclosure as being performed upon and/or by one or more memory appliances may alternatively or in addition be performed upon and/or by one or more memory appliance groups.

Figure 3:
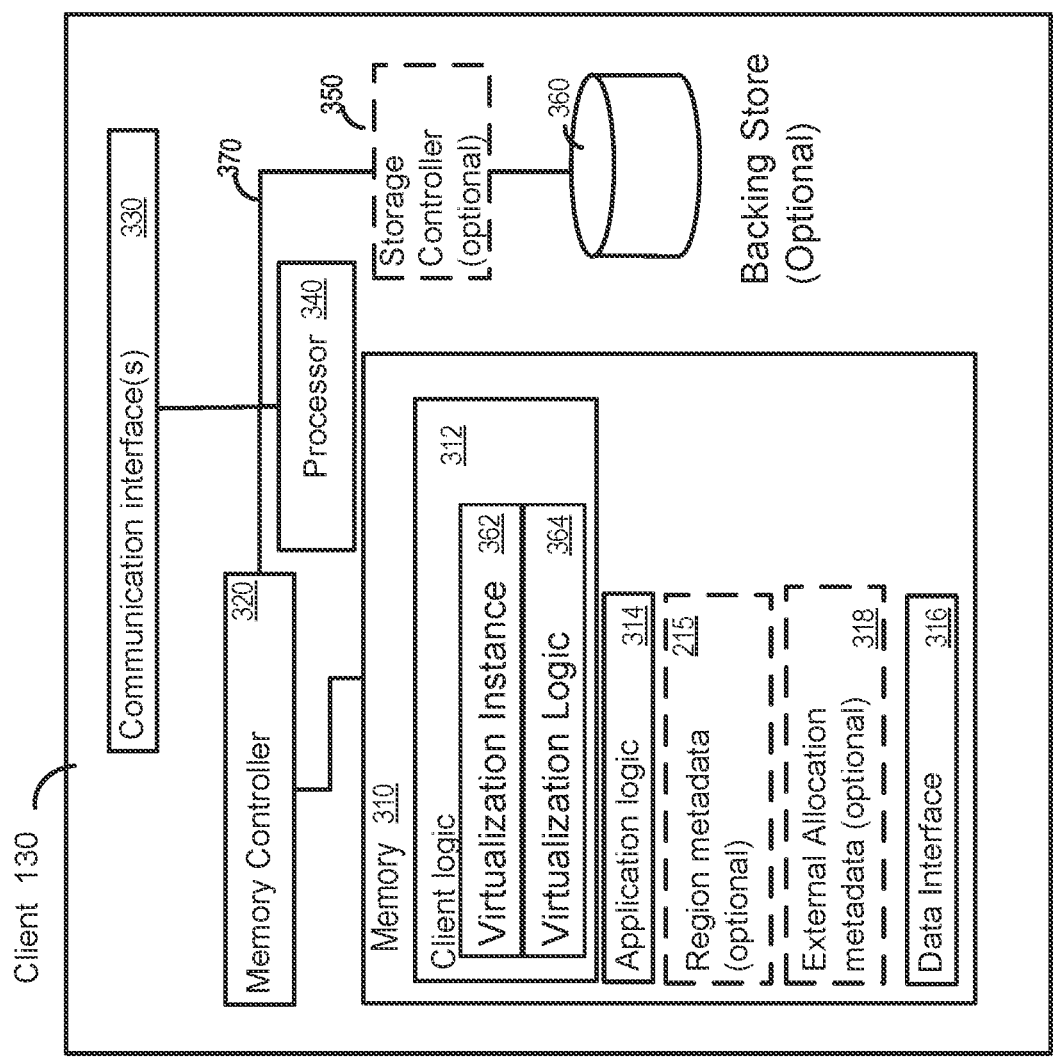
FIG. 3 illustrates an example client.

FIG. 3 illustrates the example client 130. The client 130 may include a memory 310, a memory controller 320, a processor 340, and a communication interface 330, similar to the memory 210, the processor 240, the communication interface 230, and the memory controller 220 of the memory appliance 110. The client 130 may include more, fewer, or different components. For example, the client 130 may include a storage controller 350, a backing store 360, multiple storage controllers, multiple backing stores, multiple memories, multiple memory controllers, multiple processors, or any combination thereof. Alternatively, the client 130 may just include a process executed by the processor 340.

The storage controller 350 and/or backing store 360 of the client 130 may be internal to the client 130, a physically discrete device external to the client 130 that is coupled to the client 130, included in a second client or in a device different from the client 130, included in the management server 120, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 360 for the client 130.

The memory 310 of the client 130 may include a client logic 312. The memory 310 of the client 130 may include more, fewer, or different components. For example, the memory 310 of the client 130 may include an application logic 314, the region metadata 215, a data interface 316, and/or external memory allocation metadata 318. The processor 340 may execute computer executable instructions that are included in the client logic 312 and/or the application logic 314. Alternatively, or in addition the client logic 312, the application logic 314, and/or the data interface 316 may be referred to as a client logic unit 312, an application logic unit 314 and/or a data interface unit, respectively. The components of the client 130 may be in communication with each other over an interconnect 370, similar to the interconnect 270 in the memory appliance 110 or over any other type of interconnect.

The application logic 314 and/or the client logic 312 may include a user application, an operating system, a kernel, a device driver, a device firmware, a virtualization instance 362 (such as a virtual machine, a container, a jail, and/or a zone), a virtualization logic 364 (such as a hypervisor), a cloud computing interface, a circuit, a logical operating system partition, or any other logic that uses the services provided by the client logic 312. In the example illustrated in FIG. 3, the virtualization instance 362 and the virtualization logic 364 are included in the client logic 312. However, as just indicated in the first sentence of this paragraph, the virtualization instance 362 and/or the virtualization logic 364 may be included in the application logic 314 instead. A container, a jail, and a zone may be technologies that provide userspace isolation or compartmentalization. Any process in the container, the jail, or the zone may communicate only with processes that are in the same container, the same jail, or the same zone. In some examples, the application logic 314 and/or the client logic 312 may be embedded in a chipset, an FPGA, an ASIC, a processor, or any other hardware device. The virtualization instance 362 may be executed via the virtualization logic 364 being executed by the processor 340 of the client 130.

Figure 4:
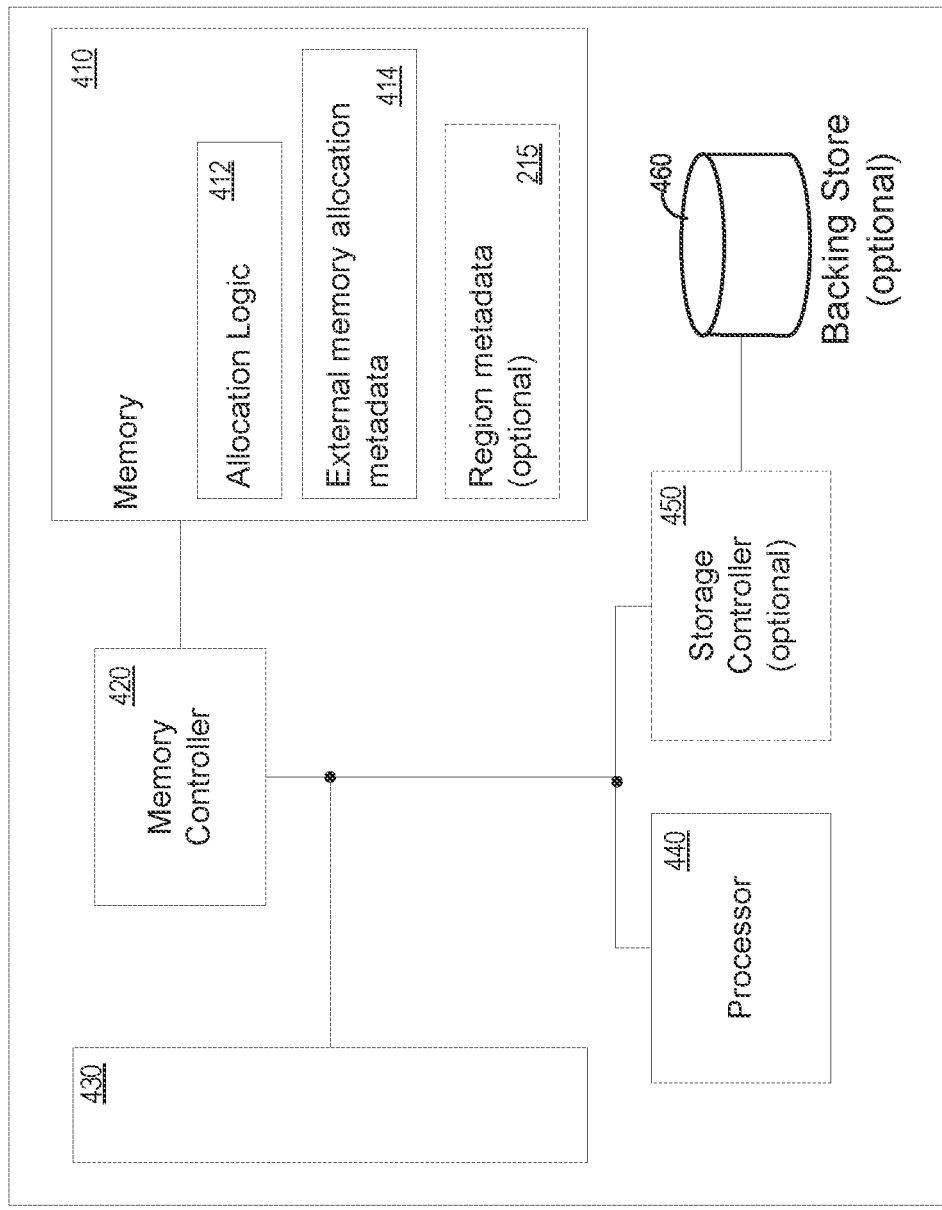
FIG. 4 illustrates an example management server.

FIG. 4 illustrates the example management server 120. The management server 120 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity which may perform the same functions as described. The management server 120 may include a memory 410, a processor 440, a communication interface 430, and a memory controller 420, similar to the memory 210, the processor 240, the communication interface 230, and the memory controller 220 of the memory appliance 110. The management server 120 may include more, fewer, or different components. For example, the management server may include a storage controller 450, a backing store 460, multiple storage controllers, multiple backing stores, multiple memories, multiple memory controllers, multiple processors, or any combination thereof. Alternatively, the management server 120 may just include a process executed by the processor 440.

The storage controller 450 and/or backing store 460 of the management server 120 may be internal to the management server 120, a physically discrete device external to the management server 120 that is coupled to the management server 120, included in a second management server or in a device different from the management server 120, included in the client 130, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 460 for the management server 120.

The memory 410 of the management server 120 may include an allocation logic 412 and/or external memory allocation metadata 414. The memory 410 of the management server 120 may include more, fewer, or different components. For example, the memory 410 of the management server 120 may include region metadata 215. The processor 440 may execute computer executable instructions that are included in the allocation logic 412. The allocation logic 412 may be referred to as an allocation logic unit. The components of the management server 120 may be in communication with each other over an interconnect 470, such as the interconnect 270 in the memory appliance 110 or over any other type of interconnect.

During operation of the external memory system, the region access logic 212 may provide the client 130 and/or management server 120 with client-side memory access to the region 214. Alternatively, or in addition, the region access logic 212 may provide other memory appliances with client-side memory access to the region 214. Client-side memory access may include a memory access operation. A memory access operation may include, for example, a read memory operation or a write memory operation. The memory access operation may be performed by the memory appliance 110 in response to receiving a request from the client 130 and/or management server 120 at the communication interface 230 of the memory appliance 110. The request may include, for example, a starting memory offset, a size of memory allocation, a starting memory location, a number of units of memory to access, or any other attribute relating to the requested memory access operation. The request may address the memory 210 on a block-addressable basis, a word-addressable basis, a byte-addressable basis, or on any other suitable unit of memory basis.

The region access logic 212 may register the region 214 with the communication interface 230 and/or with a device other than the memory appliance, such as with the client 130 and/or management server 120. Alternatively or in addition, the region access logic 212 may determine a location or locations in the memory 210 of the memory appliance 110 where the region 214 is located. The region access logic 212 may register the location or locations with the communication interface 230 and/or with a device other than the memory appliance 110, such as with the client 130 and/or management server 120.

The region access logic 212 may control and/or specify how the region 214 may be accessed. For example, the region access logic 212 may control which regions are available on the memory appliance 110 and/or which operations may be performed. In one example, the region access logic 212 may control access based upon the current time, day, month or year; an identity or a location of the communication interface, an identity or a location of the client and/or management server; or some other attribute of the client 130, the memory appliance 110, the management server 120, the interconnect 140, or of the surrounding environment that is detectable by the region access logic 212, such as the condition of the power source that powers the memory appliance 110. Alternatively or in addition, the region access logic 212 may control access based on an authentication mechanism, including but not limited to a password, a key, biometrics, or a cryptographic authentication.

The region access logic 212 or the communication interface 230 may provide client-side memory access using any memory access protocol now known or later discovered. The memory access protocol may be any communication protocol used to transfer data between a memory in a first device, such as the memory 310 in the client 130, and a memory in a second device, such as the memory 210 in the memory appliance 110, where the data is transferred independently of CPU's in the first and second devices, such as the processor 340 in the client 130 and the processor 240 in the memory appliance 110. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 230 in the memory appliance 110 and the communication interface 330 in the client 130. The memory access protocol and electrical characteristics of the hardware controller may be part of a common standard. Accordingly, the memory access protocol and electrical characteristics of the communication interfaces may be part of one standard. In one example, the access protocol may be the RDMA protocol implemented in the communication interfaces, where the memory access protocol and the communication interfaces conform to an InfiniBand standard. In a second example, the memory access protocol may be Internet Wide Area RDMA Protocol (iWARP), where iWARP is implemented in the communication interfaces, and where the communication interfaces conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces, and where the communication interfaces conform to RoCE and Ethernet standards. In a third example, the memory access protocol may be a PCI bus-mastering protocol implemented in the communication interfaces, where the communication interfaces conform to a PCI standard. The memory access protocol, such as RDMA, may be layered directly over a transport protocol, such as TCP.

The region access logic 212, the client logic 312, and/or the allocation logic 412 may utilize multiple communication interfaces to provide resiliency against various communication failure modes. Communication failure modes may include failure of one or more communication interfaces, failure of one or more ports included in one or more communication interfaces, failure of a portion of the interconnect, such as an interconnect cable or interconnection fabric switch, and/or any other failure that may sever a network link between any two communication interfaces. The region access logic 212 may provide resiliency against communication failure modes using features of the communication interfaces. In a first example, the region access logic 212 may configure the communication interfaces to use an alternate path if a primary path experiences interconnect errors, such as using InfiniBand Automatic Path Migration. In a second example, the region access logic 212 may provide resiliency against communication failure modes by choosing communication modes that are by design resilient against interconnect errors, such as InfiniBand reliable connections, TCP connections, etc. Alternatively, or in addition, the region access logic 212 may provide resiliency against communication failure modes by establishing multiple active network links, and using one or more of the non-failing network links to provide connectivity. The multiple active network links may be selected to optimize redundancy versus failures. For example, the multiple network links may utilize different ports on different communication interfaces, such that a failure of one port or one communication interface may only cause one of the multiple active network links to fail.

In one or more examples, the region access logic 212 may additionally provide block-level access to the region 214 using any storage protocol now known or later discovered. A storage protocol may be any communications protocol used to transfer data between a block storage device or system, such as the memory appliance 110, and a device or system, such as the client 130, that stores data in, and/or retrieves data from, the block storage device or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic 212 may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 214 using the storage protocol may be slower than accessing the region 214 using the memory access protocol. In contrast to the memory access protocol, the processor 340 of the client 130 may interact with the storage controller 350 during the transfer of data to the block storage device 360 or system, where the storage controller implements the storage protocol. Therefore, the storage protocol is different from the memory access protocol.

By providing block-addressable client-side memory access and/or block-level access through the region access logic 212, the memory appliance 110 may be considered, in an example implementation, a block storage device. A block storage device may also be referred to as a block device. A block device stores data in blocks of a predetermined size, such as 512 or 1024 bytes. The predetermined size may be configurable. A block device is accessed via a software and/or hardware storage controller and/or a communication interface, such as the communication interface 230. Examples of other block devices include a disk drive having a spinning disk, a tape drive, a floppy disk drive, and a USB flash pen drive.

The region access logic 212 may subdivide the memory 210, and/or the backing store 260 into one or more regions. Each one of the regions, such as the region 214 in the memory 210 of the memory appliance 110, may be a configured area of storage that is accessible via any access protocol and/or storage protocol. Access protocols and storage protocols are described elsewhere in this disclosure.

The backing store 260 may include any block device. Examples of block devices include, but are not limited to, hard disks, CD-ROM drives, tape drives, solid state storage devices, flash drives, or any other mass storage device.

The client logic 312 and/or the allocation logic 412 may perform memory access operations on the region 214 in the memory 210 of the memory appliance 110 using client-side memory access over the memory access protocol. Alternatively or in addition, the client logic 312 and/or the allocation logic 412 may perform operations to discover the memory appliance 110 when connected, or to discover available regions that may be accessible on the memory appliance 110. Alternatively or in addition, the client logic 312 and/or the allocation logic 412 may perform administration operations to modify attributes or metadata, such as the region metadata 215, associated with the region 214. The operations may include sending region access logic requests, described elsewhere in this disclosure. In an example, the client logic 312 and/or the allocation logic 412 may perform an administration operation to set a human readable label associated with the region 214. In an example, the client logic 312 and/or the allocation logic 412 may perform an administration operation to change the operations that are available to the client 130 and/or to other clients. The administration operations may be used, for example, to coordinate shared access to the region by multiple clients.

The client logic 312, the allocation logic 412, and/or another logic may perform operations that communicate information to the observer logic 218 about a set of one or more memory access operations that were requested or that are to be requested by the client logic 312, the allocation logic 412, and/or another logic. For example, the client logic 312, the allocation logic 412, and/or another logic may transmit a notification message via the communication interface 330 of the client 130 and/or the communication interface 430 of the management server 120. The observer logic 218 may receive the notification message via the communication interface 230 of the memory appliance 110. The notification message may precede or follow the set of memory access operations requested by the client logic 312 and/or the allocation logic 412. The notification message may identify attributes of the set of memory access operations.

Alternatively or in addition, the client logic 312, the allocation logic 412, and/or another logic may perform memory access operations that are directly observable or identified by the observer logic 218. For example, the request to perform the memory access operation may include notification information, such as an RDMA write with immediate value operation. In addition to writing to the memory in the region 214, the write with immediate value operation may cause the observer logic 218 to receive a notification that includes the immediate value specified by the client logic 312 and/or the allocation logic 412 in the RDMA write with immediate value operation. The value may include one or more attributes of the memory access operation. For example, the value may indicate what portion of the memory 210 is written to during the RDMA write with immediate value operation. Alternatively or in addition, the client logic 212 and/or the allocation logic 412 may perform operations that create a condition at the memory appliance 110 that the observer logic 218 may check for. For example, the client logic 312 and/or the allocation logic 412 may perform a client-side memory access operation to store information about a set of memory access operations in a particular portion of the memory on the memory appliance 110. The information stored in the portion may include, for example, the offset, size, and/or type of each memory access operation performed. The observer logic may check the portion for updates in order to identify one or more attributes of the memory access operations.

The observer logic 218 may observe or otherwise identify the operations requested by the client logic 312, the allocation logic 412, and/or another logic that are performed on the region 214 and/or the memory appliance 110. The observer logic 218 may identify the requested operations based on direct communication between the memory appliance 110 and any of: the client 130, the management server 120, and/or another memory appliance. For example, the observer logic 218 may listen for incoming notification messages at the communication interface 230. Alternatively, or in addition, the observer logic 218 may passively monitor the operations requested by the client logic 312, the allocation logic 412, and/or another logic. For example, the observer logic 218 may listen for notification messages received as a result of operations performed by the client logic 312, the allocation logic 412, and/or another logic.

Alternatively, or in addition, the observer logic may check for conditions created by the client logic 312, the allocation logic 412, another logic, the communication interfaces, and/or another hardware component. For example, the observer logic 218 may read contents of one or more portions of the memory 210 that are accessible by the client 130 and/or the management server 120 using client-side memory access, by the communication interfaces, or by another hardware component. In an example, a first portion of the memory 210 may include one or more flags that indicate whether one or more second portions of the memory 210 have been updated by the memory access operations since the one or more second portions of the memory 210 were last copied to the backing store 260. In a second example, a first portion of the memory 210 may include one or more flags that indicate whether one or more second portions of the memory 210 have been read or written by the memory access operations since the last time the flags have been checked by the observer logic 218. In a third example, a first portion of the memory 210 may include one or more values that indicate how many times one or more second portions of the memory 210 have been read or written by the memory access operations since the last time the values have been checked by the observer logic 218.

In response to identifying a set of memory access operations, the observer logic 218 may take further action. In an example, further action may include determining statistics related to the memory access operations (including but not limited to the type of operation, the number of operations, the size of the affected memory, and/or memory locations of each operation). In a second example, further action may include tracking or identifying regions of the memory 210 that have been written to or otherwise affected by the memory access operations. The observer logic 218 may persist the contents of the affected regions of the memory 210 to the backing store 260, backing stores, and/or duplicate the contents of the affected regions of the memory 210 to another memory appliance, a block device, an external server, and/or a backup device. Alternatively, the observer logic 218 may take any other action related to the memory access operations.

The memory access operation may complete at the memory appliance 110 without waiting for the observer logic 218 to identify the memory access operation. Alternatively or in addition, the memory access operation may complete at the memory appliance 110 without waiting for the observer logic 218 to take any further action in response to identifying the memory access operation. Accordingly, the client logic 312 and/or the allocation logic 412 may perform a write operation to the region 214 in the amount of time that the request to perform the write operation travels over the interconnect 140 and the memory appliance 110 writes data to the memory. The overhead associated with storage protocols and/or writing the data to the backing store 260 may be avoided.

Mechanisms for observing or identifying the operations requested by the client logic 312 and/or the allocation logic 412 and the actions taken in response to identifying the operations may take any of numerous forms. A particular mechanism may balance tradeoffs between individual operation latency, operations per second from an individual client and/or management server, aggregate operations per second from multiple clients and/or management servers, demand placed upon compute resources of the clients, demand placed on compute resources of the management servers, and demand placed on compute resources of the memory appliance or on the observer logic, among others.

Alternatively or in addition the observer logic 218 may not observe or identify the memory access operations performed. Alternatively or in addition, the observer logic 218 may take one or more actions without specific knowledge of the memory access operations. For example, the observer logic 218 may persist the entire contents of the region 214 to the backing store 260; duplicate the entire contents of the region 214 to another storage device, external server, and/or backup device; and/or take some other action related to the region 214. Alternatively or in addition, the observer logic 218 may compare the contents of the region 214 with the contents of the backing store 260. Alternatively or in addition, the observer logic 218 may use computed hash values to determine which areas of the region 214 have been modified. A computed hash value may be a computed output which is expected with high probability to have a different value for two different input buffers and which may be smaller than one or both input buffers. Examples of computed hash values include checksums, cyclic redundancy check codes, and cryptographic hash codes. The observer logic 218 may perform actions without knowledge of the memory access operations periodically, prior to system shutdown, according to a schedule, or in response to a particular event, such as a hardware interrupt.

Alternatively, a client-side memory access may be performed as described in this disclosure, and then the client logic 312 may choose to wait for an additional notification from the observer logic 218 that the further actions are complete. For example, the client-side memory access may be a first client-side memory access, and the further actions may include replicating data from the affected regions to one or more additional memory appliances using additional client-side memory accesses between the memory appliances. Waiting for the additional notification for the first client-side memory access provides assurance to the client logic 312 that the affected regions have been synchronized between the multiple memory appliances. If an application is performing activities that may benefit from this assurance, it may be beneficial to wait for the additional notification. While waiting for the additional notification does increase the overall latency of the first client-side memory access by the time it takes for the observer logic 218 to be notified and replicate the affected regions and the time it takes to receive the additional notification, the client logic 312 still does not need to wait for the observer logic 218 of the additional memory appliances to be notified or take any action.

The application logic 314, the client logic 312, the allocation logic 412, and/or another logic may perform data translation on the data being read and/or written to the region 214. Alternatively, or in addition, the communication interfaces 230 330 430, the memory controllers 220 320 420, the storage controllers 250 350 450, and/or the backing stores 260 360 460 may perform data translation. Data translation may include manipulating the data being read and/or written.

In a first example, data translation may include compressing the data being written to the region 214 and/or decompressing the data being read from the region 214. Compression and/or decompression may be performed using any one or more compression schemes, such as Lempel-Ziv (LZ), DEFLATE, Lempel-Ziv-Welch (LZW), Lempel-Ziv-Renau (LZR), Lempel-Ziv-Oberhumer (LZO), Huffman encoding, LZX, LZ77, Prediction by Partial Matching (PPM), Burrows-Wheeler transform (BWT), Sequitur, Re-Pair, arithmetic code, and/or other method and/or scheme known now or later discovered which may be used to recoverably reduce the size of data.

In a second example, data translation may include encrypting the data being written to the region 214 and/or decrypting the data being read from the region 214. Encryption and/or decryption may be performed using any one or more encryption schemes and/or ciphers, such as symmetric encryption, public-key encryption, block ciphers, stream ciphers, substitution ciphers, transposition ciphers, and/or any other scheme which may be used to encode information such that only authorized parties may decode it. One or more encryption keys for the one or more encryption schemes may be included in the access parameters for the region 214.

In a third example, data translation may include performing error detection and/or error correction upon the data being written to the region 214 and/or the data being read from the region 214. Error detection and/or error correction may be performed using any one or more error detection and/or error correction schemes, such as repetition codes, parity bits, checksums, cyclic redundancy checks, cryptographic hash functions, error correcting codes, forward error correction, convolutional codes, block codes, Hamming codes, Reed-Solomon codes, Erasure Coding-X (EC-X) codes, Turbo codes, low-density parity-check codes (LDPC), and/or any other scheme which may be used to detect and/or correct data errors.

Error detection and/or error correction may include performing additional calculations to confirm the integrity of the data written to and/or read from the region. For example, one or more digests, described elsewhere in this document, may be written to the region 214 and/or to the region metadata 215 for one or more corresponding portions of the region 214. When reading the corresponding portion, if the stored digest does not match the digest which can be computed from the read data for the portion, then the read may be considered failed and/or the portion may be considered corrupted. Alternatively or in addition, the data may be corrected based upon the one or more digests and/or error correcting codes.

Further examples may include performing multiple types of data translation. For example, the client logic or another entity may encrypt the data being written to the region 214 and compute one or more error detecting and/or error correcting codes for the data and/or for the encrypted data. Alternatively or in addition, the client logic or another entity may decrypt the data being read from the region 214 and may perform error detection and/or error correction upon the data and/or encrypted data being read from the region.

The application logic 314, the client logic 312, the allocation logic 412, and/or another logic may perform data monitoring on the data being read and/or written to the region 214. Alternatively, or in addition, the communication interfaces, the memory controllers, the storage controllers, and/or the backing stores may perform data monitoring. Data monitoring may include observing the data being read and/or written. In an example, data monitoring may include performing virus scanning on data being read from and/or written to the region 214. In a second example, data monitoring may include performing malware detection on data being read from and/or written to the region 214. In a third example, data monitoring may include performing policy enforcement, such as monitoring for forbidden data patterns and/or strings, on data being read from and/or written to the region 214. In a fourth example, data monitoring may include performing data indexing on data being read from and/or written to the region 214. For example, an index for a first region may be created in a second region, the index providing fast lookup of data in the first region.

Presence of management servers, memory appliances, and/or clients may be detected automatically by the allocation logic 412, the region access logic 212, and/or the client logic 312. When the management server 120, the memory appliance 110, and/or the client 130 is detected by the allocation logic 412, the region access logic 212, and/or the client logic 312, it may become known to the allocation logic 412, the region access logic 212, and/or the client logic 312 that detected it. To facilitate being detected, the allocation logic 412, the region access logic 212, and/or the client logic 312 may transmit a hello message upon one or more interconnects 140 upon startup, periodically, and/or upon receiving a presence detection request message. Upon receiving a hello message, the allocation logic 412, the region access logic 212, and/or the client logic 312 may detect the management server 120, the memory appliance 110, and/or the client 130 that sent the hello message. To facilitate detecting management servers, memory appliances, and/or clients, the allocation logic 412, the region access logic 212, and/or the client logic 312 may send a presence detection request message. A presence detection request message may include information about the characteristics or configurations of the management servers and/or memory appliances including the allocation logic 412 and/or region access logic 212 that may respond. Alternatively or in addition, a presence detection request message may include an indication of whether only management servers, only memory appliances, only clients, or some combination of these may respond.

Alternatively, or in addition, the allocation logic 412, the region access logic 212, and/or the client logic 312 may register the presence of the corresponding management servers, memory appliances, and/or clients with one or more registration servers. A registration server may be an InfiniBand subnet administrator, a Domain Name System (DNS) server, a Multicast DNS (mDNS) server, Service Location Protocol (SLP) directory agent, an Active Directory Server, or any other server capable of receiving and/or distributing information about management servers, memory appliances, and/or clients. Alternatively, or in addition, the allocation logic 412, the region access logic 212, and/or the client logic 312 may include information about the characteristics and/or configuration of the corresponding management servers, memory appliances, and/or clients when registering their presence with the registration server. The allocation logic 412, the region access logic 212, and/or the client logic 312 may detect management servers, memory appliances, and/or clients by querying the one or more registration servers.

Alternatively, or in addition, presence of management servers and/or memory appliances may be specified by an administrator using a user interface. The user interface may be a graphical user interface, a web interface, a command-line interface, an application programming interface (API), and/or any other type of interface or combination of interfaces known now or later discovered.

Management servers may be associated with one or more memory appliances. Memory appliances may be associated with one or more management servers. Management servers may additionally be associated with zero or more other management servers. For example, the management server 120 may be associated with another management server that may function as a backup management server in case the management server 120 fails. The backup management server may maintain copies of data of the management server 120, including, but not limited to, the external memory allocation metadata 414 and/or the region metadata 215. The backup management server may have a copy of the backing store 460 of the management server 120. The backup management server may obtain such copies of data at a predetermined schedule. Alternatively, or in addition, the backup management server may obtain a copy of the data in response to an event, such as modification of the data of the management server 120. Alternatively, or in addition, the backup management server may obtain a copy of the data from the management server 120 in response to a request from an administrator, such as via the user interface. The backup management server 120 may obtain data of the management server 120 as described elsewhere in this disclosure.

Associations between management servers and memory appliances may be specified by an administrator using a second user interface, which may be part of the user interface described earlier. The second user interface may be a graphical user interface, a web interface, a command-line interface, an API, and/or any other type of interface or combination of interfaces known now or later discovered.

The memories of the memory appliances associated with the management server 120 may be part of a memory pool. Alternatively, or in addition, the memories of the memory appliances known to the allocation logic 412 of the management server 120 may be part of the memory pool. Alternatively, or in addition, the memories of the memory appliances associated with multiple management servers and/or known to multiple allocation logics may be part of the memory pool. The pool of memory, or the memory pool, may be a collection of allocatable memory that spans one or more memory appliances.

Alternatively, or in addition, associations between management servers and memory appliances may be determined automatically. Automatic associations between management servers and memory appliances may be determined based upon characteristics or configurations of the management servers, the memory appliances, or both. Characteristics or configurations of the management server 120, the memory appliance 110, and/or the client 130 may include hardware revisions, firmware revisions, software revisions, protocol revisions, physical location, logical location, network location, network topology, network bandwidth, network capacity, network utilization, logical grouping, labels, names, server/appliance health, server/appliance utilization, server/appliance overall performance rating, processor type, number of processors, processor speed, memory bandwidth, memory capacity, memory utilization, memory health, backing store presence, backing store bandwidth, backing store input/output operations per second (IOPS), backing store latency, backing store capacity, backing store utilization, backing store health, battery presence, battery type, battery chemistry, battery capacity, battery utilization, battery % charged, battery time remaining, battery health, or any other characteristic or combination of characteristics of the management server 120, the memory appliance 110, and/or the client 130. In an example, the allocation logic 412 may automatically associate the management server 120 with memory appliances in the same physical rack. In another example, the allocation logic 412 may automatically associate the management server 120 with memory appliances sharing the same protocol version. In another example, the allocation logic 412 may automatically associate the management server 120 with memory appliances with appliance health, memory health, backing store health, and/or battery health above or below a threshold or set of thresholds. The thresholds may be configurable by the administrator via the user interface, or may be predetermined when the management server starts up.

The allocation logic 412 may address region access logic requests to the region access logic 212 included in one or more memory appliances. The region access logic requests may be requests handled via an interface of the region access logic 212. In one example, the region access logic requests may be messages transmitted via the communication interface(s) 230, 330, 430. In another example, the region access logic requests may be programmatic interfaces, such as in an API. Other examples may use any other interface known now or later discovered for conveying the region access logic requests. The memory appliances including the region access logic 212 to which the requests are sent may be associated with the management servers including the allocation logic 412 and/or known by the allocation logic 412. For example, region access logic requests received by the region access logic 212 may include requests to create the region 214, requests to resize the existing region 214, requests to restore contents of the region 214 from the backing store 260, requests to get the status of the memory 210 included in the memory appliance 110, requests to get health status from the memory appliance 110, requests to persist the region 214 to the backing store 260 and remove the region 214 from the memory 210, requests to destroy the region 214, requests to get a list of available regions, requests to get information for the region 214, requests to modify settings for the region 214, requests to configure the memory appliance 110, requests to migrate the region 214, and/or any other request related to the memory appliance 110 and/or the regions included in the memory 210 of the memory appliance 110.

The region access logic requests may be communicated over any communications protocol and/or interface capable of carrying messages. For example, the region access logic requests may be carried over UDP datagrams, a TCP connection, an SSL connection, InfiniBand reliable connections, RoCE, iWARP, HTTP, or any other communications protocol known now or later discovered. Alternatively, or in addition, the region access logic requests may be carried over remote procedure calls, such as using XML-RPC, SOAP, CORBA, Java Remote Method Invocation (Java RMI), Representational State Transfer (REST), JavaScript Object Notation (JSON) over REST, and/or any other remote procedure call protocol. Alternatively, or in addition, the region access logic requests may be carried over a communication protocol based on client-side memory access, such as by writing messages into a buffer on the memory appliance 110 via client-side-memory access. Alternatively, or in addition, the region access logic requests may be carried via invoking methods and/or interfaces in an API. For example, if the allocation logic 412 and region access logic 212 are co-located or combined, the region access logic requests may be methods and/or interfaces in an API. The allocation logic 412 and region access logic 212 may be co-located in examples where the memory appliance 110 also functions as the management server 120, or, alternatively, the management server 120 also functions as the memory appliance 110.

Upon receiving a request to create the region 214, the region access logic 212 may allocate a portion of the memory 210 included in the memory appliance 110 for the region 214. Allocating a portion of the memory 210 may include initializing the contents of the allocated memory. Alternatively, or in addition, the memory being allocated may be pre-initialized, such as by an operating system. Alternatively, or in addition, the memory being allocated may be partially pre-allocated, such as a free list including one or more portions of pre-allocated and/or pre-initialized memory. Alternatively, or in addition, the region access logic 212 may configure the communication interface 230 for the region 214 without allocating the entire portion of the memory for the region 214 and/or without initializing the contents of the memory. The region access logic 212 may configure the communication interface 230 to treat un-allocated and/or un-initialized portions as not present. Attempting to access data that is not present using client-side memory access may fail. Alternatively, or in addition, attempting to access data that is not present using client-side memory access may cause the processor 240 to be notified. Upon being notified, the processor 240 may take some action related to the attempt to access data that is not present, such as allocating a portion of the memory 210 to satisfy the attempt to access data that is not present and/or initializing the portion of the memory. The region access logic 212 may also associate an identifier with the region 214. The identifier may be chosen by the region access logic 212 or it may be included in the request to create the region 214. Additionally, the region access logic 212 may create, update, and/or associate metadata, such as the region metadata 215, with the region 214. The region access logic 212 may respond to the request to create the region 214 with a response message. The response message may include the identifier associated with the region 214 and/or a status, indicating whether the operation was successful.

Upon receiving a request to resize the existing region 214, if the region 214 is being expanded, the region access logic 212 may allocate a portion of the memory 210 of the memory appliance 110. Allocating a portion of the memory 210 may include initializing the contents of the allocated memory. Alternatively, or in addition, the memory being allocated may be pre-initialized, such as by an operating system. Alternatively, or in addition, the memory being allocated may be partially pre-allocated, such as a free list including one or more portions of pre-allocated and/or pre-initialized memory. The size of the portion of the memory may be related to the size of the expanded region minus the size of the existing region 214. For example, the size of the portion of the memory may be the size of the expanded region minus the size of the existing region 214 rounded up to the nearest unit of allocation, such as a page, a huge page, a slab, and/or any other unit of allocation. The units of allocation may have respective predetermined sizes. The predetermined sizes may vary, such as based on an operating system being used by the client 130, the memory appliance 110, and/or the management server 120. Alternatively, or in addition, the size of the portion of the memory may be specified by the request to resize the existing region 214. Alternatively, or in addition, the request to resize the existing region 214 may specify an offset within the region 214 where the allocated portion may appear. For example, the request to resize the existing region 214 may be re-allocating a portion of the region 214 that was previously de-allocated by a different request to resize the same region 214. The region access logic 212 may assign the allocated portion to the region 214. The region access logic 212 may update the region metadata 215 to include references to the allocated portion of the memory 210.

Upon receiving the request to resize the existing region 214, if the region 214 is being contracted, the region access logic 212 may update the region metadata 215 to remove references to a portion of the memory allocated to the region 214 and/or may de-allocate the portion of the memory. De-allocating may include listing the de-allocated portion on the free list. The portion of the memory may be the portion at the logical end of the region 214, at the logical beginning of the region 214, and/or at any other logical location within the region 214. The portion of the region to be removed may be specified by the request to resize the existing region 214. For example, the request to resize the existing region 214 may specify that the data at the end of the region 214 may be discarded. Alternatively, or in addition, the request to resize the existing region 214 may specify that the data at the beginning of the region 214 may be discarded. Discarding data at a location other than the end of the region 214 may cause the offsets of data after the discarded data to change. For example, removing 100 MiB (mebibyte) from the region starting at an offset of 200 MiB may cause data that previously occurred at an offset of 300 MiB to instead occur at an offset of 100 MiB. Alternatively, discarding data at a location other than the end of the region 214 may cause the offsets of data after the discarded data to stay the same. The region access logic 212 may configure the communication interface 230 to treat the discarded data as not-present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory and/or initializing the portion to satisfy the attempt to access the data that is not present.

Upon receiving a request to restore the contents of the region 214 from the backing store 260, the region access logic 212 may allocate a portion of the memory 210 included in the memory appliance 110 for the region 214. The region access logic 212 may copy the contents of persisted data related to the region 214 into the allocated memory. Alternatively, or in addition, the region access logic 212 may associate portions of the backing store 260 with portions of the region 214 without immediately allocating the portion of the memory and/or without immediately copying the contents by configuring the communication interface 230 to treat the portions of the region 214 as not present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory to satisfy the attempt to access data that is not present, initializing the portion of the memory, and/or copying the contents of persisted data related to the portion into the portion. The region access logic 212 may respond to the request to restore the contents of the region 214 from the backing store 260 with a response message. The response message may include the identifier associated with the region 214 and/or a status, indicating whether the operation was successful.

Upon receiving a request to get the status of the memory 210 included in the memory appliance 110, the region access logic 212 may respond to the request with a response message. The response message may include one or more attributes of the memory 210 included in the memory appliance 110. The attributes may include the total memory available to hold regions, the amount of memory currently in use by existing regions, the amount of memory available to hold additional regions, and/or any other attributes of the memory 210 included in the memory appliance 110.

Upon receiving a request to get health status from the memory appliance 110, the region access logic 212 may respond to the request with a response message. The response message may include one or more attributes describing the health of the memory appliance 110, of components included in the memory appliance 110, and/or of components connected to the memory appliance 110. Examples of health that may be described by the attributes include temperatures, voltages, cooling system health, backing store status, memory health, CPU health, battery capacity, projected battery run time, or any other hardware, firmware, or software status and/or health relevant to the health of the memory appliance 110. Temperatures may include CPU temperatures, integrated circuit temperatures, circuit board temperatures, chassis intake temperatures, chassis output temperatures, power supply temperatures, uninterruptible power supply (UPS) temperatures, battery temperatures, backing store temperatures, and/or any other temperatures relevant to the health of the memory appliance 110. Voltages may include CPU voltages, integrated circuit voltages, circuit board voltages, power supply input voltages, power supply output voltages, UPS input voltages, UPS output voltages, battery voltages, and/or any other voltages relevant to the health of the memory appliance 110. Cooling system health may include fan speeds, liquid coolant temperatures, liquid coolant flow rates, facility cooling health, and/or any other status related to the ability to maintain stable temperatures. Backing store status may include status of individual storage devices included in the backing store, status of hardware and/or software storage controllers, status of logical volumes included in the storage devices, status of logical associations between storage devices, status of logical associations between logical volumes, and/or any other status related to the ability to reliably store data in the backing store 260. Logical associations may include software or hardware mechanisms used to aggregate storage devices or logical volumes and/or to provide redundancy and/or resiliency. For example, a logical association may be a redundant array of independent disks (RAID). Memory health may include number and/or source of memory errors, memory redundancy status, and/or any other status related to the ability to reliably store data in the memory. Memory errors may include recoverable error correcting code (ECC) errors, unrecoverable ECC errors, rank spared indications, mirror broken indications, and/or any other errors and/or indications reported by the memory and/or memory controller. CPU health may include CPU errors, CPU voltage/frequency scaling mode, and/or any other status related to the CPU's ability to reliably execute instructions. CPU errors may include hardware watchdog expirations, machine checks, cache ECC errors, processor faults, and/or any other error or indication reported by the CPU and/or CPU monitoring hardware.

Upon receiving a request to persist the region 214 to the backing store 260 and remove it from memory 210, the region access logic 212 may copy the contents of the region 214 to a portion of the backing store 260. The portion of the backing store 260 may be determined at the time the request to persist the region 214 to the backing store 260 and remove it from the memory 210 is received. Alternatively, the portion may have been determined in advance, such as when the region 214 was created, and/or when the region 214 was configured. After the contents of the region 214 are copied to the portion of the backing store 260, the region access logic 212 may de-allocate the portion of the memory included in the memory appliance 110 for the region 214. De-allocating may include listing the de-allocated portions on a free list, which indicates portions of the memory 210 that have not been allocated to any particular region. Alternatively, or in addition, as the contents of portions of the region 214 are copied to the backing store 260, the region access logic 212 may selectively de-allocate the portions of the region 214 that have already been copied to the backing store 260. Alternatively or in addition, if portions of the region 214 have already been copied to the backing store 260 prior to receiving the request to persist the region 214 to the backing store 260 and remove it from memory 210, the region access logic 212 may not copy the portions of the region 214 that have already been copied to the backing store 260. The region access logic 212 may respond to the request to persist the region to the backing store 260 and remove it from memory 210 with a response message. The response message may include the identifier associated with the region 210 and/or a status, indicating whether the operation was successful.

Upon receiving a request to destroy the region 214, the region access logic 212 may de-allocate the portion of the memory included in the memory appliance 110 for the region 214. De-allocating may include listing the de-allocated portions on the free list. Alternatively, or in addition, the region access logic 212 may delete any persisted data related to the region 214 included in the backing store 260. The region access logic 212 may respond to the request to destroy the region 214 with a response message. The response message may include the identifier associated with the region 214 and/or a status, indicating whether the operation was successful.

Upon receiving a request to get a list of available regions, the region access logic 212 may respond to the request with a response message. The response message may include a number of available regions and/or attributes related to the available regions. Available regions may include regions that are included in the memory 210, regions that are included in the backing store 260, and/or regions that are partially included in the memory 210 and/or backing store 260. The attributes related to an available region, such as the region 214, may include the identifier associated with the region, the size of the region, the status of the region, information about external memory allocations that reference the region, and/or any other information related to the region. The status of the region 214 may include one or more indications of whether the region is included in the memory 210, whether the region 214 is included in the backing store 260, whether the contents of the region 214 are being persisted to the backing store 260, whether the contents of the region 214 are being restored from the backing store 260, and/or whether the contents of the region 214 are being transferred to or from another memory appliance or storage device. Information about an external memory allocation may include an identifier for the external memory allocation, information about the external memory allocation, and/or information about the region's role in the external memory allocation. For example, an external memory allocation may include metadata describing a logical relationship between the regions referenced by the external memory allocation. In one example, the logical relationship could be a concatenation of regions located in different memory appliances, the metadata describing the logical relationship may include an indication that concatenation is in use and/or a logical address within the external memory allocation at which the region's data logically exists. Alternatively, or in addition, the logical relationship could be a striping relationship, such as RAID-0; a mirroring relationship, such as RAID-1; a parity relationship, such as RAID-2, RAID-3, RAID-4, RAID-5, or RAID-6; a partial data redundancy relationship, a combination of relationships, such as striping with mirroring; or any other relationship between regions known now or later discovered.

Upon receipt of a request to get information for the region 214, the region access logic 212 may respond to the request with a response message. The response message may include information related to the region 214. The information related to the region 214 may include all of or a portion of the region metadata 215. Alternatively, or in addition, the information related to the region 214 may be derived from the region metadata 215. Alternatively, or in addition, the information related to the region 214 may be different depending upon parameters included in the request to get information for the region 214. For example, the parameters may include an indication of which portion of the metadata 215 may be included in the information related to the region 214.

Upon receiving a request to modify settings for the region 214, the region access logic 212 may update the region metadata 215 to reflect the modified settings. For example, the request to modify settings for the region 214 may set a human readable label to be associated with the region 214, modify access parameters, and/or modify other portions of the region metadata 215. The region access logic 212 may restrict which parts of the region metadata 215 may be modified. For example, the region access logic 212 may use the access parameters to control which parts of the region metadata 215 may be modified. If the region access logic 212 determines that the requested changes are not allowed, the request to modify settings of the region 214 may fail. In another example, the request to modify settings of the region 214 may include a request to enable replication and/or may include identifiers for regions and/or memory appliances to which the data of the region 214 of the memory appliance 110 may be replicated. When replication is enabled, the observer logic 218 may replicate affected portions of the region 214 to the regions and/or memory appliances indicated in the request to modify settings for the region 214 using the methods described throughout. The region access logic 212 may respond to the request to modify settings for the region 214 with a response message. The response message may include the identifier associated with the region 214, information related to the modified region metadata 215, and/or a status, indicating whether the operation was successful.

Upon receiving a request to configure the memory appliance 110, the region access logic 212 may cause one or more characteristics and/or configurations of the memory appliance to be updated to reflect the requested configuration. Alternatively, the characteristics and/or configurations may not be updated, such as if the request to configure the memory appliance 110 indicates that one or more characteristics and/or configurations are to be retrieved but not updated.

In addition to those listed elsewhere in this disclosure, characteristics and/or configurations of the memory appliance may include: memory appliance name, system time, time zone, time synchronization settings, time server(s), network configuration, hostname, power configuration, battery policy, Uninterruptible Power Supply (UPS) configuration, disk policy, backing store configuration, persistence configuration, persistence mode, customer-support configuration(s), service configuration(s), user interface configuration, user configuration, user-group configuration, health monitoring configuration(s), network monitoring configuration(s), SNMP configuration, logic version, software version, firmware version, microcode version, and/or any other aspect of the memory appliance which may be configured and/or changed. For example, the region access logic 212 and/or another logic may update the system time, time zone, time synchronization settings, and/or time servers(s) in response to the request to configure the memory appliance 110. In another example, the region access logic 212 and/or another logic may update the firmware version, such as by modifying one or more logics of the memory appliance 110. Alternatively or in addition, characteristics and/or configurations may include associations between memory appliances, management servers, and/or clients. For example, the region access logic may cause the memory appliance 110 to be associated with a management server 120, such as a backup management server.

In one example, the region access logic 212 may cause one or more logic, software, firmware, and/or microcode versions of the memory appliance 110 to be changed in response to the request to configure the memory appliance 110. The request to configure the memory appliance 110 may indicate the desired version(s), may provide the desired logic, hardware description language, software, firmware, and/or microcode, and/or may provide a network location where the desired logic, hardware description language, software, firmware, and/or microcode may be downloaded by the region access logic 212 (and/or another logic, such as a logic-updating logic). Upon retrieving the desired logic, hardware description language, software, firmware, and/or microcode, the region access logic 212 and/or another logic may execute and/or trigger one or more logic, software, firmware, and/or microcode update procedures. For example, the region access logic 212 and/or another logic may update one or more of the logics of the memory appliance 110 with the logic, hardware description language, software, firmware, and/or microcode. Upon updating the one or more of the logics, the region access logic 212 and/or another logic may cause the corresponding logic(s) to be restarted and/or reloaded. Alternatively or in addition, the region access logic and/or another logic may restart all logics of the memory appliance, such as with a system reboot.

The region access logic 212 and/or another logic may check the integrity of the software, firmware, and/or microcode one or more times. For example, the region access logic 212 may check the integrity of the software, firmware, and/or microcode upon retrieving the software, firmware, and/or microcode; may check the integrity of one or more updated logics upon updating; and/or may perform one or more diagnostics tests upon updating the logic(s) and/or upon starting (and/or restarting) the updated logic(s). For example, each updated logic may perform a power-on self-test upon being restarted and/or rebooted. If one or more integrity tests fail, if one or more diagnostics fail, if one or more logics fail to initialize upon being restarted and/or rebooted, and/or if any other error occurs while updating one or more logics, the logics may be returned to their original state and/or the request to configure the memory appliance 110 may fail. For example, the memory appliance may maintain a backup-copy of the logic(s) being updated and may restore the logic(s) from the backup-copy to return to the original state. Alternatively or in addition, the memory appliance 110 may include a recovery logic which may include similar logic for causing the one or more software, firmware, and/or microcode versions of the memory appliance 110 to be changed in response to the request to configure the memory appliance 110. The recovery logic may be write-protected, such that it may not be modified in response to the request to configure the memory appliance 110.

The region access logic 212 may respond to the request to configure the memory appliance 110 with a response message. The response message may include the values or one or more characteristics and/or configurations and/or a status, indicating whether the operation was successful.

Figure 5A:
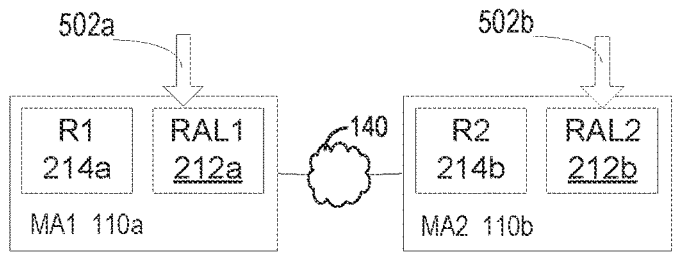
FIG. 5A and FIG. 5B illustrate an example scenario of a request to migrate a region.
Figure 5B:
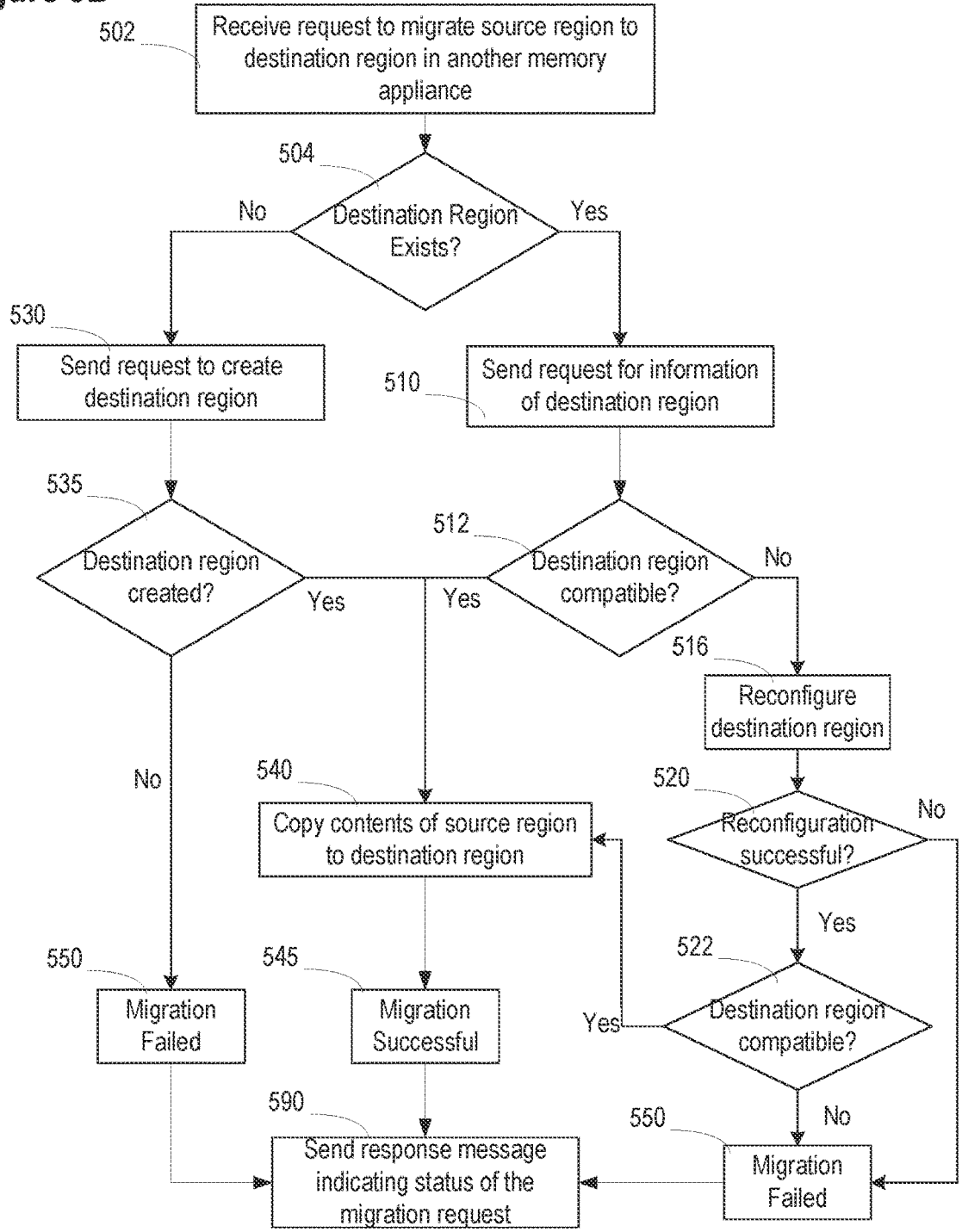

FIGS. 5A and 5B illustrate an example scenario of a request to migrate a region. A request to migrate a region may indicate a request 502a to migrate data from a first region 214a included in a memory of a first memory appliance, 110a to a second region 214b included in a memory of a second memory appliance 110b, as illustrated in FIG. 5A. The request to migrate the first region 214a to the second region 214b may be a request 502a received by the region access logic 212a of the first memory appliance 110a and/or a request 502b received by the region access logic 212b of the second memory appliance 110b.

FIG. 5B illustrates an exemplary flowchart of steps taken upon receipt of a request 502a to migrate the first region 214a by the region access logic 212a of the first memory appliance 110a (502). The region access logic 212a may determine if the second region has to be newly created within the second memory appliance (504). The request 502a to migrate the first region 214a may include an identifier for the second memory appliance 110b. Alternatively or in addition, the request 502a to migrate the first region 214a may include an identifier for the second region 214b. Alternatively, or in addition, the request 502a to migrate the first region 214a may indicate creating the second region 214b at the second memory appliance 110b, in case the second region 214b does not exist (530). If creation of the second region 214b fails, the migration request 502a may fail (530, 550). Alternatively, if the second region 214b is successfully created, the contents of the first region 214a may be transferred to the second region 214b as part of a successful migration (540, 545).

If the request 502a to migrate the first region 214a includes the identifier for the second region 214b, the region access logic 212a may send a request to get a list of available regions and/or a request to get information of the second region 214b to the region access logic 212b of the second memory appliance 110b (510). The received information of the second region 214b may be analyzed to determine if the second region 214b is compatible to complete the migration request 502a (512). For example, if the response to the request to get the list of available regions indicates failure and/or does not include the identifier for the second region 214b, then the request 502a to migrate the first region 214a may fail (550). Alternatively, or in addition, if the response to the request to get information for the second region 214b indicates failure and/or includes information indicating that the second region 214b cannot be used to hold all of the data of the first region 214a, then the request 502a to migrate the first region 214a may fail (550).

Information indicating that the second region 214b is incompatible for completion of the migration request 502a, such as cannot be used to hold all of the data of the first region 214a, may include a size of the second region 214b that is smaller than the size of the first region 214a, access permissions for the second region 214b that indicate that the first memory appliance 110a may not write to the second region 214b, or any other limiting information. In such cases of incompatibility, the first memory appliance 110a may request reconfiguring the second region 214b so as to conform the second region 214b for the migration (516). For example, if the size of the second region 214b is smaller than the size of the first region 214a, the region access logic 212a of the first memory appliance 110a may send a request to resize the second region 214b to the region access logic 212b of the second memory appliance 110b. If the response to the reconfiguration request, such as the request to resize the second region 214b, indicates failure (520), the request 502a to migrate the first region 214a may fail (550). If the reconfiguration is successful, the first memory appliance 110a may confirm that the second region 214b is now compatible for the migration (522). Once compatibility is confirmed, the region access logic 212a may attempt to perform a first client-side memory access to write data from the first region 214a to the second region 214b (540) and on successful completion, mark the migration as successful (545).

Copying data from the first region 214a to the second region 214b may further involve transferring any changes that may be made to the first region 214a which are not captured by the first client-side memory access (540). For example, one or more clients 130 may continue to access the region 214a during the client-side memory access, including writing to the region 214b. Concurrently with the client-side memory access, the observer logic 218a of the first memory appliance 110a may observe which portions of the first region 214a are modified during the client-side memory access. Upon completing the first client-side memory access, the region access logic 212a may attempt to perform client-side memory access to write the modified portions from the first region 214a to the second region 214b (540). The region access logic 212a and observer logic 218a may repeat this procedure until no portions are left to be migrated. Alternatively, or in addition, the region access logic 212a of the first memory appliance 110a may modify the access permissions of the first region 214a to prohibit writing additional changes to the first region 214a. For example, the access permissions may be changed after the number or total data size of the portions left to be migrated is above or below a configured threshold. The migration may complete when there are no portions left to be migrated. If the one or more attempts to perform client-side memory access fails, the request to migrate a region may fail.

Upon receipt of the request 502b to migrate the first region 214a by the region access logic 212b of the second memory appliance 110b, similar steps may be performed by the second memory appliance 110b. The region access logic 212b may determine if a new region needs to be created (504). The request to migrate the first region 214a may include an identifier for the first memory appliance 110a and/or the first region 214a. Alternatively or in addition, the request to migrate the region may include an identifier for the second region 214b. Alternatively, or in addition, the request 502b to migrate the first region 214a may indicate that a new region may be created at the second memory appliance 110b. The region access logic 212b may send a request to get a list of available regions and/or a request to get information for the first region to the region access logic 212a of the first memory appliance 110a. If the response to the request to get a list of available regions indicates failure and/or does not include the identifier for the first region 214a, then the request 502b to migrate the first region may fail (550). Alternatively, or in addition, if the response to the request to get information for the first region 214a indicates failure and/or includes information indicating that the second region 214b cannot be used to hold all of the data of the first region 214a, then the request 502b to migrate the first region 214a may fail (550). Information indicating that the second region 214b is incompatible for completion of the migration request 502b, such as, cannot be used to hold all of the data of the first region 214a, may include a size of the first region 214a that is larger than the size of the second region 214b, access permissions for the first region 214a that indicate that the second memory appliance 110b may not read from the first region 214a, or any other incompatibility criteria (512). In such cases of incompatibility, the second memory appliance 110b may reconfigure the second region 214b so as to conform the second region 214b for the migration 516). For example, if the size of the second region 214b is smaller than the size of the first region 214a, the region access logic 212b of the second memory appliance 110b may attempt to resize the second region 214b using the methods and/or logic of the request to resize an existing region. If the attempt to resize the second region 214b fails, the request 502b to migrate a region may fail. In case, the reconfiguration is successful, the second memory appliance 110b may confirm that the second region 214b is now compatible for the migration (520, 522). Upon ensuring compatibility of the regions, the region access logic 212b may attempt to perform client-side memory access to read data from the first region 214a into the second region 214b and on successful completion, mark the migration as successful (522, 540, 545). If the attempt to perform client-side memory access fails, the request 502b to migrate a region may fail (550).

Prior to starting the client-side memory access, the region access logic 212b of the second memory appliance 110b may send a request to modify settings for the first region 214a to the region access logic 212a of the first memory appliance 110a. The request to modify settings for the first region 214a indicating that replication may be enabled from the first region 214a to the second region 214b. If the response to the request to modify settings for the first region 214a indicates failure, the request 502b to migrate the first region 214a may fail.

Upon completing the client-side memory access, the region access logic 212b of the second memory appliance 110b may send one or more requests to get information for the first region 214a to the region access logic 212a of the first memory appliance 110a, the requests to get information for the first region 214a requesting information about how much data has been written to the first region 214a but not yet replicated to the second region 214b. If the response to one or more of the requests to get information for the first region indicates failure, the request 502b to migrate the first region 214a may fail. Alternatively, one or more of the requests to get information for the first region 214a may be retried. The region access logic 212b of the second memory appliance 110b may send the requests to get information for the first region 214a until the response to one or more of the requests to get information for the first region 214a indicates that no data has been written to the first region 214a that is not replicated to the second region 214b. Alternatively, or in addition, the region access logic 212b of the second memory appliance 110b may send a second request to modify settings for the first region 214a to the region access logic 212a of the first memory appliance 110a, the second request to modify settings for the first region 214a requesting that the access permissions of the first region 214a be changed to prohibit additional changes to the first region 214a. For example, the access permissions may be changed after the number or total data size of the portions left to be migrated is above or below a configured threshold. If the response to the second request to modify settings for the first region 214a indicates failure, the request 502b to migrate the first region 214a may fail. The migration 502b may complete when there are no portions left to be migrated.

The region access logic 212a and/or 212b, that receives a request to migrate a region, may respond to the request 502a and/or 502b with a response message. The response message may include the identifier associated with the first region 214a, the identifier associated with the second region 214b, and/or a status, indicating whether the operation was successful.

The client logic 312 of the client 130 may transmit allocation logic requests to the allocation logic 412 included in the management server 120. Allocation logic requests may include requests to find available memory appliances, requests to query available space on a memory appliance, requests to create an external memory allocation, requests to resize an existing external memory allocation, requests to renew an external memory allocation, requests to destroy an external memory allocation, requests to persist and free an existing external memory allocation, requests to list existing external memory allocations, requests to get information regarding an external memory allocation, requests to restructure an external memory allocation, or any other request related to the management servers, the memory appliances, the external memory allocations, and/or the regions on the memory appliances. The allocation logic requests may be carried over any communications protocol and/or interface capable of carrying messages. For example, the allocation logic requests may be carried over UDP datagrams, a TCP connection, an SSL connection, InfiniBand reliable connections, RoCE, iWARP, HTTP, or any other communications protocol known now or later discovered.

Alternatively, or in addition, allocation logic requests may be carried over remote procedure calls, such as using XML-RPC, SOAP, CORBA, Java Remote Method Invocation (Java RMI), Representational State Transfer (REST), JavaScript Object Notation (JSON) over REST, and/or any other remote procedure call protocol. Alternatively, or in addition, the allocation logic requests may be carried over a communication protocol based on client-side memory access, such as by writing messages into a buffer on the management server 120 via client-side-memory access. Alternatively, or in addition, the allocation logic requests may be carried via invoking methods and/or interfaces in an API. For example, if the client logic 312 and the allocation logic 412 are co-located or combined, the allocation logic requests may be methods and/or interfaces in an API.

Figure 6:
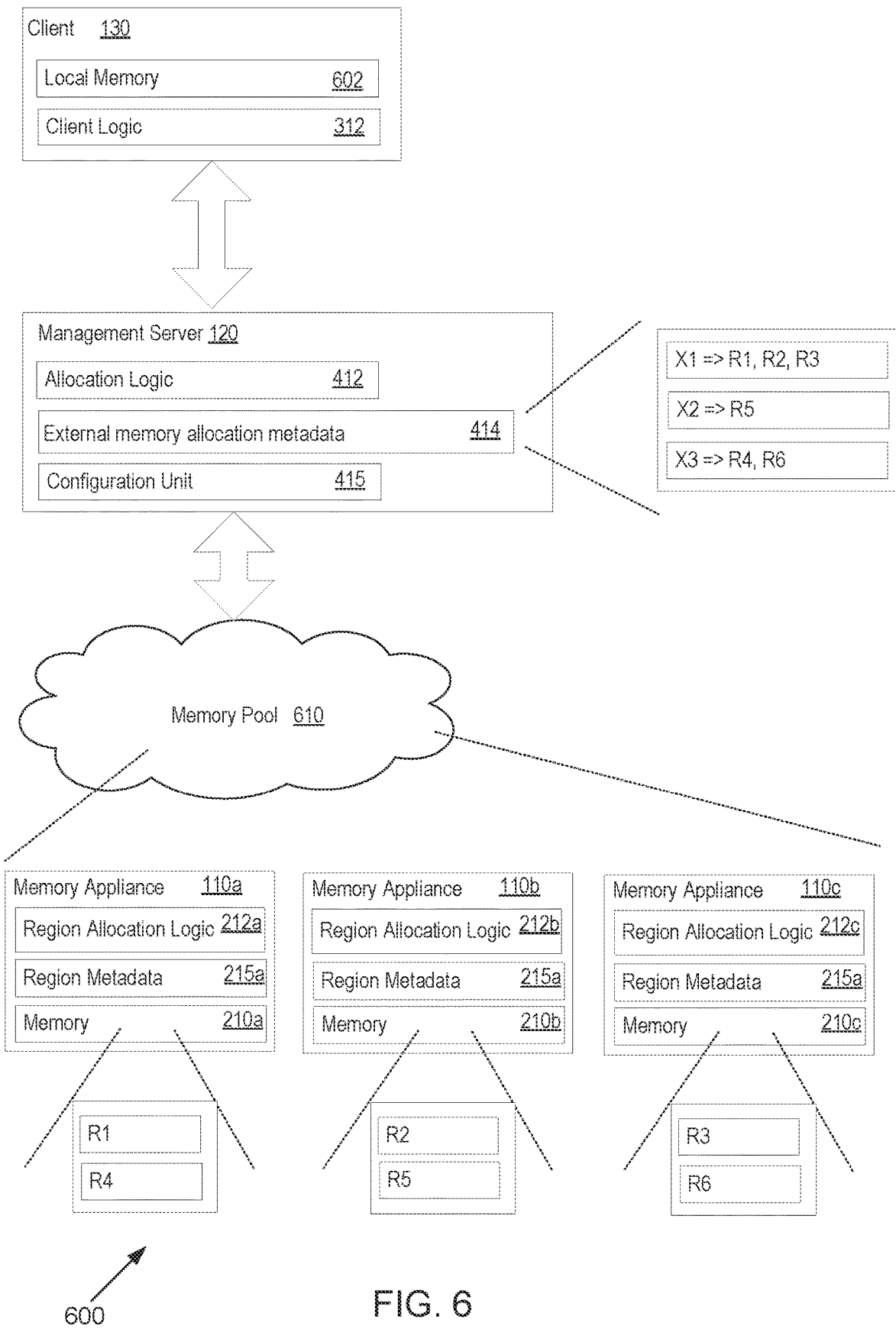
FIG. 6 illustrates an example external memory allocation system.

FIG. 6 illustrates an example external memory allocation system 600. The system 600 illustrates the client 130, the management server 120, and a memory pool 610. The memory pool 610 includes multiple memory appliances 110*a*-110*c*. While FIG. 6 illustrates only three memory appliances as being part of the memory pool 610, in other examples, the memory pool 610 may include fewer or more number of memory appliances. The client 130 includes the client logic 312 and local memory 602. The management server 120 includes the allocation logic 412 and the external memory allocation metadata 414. Each of the memory appliances 110*a*-110*c* includes respective region allocation logic 212*a*-212*c* and memories 210*a*-210*c*. The client 130, management server 120, and the memory appliances 110*a*-110*c* may include other components that are not illustrated in FIG. 6. The client 130 may request an external memory allocation, such as one of X1-X3, from the memory pool 610 via the management server 120 to complement the local memory 602. For example, the local memory 602 may not be sufficient to handle the tasks operating on the client 130, and therefore the client 130 may seek the external memory allocations X1-X3. Alternatively, or in addition, the client 130 may seek to use the external memory allocations X1-X3 as the primary memory with the local memory 602 as a cache.

The external memory allocations may reference one or more regions. The one or more regions referenced by an external memory allocation may be included in a single memory appliance, or the regions may be distributed between multiple memory appliances.

The management server 120 may include external memory allocation metadata 414. External memory allocation metadata 414 may include information describing the external memory allocations, such as indication of the regions referenced by the external memory allocation. For example, the external memory allocation X1 may reference regions R1-R3 as illustrated in FIG. 6, where R1 is within memory appliance 110*a*, R2 is within memory appliance 110*b*, and R3 is within memory appliance 110*c*. The external memory allocation X2 may reference a single region R5 from the memory appliance 110*b*, while the external memory allocation X3 may reference regions R4 and R6 on the memory appliances 110*a* and 110*c* respectively. It is understood that the described distributions of the regions are exemplary and that various other distributions of the regions referenced by an external memory allocation are possible. Further, while the example illustrates three external memory allocations X1-X3, other examples may involve fewer or more number of external memory allocations being present in the external memory allocation metadata 414. The memory appliances 110*a*-110*c* including the regions R1-R6 may be known to the allocation logic 412 of a management server 120 or associated with the management server 120 that is associated with the external memory allocation.

The external memory allocation metadata 414, the region metadata 215, and/or any other metadata may each be co-located with one or more logics which may access the corresponding metadata, such as in examples where the region metadata 215 is co-located with the region access logic 212 and/or where the external memory allocation metadata 318 is co-located with the allocation logic 412. Alternatively or in addition, the metadata may be stored remotely, such as with a metadata server and/or in any other location. In other examples, the metadata may be replicated and/or dispersed to multiple locations, such as in examples where the region metadata 215 is included in one or more of the memory 210 and/or backing store 260 of the memory appliance 110, the memory 310 and/or backing store 360 of the client 130, and/or the memory 410 and/or backing store 460 of the management server 120.

Further metadata may also be recorded in the external memory allocation metadata 414. For example, information describing the external memory allocation X1 may include the size of the external memory allocation X1, a lease expiration date and/or time for the external memory allocation X1, information about the regions R1-R3 referenced by the external memory allocation X1, and/or any other information relevant to the external memory allocation X1. Alternatively, or in addition, the external memory allocation X1 may include metadata describing one or more logical relationships between the regions R1-R3 referenced by the external memory allocation X1. The various entries in the external memory allocation metadata 414 may contain the same fields of information, or different fields of information. The fields of information described are exemplary and other types of information may be recorded in other examples. The external memory allocation metadata 414 may be included in the memory 410 included in the management server 120. Alternatively, or in addition, external memory allocation metadata 414 may be included in the backing store 460, if included in the management server 120.

The external memory allocation metadata 414 may be recoverable from the region metadata 215 included in one or more memory appliances 110*a*-110*c*. In an example, the external memory allocation metadata 414 may be included in the region metadata 215 of the memory appliances 110*a*-110*c* including one or more of the regions R1-R3 referenced by the external memory allocation. Accordingly, if the management server 120 fails, a backup management server may take its place by retrieving the external allocation metadata 414 from the region metadata 215 included in one of the memory appliances 110a-110c. In a second example, the external memory allocation metadata 414 may be distributed amongst the region metadata 215a-215c of the memory appliances 110a-110c including the regions R1-R3 referenced by the external memory allocation. Accordingly, if the management server 120 fails, a backup management server may take its place by retrieving the external allocation metadata 414 from the distributed portions included in the region metadata 215a-215c included in the memory appliances 110a-110c. In a third example, the external memory allocation metadata 414 may be derived from the region metadata 215a-215c of the memory appliances 110a-110c including one or more of the regions R1-R3 referenced by the external memory allocation. For example, the region metadata 215a may include information about other regions R2-R3 referenced by the same external memory allocation as the region R1. Alternatively, or in addition, the region metadata 215a may include information about the logical relationships between the regions R1-R3. Accordingly, if the management server 120 fails, a backup management server may take its place by retrieving the region metadata 215a-215c included in one or more of the memory appliances 110a-110c and deriving the external memory allocation metadata 414 from the retrieved region metadata 215a-215c. The allocation logic 412 may retrieve region metadata 215a-215c from the respective memory appliance 110a-110c by sending a request to get information for a region to the respective region access logic 212a-212c included in the memory appliances 110a-110c.

The region metadata 215a-215c may include one or more flags, identifiers, semaphores and/or other data structures that may be used to identify the most up-to-date information that may be used to recover the external memory allocation metadata 414. For example, the region metadata 215a-215c may include an identifier of a primary region and/or a secondary region, of which the corresponding metadata contains a primary copy of the information and/or a secondary copy of the information. Alternatively, or in addition, all copies of the information and/or the corresponding regions may be ranked in order from primary, through last. Updates to the copies of the information may be performed in order from primary through last. Recovery of external memory allocation data 414 may be performed by attempting to recover from the copies of the information in order from primary through last. For example, if an attempt to recover external memory allocation metadata 414 from a primary copy of the information fails, a second attempt may be made using the secondary copy, and so on.

An external memory allocation may be associated with one or more management servers. An external memory allocation may be associated with the management server that was used to create the external memory allocation. Alternatively, or in addition, an external memory allocation may be associated with other management servers, such as a backup management server, a centralized management server, a localized management server, a task-specific management server, and/or any other management server. Alternatively, or in addition, the external memory allocation may be associated with one or more memory appliances, one or more clients, one or more metadata servers, and/or any other entity. In other examples, the external memory allocation may be associated with one or more logics and/or non-physical entities, such as with one or more application logics, containers, jails, and/or zones. An external memory allocation may become associated with a management server by replicating information about the external memory allocation from one or more management servers associated with the external memory allocation or from one or more memory appliances including the regions referenced by the external memory allocation. In other examples, the external memory allocation may become associated with one or more other entities by replicating information about the external memory allocation to the entity/entities. For example, the external memory allocation metadata 318 may be stored within a client 130 and/or in the metadata for a container, a jail, and/or a zone.

The external memory allocation metadata 414 may be recoverable from information about the external memory allocation replicated onto other management servers and/or any other entity. For example, a copy of the external memory allocation metadata 414 may exist on one or more management servers. The external memory allocation metadata 414 may include one or more flags, identifiers, semaphores and/or other data structures that may be used to identify the most up-to-date copy of the external memory allocation metadata 414. For example, the external memory allocation metadata 414 may include an identifier of a primary management server and/or a secondary management server which contains a corresponding primary copy and/or a secondary copy.

Alternatively, or in addition, all copies and/or the corresponding management servers may be ranked in order from primary, through last. Updates to the copies of the information may be performed in order from primary through last. Recovery of external memory allocation metadata may be performed by attempting to recover from the copies of the information in order from primary through last. For example, if the primary management server fails, an attempt may be made to use a new management server in place of the primary management server and to recover the external memory allocation metadata 414 from the secondary management server. If the attempt to recover the external memory allocation metadata 414 from the secondary management server fails, a second attempt may be made using the tertiary management server, and so on. Alternatively, or in addition, recovery of external memory allocation metadata 414 may be performed by attempting to assign a new primary management server for the external memory allocation in order from primary through last. For example, if the primary management server fails, an attempt may be made to assign a new primary management server to be the secondary management server. Furthermore, if the attempt to assign the new primary management server for the external memory allocation to be the secondary management server fails, a second attempt may be made using the tertiary management server, and so on. If all management servers associated with an external memory allocation have failed, recovery may proceed using the region metadata, as described.

Upon receiving a request to find available memory appliances, the allocation logic 412 may reply with a list of memory appliances associated with the management server 120 including the allocation logic 412 receiving the request. Alternatively or in addition, the allocation logic 412 may reply with a list of memory appliances known to the allocation logic 412. Alternatively or in addition, the allocation logic 412 may reply with a list of memory appliances meeting a set of characteristics and/or configurations specified by the request.

Upon receiving a request to query available space on the memory appliances, the allocation logic 412 may determine the available space on the memory appliances, such as 110a-110c, associated with the management server 120 including the allocation logic 412 and/or known to the allocation logic 412. The allocation logic 412 may determine the available space on a memory appliance, such as 110a, by sending a request to get the status of the memory 210a included in the memory appliance 110a to the region access logic 212a of the memory appliance 110a. Upon receiving the response message in response to the request to get the status of the memory 210a included in the memory appliance 110a, the allocation logic 412 may inspect the response message to determine the available space on the memory appliance 110a. Alternatively, or in addition, the allocation logic 412 may determine the available space on the memory appliance 110a by reading region metadata 215a, if included in the memory 410 of the management server 120. The region metadata 215a may be updated upon startup of the allocation logic 412 and/or management server 120, upon detection of memory appliances 110a-110c, upon association with memory appliances 110a-110c, periodically, upon receiving a management request, when requested by the user interface, upon creating a region with a memory appliance, upon occurrence of any other event, and/or at any other time. The region metadata 215a may be updated by sending requests to get the status of the memory 210a included in the memory appliance 110a. Alternatively, or in addition, the region metadata 215a may be updated by receiving an asynchronous notification of the status of the memory 210a, such as the response message to the request to get the status of the memory 210a included in the memory appliance 110a. The response messages to the request to get the status of the memory 210a included in the memory appliance 110a may be sent by the region access logic 212a in response to any event, such as a change in the region metadata 215a included in the memory 210a of the memory appliance 110a. Upon receiving the response messages to the requests to get the status of the memory included in the memory appliances 110a-110c, the allocation logic 412 may inspect the response messages to determine the available space on the memory appliances 110a-110c and/or update the region metadata 215a-215c. The allocation logic 412 may respond to the request to query available space on memory appliances 110a-110c with a response message. The response message may include a summary of the status of the memory on the memory appliances 110a-110c to which the allocation logic 412 sent the requests to get the status of the memory included in the memory appliance 110a to the region access logic 212a of the memory appliance 110a and/or of the memory 210a-210c on the memory appliances 110a-110c which are described in the region metadata 215a-215c. For example, the response message may include an aggregate of the total memory available to hold regions, the amount of memory currently in use by existing regions, and/or the amount of memory available to hold additional regions. Alternatively, or in addition, the response message may include the status of the memory on each of the memory appliances 110a-110c to which the allocation logic 412 sent the requests to get the status of the memory included in the memory appliance to the region access logic of the memory appliance and/or of the memory on the memory appliances 110a-110c which are described in the region metadata. Alternatively, or in addition, the response message may include a status, indicating whether the operation was successful.

Upon receiving a request to create an external memory allocation, the allocation logic 412 may determine how to structure the external memory allocation. The request may be received from the client 130. Alternatively, or in addition, the request may be sent by a user via the user interface to provision external memory for the client 130. In an example, the allocation logic 412 may determine to structure the external memory allocation as a single region on a single memory appliance (such as external memory allocation X2 of FIG. 6). In a second example, the allocation logic 412 may determine to structure the external memory allocation as multiple regions on multiple memory appliances (such as external memory allocations X1 and X3 of FIG. 6). In a third example, the allocation logic 412 may determine to structure the external memory allocation using one or more logical relationships, such as striping with parity, between multiple regions on multiple memory appliances, etc. Other examples of logical relationships are described elsewhere in this disclosure. The allocation logic 412 may determine how to structure the external memory allocation, using an algorithm or heuristic.

The dynamic allocation of external memory may include a provisioning of a predetermined amount of memory for the client and/or for a user account on the client. One or more subsequent requests to allocate external memory for the client and/or the user account may be allocated from the predetermined amount of external memory that was provisioned for the client and/or for the user account. The request to allocate external memory and/or a subsequent request to allocate external memory may result in allocation of a subset or all of the provisioned external memory. The provisioning may be part of the dynamic allocation of the external memory. Alternatively or in addition, the provisioning may be separate from the allocation of the external memory. Thus, allocation may or may not include the provisioning depending on, for example, whether sufficient external memory has already been provisioned. The provisioning of the memory may reserve the memory such that after the memory is reserved for the client, the reserved memory may not be accessed by other clients unless the reserved memory is freed. Alternatively or in addition, if provisioned to a user account, the reserved memory may not be accessed by other user accounts until the reserved memory is freed.

In some examples, the dynamic allocation of external memory may include over-subscribing and/or under-provisioning of memory. Over-subscribing and/or under-provisioning of memory may be assigning, allocating, and/or provisioning more memory to one or more clients, users, and/or other entities than is actually available to be used. In a first example, a user, client 130, application logic 314, and/or other entity may be assigned, allocated, and/or provisioned 300 GB of memory on a client 130, and/or the user, client 130, application logic 314, and/or other entity may be allowed to subsequently request up to 500 GB of memory, despite only 300 GB of memory being physically present in the client 130. As the user, client 130, application logic 314, and/or other entity uses memory, the memory 310 of the client 130 may be utilized first, such as with anonymous memory and/or local primary memory. As memory use increases, the memory 210 of one or more memory appliances may be used to hold some data for the user, client 130, and/or other entity, such as with file-backed memory and/or external primary memory. The data may be data that was initially placed in the memory 310 of the client 130, but then subsequently infrequently used, and/or the data may be data that is recently generated by the user, client 130, application logic 314, and/or other entity.

In a second example, multiple users, clients 130, application logics 314, and/or other entities may be assigned, allocated, and/or provisioned a total of 100 TB of memory (such as by assigning, allocating, and/or provisioning smaller amounts to each user, client 130, application logic 314, and/or other entity, such that the total amount assigned, allocated, and/or provisioned equals 100 TB), and/or the multiple users, clients 130, application logics 314, and/or other entities may be allowed to subsequently request up to a total 200 TB (such as by allowing each user client 130, application logic 314, and/or other entity to request additional amounts of memory, which may be the same or different for each, such that the total amount allowed to be requested equals the remaining 100 TB), despite only 100 TB of memory being present in the memory pool. This approach may be advantageous when the statistical expected value for the amount of memory to use at any given point in time is well below the maximum allowed to be requested. During operation, the allocation logic 412 and/or another logic may monitor how much memory is actually used, assigned, allocated, and/or provisioned, and/or may determine whether and/or how much additional memory should be added to the pool to meet the actual demand. In some examples, the additional amount of memory that should be added to the pool may be reported to a user and/or system administrator, such as through a user interface. The additional amount of memory that should be added to the pool may be used by the user and/or system administrator to determine how much additional memory, how many additional memory appliances 110, and/or what size of memory appliances 110 should be added to the memory pool. In other examples, the allocation logic 412 and/or another logic may activate one or more additional memory appliances 110 that may be powered off, in a standby state, in a low-power mode, deactivated, and/or configured not to be used. Activating the one or more additional memory appliances 110 may affect how the one or more users, clients 130, application logics 314, and/or other entities are billed for memory usage, such as in examples, where utilizing the additional memory appliances 110 represents a disproportionately increased cost of operation. For example, one or more users, clients 130, application logics 314, and/or other entities that requested memory beyond the initially assigned, allocated, and/or provisioned amount may be charged a higher rate for the additionally requested memory than for the initially assigned, allocated, and/or provisioned memory.

One or more user accounts may be logically grouped together and/or may be operated upon as a group. A group of one or more user accounts may be considered a user group. Accordingly, actions described throughout this disclosure as being performed upon and/or by one or more user accounts may alternatively or in addition be performed upon and/or by one or more user groups. User groups may be any logical grouping of user accounts, such as Lightweight Directory Access Protocol (LDAP) groups, Active Directory security groups, and/or any other logical grouping of user accounts known now or later discovered.

Provisioning may be the reservation of memory, but alternatively or in addition, provisioning the external memory may include providing an indication of how to allocate memory, in other words, provisioning may include providing or creating an indication of an allocation strategy. The allocation logic, for example, may use the indication of the allocation strategy to determine the allocation strategy used in allocating memory. The indication of the allocation strategy may be created by a user logged into a user account, such as an administrator account. Alternatively or in addition, the indication of the allocation strategy may be created by a configuration unit 415 or any other module. The configuration unit may be a component that creates the indication of the allocation strategy based on information received through a third user interface and/or API. The third user interface may be included, in some examples, in the user interface and/or the second user interface described above. The third user interface may be a graphical user interface, a web interface, a command-line interface, an API, and/or any other type of interface or combination of interfaces known now or later discovered through which data may be received.

The configuration unit 415 may be included in the management server 120 as illustrated in FIG. 6. Alternatively or in addition, the configuration unit 415 may be included in any other device, such as the client 130 or the memory appliance 110.

The indication of the allocation strategy may include one or more policies, passed functions, steps, and/or rules that the allocation logic follows to determine how to allocate external memory. Determining how to allocate external memory, for example, may include identifying the memory appliances on which to allocate requested memory. Alternatively, or in addition, the indication of the allocation strategy may include profiles for memory appliances, clients, and/or user accounts. The profiles may indicate to the allocation logic how to allocate the memory.

Passed functions may be any logic which may be provided by a first logic as a parameter when interacting with a second logic. For example, the passed function may be computer executable instructions or computer code. The passed function may be embodied in a computer readable storage medium, such as the memory 210, 310, 410 and/or the backing store 260, 360, 460 and/or may be transmitted via an interconnect, such as the interconnects 140, for operation with another entity. For example, the passed function may be transmitted via the interconnects 140 from the client logic 312 or any other logic to the management server 120, for execution with the processor 440 of the management server. Passed functions may be used to define custom, adaptive, and/or flexible allocation strategies that may be cumbersome to express in other ways.

Creating or providing the indication of the allocation strategy may be provisioning external memory for one or more application logics 314, for one or more of the clients 130, for one or more client groups, for one or more user accounts, for one or more user groups, and/or for predetermined purposes. In a first example, creating the indication of the allocation strategy may include associating a user account with a high priority setting. Creating such an association may provision external memory for use by the user account from a set of the memory appliances that are configured to be used by any high priority user accounts. In a second example, creating the indication of the allocation strategy may include setting a time limit for a user account, such as a time-of-day limit or a duration-of-use limit. Setting the time limit may provision external memory for use by the user account only during predetermined times, such as during a predetermined time of day or during predetermined days of a week, or only for a predetermined length of time. In a third example, creating the indication of the allocation strategy may include setting a maximum external memory usage limit for a user account, thus limiting the amount of external memory that may be allocated to the third user account. In a fourth example, creating the indication of the allocation strategy may include creating one or more policies, passed functions, steps, and/or rules that indicate the allocation logic is to prefer to allocate memory on the memory appliances having low network bandwidth when satisfying requests from the clients that have low network bandwidth. In other words, low network bandwidth clients may be provisioned with low network bandwidth external memory and/or lower speed external memory. The client profile, for example, may indicate that the client is a low network bandwidth client. In a fifth example, creating the indication of the allocation strategy may include identifying one or more policies, passed functions, steps, and/or rules that indicate the allocation logic is to prefer to allocate memory on the memory appliances that have a network locality near to the clients. In other words, external memory may be provisioned to the clients with a network locality within a threshold distance of the memory appliances that contain the provisioned memory. Other examples of provisioning may include configuring the allocation logic to execute any of the other policies, passed functions, steps, and/or rules described elsewhere in this document. Provisioning external memory may include configuring any of the characteristics and/or configurations of the memory appliance, the client, and/or the user account described elsewhere in this document on which the allocation logic determines how to allocate memory. The policies, passed functions, steps, and/or rules to use may be configured for each memory appliance, for each client, and/or for each user account. Alternatively or in addition, the policies, passed functions, steps, and/or rules to use may be configured globally for all memory appliances, clients, and/or user accounts. The policies, passed functions, steps, and/or rules to use may be configured with relative priorities to each other, such as by ranking the policies, passed functions, steps, and/or rules in order of precedence. All or part of the profiles may be determined and/or identified by the allocation logic. For example, the allocation logic may auto-detect that the client and/or the memory appliance has low network bandwidth by measuring performance and/or by retrieving information indicating performance.

The allocation logic 412 may include one or more policies, passed functions, steps, and/or rules to determine which memory appliances to use or select for a particular external memory allocation. The allocation logic 412 may determine the memory appliances based on factors such as, how much memory to use on each memory appliance, which one or more logical relationship types to use if any, which restrictions to place upon the external memory allocation if any, and/or whether to reject the request. For example, the allocation logic 412 may use memory appliances that are associated with the management server 120 and/or known to the allocation logic 412 of the management server 120. Alternatively, or in addition, the allocation logic 412 may determine the memory appliances to use based on a profile that includes one or more of the characteristics and/or configurations of the memory appliances. Alternatively, or in addition, one or more clients 130, one or more client groups, one or more user accounts, and/or one or more user groups may be provisioned to use and/or select from one or memory appliances 110 specified by the provisioning. For example, a user group containing users in an accounting department may be provisioned to use one or more memory appliances 110 of a group of memory appliances 110 owned by the accounting department. In another example, a user group containing users in an engineering department may be provisioned to use one or more memory appliances 110 of a group of memory appliances owned by the engineering department. In other examples, the interconnects 140 may be partitioned into two or more interconnect partitions, and a first client group containing clients 130 in a first interconnect partition may be provisioned to use and/or select one or more memory appliances 110 of a group of memory appliances in the first interconnect partition, while a second client group containing clients 130 in a second interconnect partition may be provisioned to use and/or select one or more memory appliances 110 of a group of memory appliances in the second interconnect partition.

In a first example, the allocation logic 412 may use or select memory appliances that have the least amount of available memory while still having enough to hold the entire external memory allocation in a single region. In a second example, the allocation logic 412 may use or select memory appliances that have network locality near to the client 130. In a third example, the allocation logic 412 may use or select memory appliances that have a backing store. In a fourth example, the allocation logic 412 may use or select memory appliances that have low network utilization. In a fifth example, the allocation logic 412 may use or select memory appliances that have low latency for client-side memory access. In a further example, the allocation logic 412 may use or select memory appliances that have high bandwidth for client-side memory access. In other examples, the allocation logic 412 may use or select memory appliances 110 based upon current and/or recent usage of the memory appliances 110, such as the lowest, highest, average, mean, median, mode, etc. value of one or more parameters. Examples of such parameters may include: utilization, amount of capacity allocated, bandwidth consumed, processor load, number of regions allocated, operations-per-second handled, number of clients 130 accessing the region(s) 214 of the memory appliance 110, number of client logics accessing the region(s) 214, etc.

Alternatively, or in addition, the allocation logic 412 may utilize a profile that includes one or more characteristics and/or configurations of the client 130 and/or of a user account. In addition to those listed elsewhere in this disclosure, characteristics and/or configurations of the client 130 and/or of the user account may include, for example: relative priority, absolute priority, quotas, maximum external memory usage limits, current external memory usage, maximum persistent external memory usage limits, current persistent external memory usage, maximum volatile external memory usage limits, current volatile external memory usage, time-of-day limits, duration-of-use limits, last access time, maximum allowed not-in-use threshold, and/or any other properties describing the capabilities of, actions of, and/or privileges assigned to, the client 130 and/or the user account. In a first example, the allocation logic 412 may use or select memory appliances with older hardware revisions for user accounts with low relative priority. In a second example, the allocation logic 412 may use or select memory appliances with low latency for client-side memory access for clients with high absolute priority. In a third example, the allocation logic 412 may reject a request to create an external memory allocation outside a time-of-day limit for the user account. In a further example, the allocation logic 412 may prefer to use or select memory appliances with low network bandwidth for clients with low network bandwidth. In a fifth example, the allocation logic 412 may assign a short lease time for user accounts with a short duration-of-use limit.

Alternatively, or in addition, a separate module, other than the allocation logic 412 may be included in the management server 120 to determine the distribution of the external memory across the memory appliances. Alternatively, or in addition, the distribution may be determined by the client logic 312 and/or the region access logic 212. Alternatively, or in addition, the determination of the distribution of the regions of the external memory allocation may be distributed between multiple logics, such as the client logic 312 and the allocation logic 412. All of, or a portion of, the steps performed for the determination may be included in the request to create an external memory allocation or in any other message or data sent from the client logic 312 to the allocation logic 412. Alternatively or in addition, the request to create an external memory allocation may include an indication of which factors to use to determine how to structure the external memory allocation. Alternatively or in addition, the request to create an external memory allocation may include parameters to be used when determining the structure of the external memory allocation. For example, the parameters may include one or more physical locations to be used when choosing memory appliances based upon physical locations. Alternatively, or in addition, the parameters may include information describing the user account and/or access parameters to be used when choosing memory appliances based upon user accounts. Alternatively, or in addition, the user account and/or access parameters may be specified at the time a connection, such as an SSL connection, is established between the client logic 312 and the allocation logic 412.

The allocation logic 412 or another logic may adapt the allocation strategy, policies, passed functions, steps, rules, and/or any other factor(s) affecting the provisioning and/or allocation of external memory to accommodate changing circumstances. Alternatively, or in addition, the allocation strategy, policies, passed functions, steps, and/or rules, and/or other factor(s) may be defined to be adaptive. For example, an adaptive allocation strategy may specify that when network congestion is high, the allocation logic 412 is to prefer to allocate memory on the memory appliances 110 that have a network locality near to the client 130 and/or may specify that when network congestion is low, the allocation logic 412 is to prefer to allocate memory on the memory appliances 110 with low bandwidth utilization.

Figure 7:
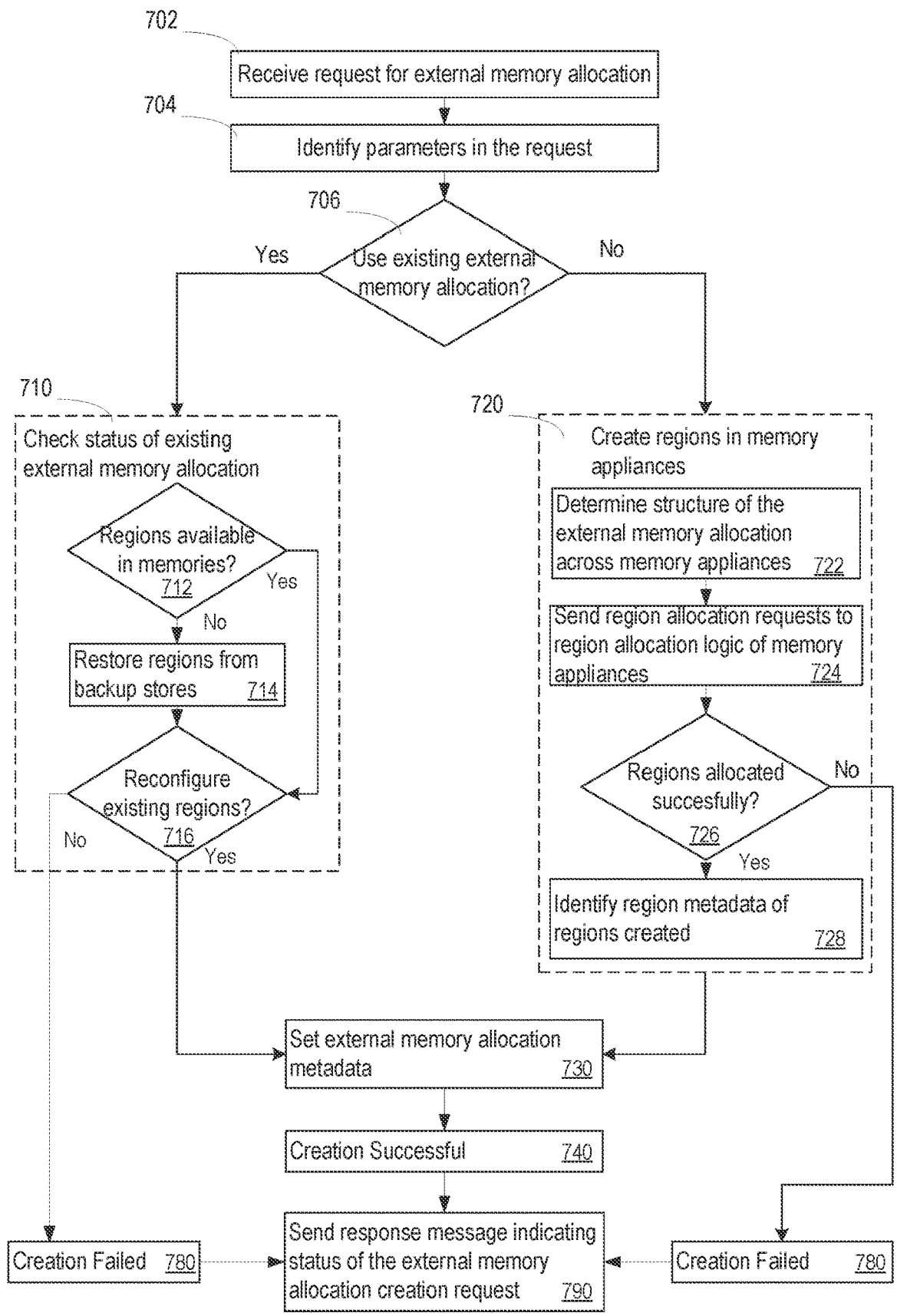
FIG. 7 illustrates an example flowchart for creation of an external memory allocation.

FIG. 7 illustrates an example flowchart for creation of an external memory allocation. The request to create an external memory allocation may include additional parameters that the allocation logic 412 may use to affect the external memory allocation, the regions, the logical relationships between the regions, and/or a combination of these (702, 704). In a first example, the request to create an external memory allocation may include a size to use for the external memory allocation. In a second example, the request to create the external memory allocation may include a preferred external memory allocation identifier. The preferred external memory allocation identifier may refer to an existing external memory allocation. If an existing external memory allocation referenced by the preferred external memory allocation identifier exists, the allocation logic 412 may select the existing external memory allocation instead of creating a new external memory allocation (706, 710). The allocation logic 412 may perform additional checks before selecting an existing external memory allocation, such as confirming that the other parameters specified in the request to create an external memory allocation match the existing external memory allocation (710). Upon selecting an existing external memory allocation, if the regions referenced by the existing external memory allocation are not included in the memories of the corresponding memory appliances, the allocation logic 412 may optionally send a request to restore the contents of a region from a backing store for each region referenced by the existing external memory allocation (712, 714) and/or may cause the contents of the region(s) 214 to be initialized, such as by writing zeros to the region(s) 214 and/or by requesting the region access logic 212 to initialize the region(s) 214. Alternatively, or in addition, the request to create an external memory allocation may include an indicator that only existing external memory allocations may be considered when attempting to satisfy the request. If no existing external memory allocations match the parameters indicated in the request to create an external memory allocation, then the request to create an external memory allocation may fail (780). Alternatively, the allocation logic 412 may reconfigure existing regions by sending region reconfiguration requests to the region access logic 212 of the memory appliances including the existing regions (716). For example, the allocation logic 412 may request the region access logic 212 to resize the existing regions, or revise other parameters such as the access parameters associated with the existing region. In case reconfiguration of the existing region fails, the external memory allocation may fail (780). In another example, if the request for external memory allocation indicates, such as using parameters, a preference not to use reconfigured regions, the request may fail (716, 780). Alternatively, the allocation logic 412 may proceed to request creation of memory regions instead of the request failing (720). In a third example, the request to create an external memory allocation may include an allocation type. The allocation type may indicate how the allocation logic 412 and/or the region access logic 212 may treat the external memory allocation after it is created.

In a first example, the allocation type may indicate that the external memory allocation may be treated as volatile. A volatile external memory allocation may be destroyed if the allocation logic 412 determines that the external memory allocation is no longer in use. As such, a client logic 312 may avoid memory leaks by specifying that its external memory allocation may be treated as volatile, since a failure of the client 130, the client logic 312, and/or the application logic 314 may eventually lead to the allocation logic 412 determining that the external memory allocation is no longer in use, then destroying it.

The allocation logic 412 may determine whether or not an external memory allocation is in use by requesting and/or inspecting the status of the external memory allocation and/or of the regions referenced by the external memory allocation. The status may include an indication of how many clients are accessing the external memory allocation and/or the regions referenced by the external memory allocation. Alternatively, or in addition, the status may include an indication of the last time at which a client accessed the external memory allocation and/or the regions referenced by the external memory allocation. The allocation logic 412 may determine that the external memory allocation is not in use if the status indicates the last time at which a client accessed the external memory allocation and/or the regions referenced by the external memory allocation was older than a not-in-use threshold. The not-in-use threshold may be a parameter of the request to create an external memory allocation. Alternatively, or in addition, the not-in-use threshold may be specified by an administrator using the user interface. Alternatively, or in addition, the not-in-use threshold may be determined automatically, such as based-upon an algorithm, a heuristic, and/or a formula. An example algorithm, heuristic, and/or formula may adjust the not-in-use threshold based upon the characteristics and/or configuration of the management server 120 and/or of the memory appliances 110a-110c, such as the amount of available memory. Alternatively, or in addition, the allocation logic 412 may determine whether or not an external memory allocation is in use by inspecting region metadata 215 and/or external memory allocation metadata 414, if either or both are included in the management server 120. Region metadata may include an indication of the last time at which a client accessed the region. External memory allocation metadata 414 may include an indication of the last time at which a client accessed the external memory allocation.

In a second example, the allocation type may indicate that the external memory allocation may be treated as persistent. A persistent external memory allocation may be preserved if the allocation logic 412 determines that the external memory allocation is no longer in use. A persistent external memory allocation may be preserved by enabling the external memory allocation and/or the regions referenced by the external memory allocation to continue to exist as created. Alternatively, or in addition, if the allocation logic 412 determines that the external memory allocation is no longer in use, the allocation logic 412 and/or the region access logic 212 may automatically persist the external memory allocation and/or the regions referenced by the external memory allocation to the backing stores and remove one or both from memory. As such, the client logic 312 may avoid memory leaks by specifying that its external memory allocation may be treated as persistent with a not-in-use threshold, since a failure of the client 130, the client logic 312, and/or the application logic 314 may eventually lead to the allocation logic 412 determining that the external memory allocation is no longer in use, then persisting it and removing it from memory. The allocation logic 412 updates the external memory allocation metadata according to the allocation type specified (730).

The allocation logic 412 may also associate an external memory identifier with the external memory allocation metadata (730). The external memory identifier may be chosen by the allocation logic 412 or it may be included in the request to create an external memory allocation. For example, the external memory identifier may be the preferred external memory identifier included in the request to create an external memory allocation.

The allocation logic 412 may send a request to create a region to the region access logic 212 of each memory appliance selected to hold memory regions referenced by the external memory allocation (720, 722, 724). The memory appliances are selected as described earlier. Upon receiving the response message in response to each request to create a region, the allocation logic 412 may inspect the response message and/or record any relevant metadata (728). In case any of the region allocation requests fail, the creation of the external memory allocation may fail (780).

The allocation logic 412 may respond to the request to create an external memory allocation with a response message. The response message may include the external memory identifier. Alternatively, or in addition, the response message may include identifiers and/or information describing the regions referenced by the external memory allocation and/or the logical relationships between the regions. Alternatively, or in addition, the response message may include a status, indicating whether the operation was successful (790, 740, 780).

Upon receiving a request to resize an existing external memory allocation, the allocation logic 412 may determine how to structure the resized external memory allocation. In a first example, the allocation logic 412 may determine to structure the resized external memory allocation as a single region on a single memory appliance. In a second example, the allocation logic 412 may determine to structure the external memory allocation as multiple regions on multiple memory appliances. In a third example, the allocation logic 412 may determine to structure the external memory allocation using one or more logical relationships, such as striping with parity, between multiple regions on multiple memory appliances. Determining how to structure the resized external memory allocation may include determining whether to resize the existing regions referenced by the external memory allocation, whether to create additional regions, and/or whether to replace existing regions with new regions.

The allocation logic 412 may determine how to structure the resized external memory allocation. As additional examples to those listed elsewhere in this disclosure, the allocation logic 412 may resize existing regions when expanding or contracting an external memory allocation that only references one region, if sufficient space is available in the memory of the memory appliance including the region. In another example, the allocation logic 412 may create additional regions when expanding an external memory allocation that uses a logical relationship involving a concatenation of the regions referenced by the external memory allocation. In another example, the allocation logic 412 may resize existing regions when expanding or contracting an external memory allocation that uses a logical relationship involving striping and/or mirroring, if sufficient space is available in the memory of the memory appliances including the regions referenced by the external memory allocation.

The allocation logic 412 may create additional regions by sending a request to create a region to the region access logic 212 of the memory appliances selected to include the additional regions. Alternatively, or in addition, the allocation logic 412 may resize existing regions by sending a request to resize an existing region to the region access logic 212 of the memory appliances including the existing regions. Alternatively, or in addition, the allocation logic 412 may destroy existing regions by sending a request to destroy a region to the region access logic 212 of the memory appliances including the existing regions.

The allocation logic 412 may replace an existing region with a new region by creating the new region, then replicating the data from the existing region onto the new region. For example, the allocation logic 412 may perform client-side memory access to read the data from the existing region and write to the new region. Alternatively, or in addition, the allocation logic 412 may send a request to migrate a region to the region access logic 212 of the memory appliance including the existing region and/or to the region access logic 212 of the memory appliance selected to include the new region.

The allocation logic 412 may respond to the request to resize an existing external memory allocation with a response message. The response message may include the external memory identifier. Alternatively, or in addition, the response message may include identifiers and/or information describing the regions referenced by the external memory allocation and/or the logical relationships between the regions. Alternatively, or in addition, the response message may include a status, indicating whether the operation was successful.

Upon receiving a request to renew an external memory allocation, the allocation logic 412 may update the external memory allocation metadata 414 associated with the external memory allocation identified by the request. The request to renew an external memory allocation may include an external memory allocation identifier. Alternatively, or in addition, the request to renew an external memory allocation may include a value to be used for the not-in-use threshold of the external memory allocation. The allocation logic 412 may respond to the request to renew an external memory allocation with a response message. The response message may include a status, indicating whether the operation was successful. Alternatively, or in addition, the response message may include the not-in-use threshold of the external memory allocation and/or the time left until the external memory allocation may be considered not-in-use.

Upon receiving a request to destroy an external memory allocation, the allocation logic 412 may send to the region access logic 212 of each corresponding memory appliance, a request to destroy a region for each region referenced by the external memory allocation. Upon receiving the response message in response to each request to destroy a region, the allocation logic 412 may inspect the response message and/or record any relevant metadata. The allocation logic 412 may respond to the request to destroy an external memory allocation with a response message. The response message may include a status, indicating whether the operation was successful.

Upon receiving a request to persist and free an existing external memory allocation, the allocation logic 412 may, for each region referenced by the external memory allocation, send to the region access logic 212 of each corresponding memory appliance, a request to persist a region to a backing store and remove it from memory. Upon receiving the response message in response to each request to persist a region to a backing store and remove it from memory, the allocation logic 412 may inspect the response message and/or record any relevant metadata 414. The allocation logic 412 may respond to the request to persist and free an existing external memory allocation with a response message. The response message may include a status, indicating whether the operation was successful.

Upon receiving a request to list existing external memory allocations, the allocation logic 412 may respond with a response message. The response message may include a list of external memory allocation identifiers for the external memory allocations associated with the management server 120. For example, in case of the system as illustrated in FIG. 6, the management server 120 may provide a list containing information of the external memory allocations X1-X3. Alternatively, or in addition, the response message may include a status, indicating whether the operation was successful.

Upon receiving a request to get information regarding an external memory allocation, the allocation logic 412 may respond with a response message. The response message may include the external memory identifier. Alternatively, or in addition, the response message may include identifiers and/or information describing the regions referenced by the external memory allocation and/or the logical relationships between the regions.

For example, in case the allocation logic 412 of the management server 120 of FIG. 6 receives a request to get information regarding the external memory allocation X1, the allocation logic 412 may retrieve region metadata 215*a*-*c* by sending a request to get information for the regions R1-R3 referenced by X1. The requests may be sent to the region access logic 212*a*-212*c* included in the memory appliances 110*a*-110*c* including the regions R1-R3. The identifiers and/or information may include access parameters for the regions, such as a password and/or an encryption key. Alternatively, or in addition, the response message may include metadata describing the external memory allocation X1, such as the not-in-use threshold for the external memory allocation X1 and/or for the regions R1-R3. Alternatively, or in addition, the response message may include a status, indicating whether the operation was successful.

Upon receiving a request to restructure an external memory allocation, the allocation logic 412 may determine how to structure the external memory allocation. The allocation logic 412 may determine how to structure the external memory allocation as described elsewhere in this disclosure. Alternatively, or in addition, the request to restructure an external memory allocation may include parameters specifying a desired structure for the external memory allocation and/or specifying parameters to be used to determine a revised structure. For example, the parameters may cause the allocation logic 412 to use a logical relationship involving striping between the regions referenced by the external memory allocation. Alternatively, or in addition, the parameters may cause the allocation logic 412 to use memory appliances with higher or lower bandwidth than the memory appliances including the regions currently referenced by the external memory allocation. Alternatively, or in addition, the parameters may cause the allocation logic 412 to use memory appliances that are closer to or farther from a specified physical and/or network location than the memory appliances including the regions currently referenced by the external memory allocation. As such, a request to restructure an external memory allocation may be used to migrate data closer to or further away from the client 130, for increasing or decreasing locality and/or for increasing or decreasing performance. This migrating of data may be part of a broader approach for balancing the cost/performance of memory included in the client 130, memory included in the memory appliances, and/or other media capable of holding the data, such as the backing store or other backing stores. Determining how to structure the external memory allocation may include determining whether to resize the existing regions referenced by the external memory allocation, whether to create additional regions, and/or whether to replace existing regions with new regions. The allocation logic 412 may resize the existing regions referenced by the external memory allocation, create additional regions, and/or replace existing regions with new regions using the methods described throughout this disclosure.

Using information provided by the allocation logic 412, by the region access logic 212, or both, the client logic may access one or more regions using client-side memory access. The client 130 may present a data interface to the application logic 314. The data interface may take many forms and/or may depend upon the preferences of the application logic 314 and/or of the users. Some examples of data interfaces may include: an API, block-level interface, a character-level interface, a memory-mapped interface, a memory allocation interface, a memory swapping interface, a memory caching interface, a hardware-accessible interface, a graphics processing unit (GPU) accessible interface and/or any other interface used to access the data and/or metadata of the memory appliance 110, the management server 120, the region 214, the external memory allocation, and/or the regions referenced by the external memory allocation. Alternatively or in addition, the data interface may include multiple interfaces. The data interface may be a data interface unit. The functionality of any of the data interfaces may be provided using all of or a portion of the functionality of any one or more of the other data interfaces. For example, a block-level interface may use methods and/or interfaces of an API in order to retrieve and/or manipulate external memory allocations and/or the regions referenced by an external memory allocation. Alternatively, or in addition, an API may include methods and/or interfaces to manipulate a block device interface.

Multiple data interfaces may be provided by the client logic. Alternatively, or in addition, multiple data interfaces may be accessed simultaneously. For example, a first application logic operating in a first client may access the region 214 via an API while a second application logic operating in a second client may access the same region 214 via a block-level interface. The first application logic and the second application logic may coordinate access to ensure data integrity and/or the application logics may not coordinate, such as when only performing read operations on the region 214. Alternatively, or in addition, a first client logic operating in the first client may coordinate with a second client logic operating in the second client to ensure data integrity. Coordinating to ensure data integrity may be performed using any known or later discovered logic and/or method for coordinating access to data, including but not limited to atomic operations, lock primitives, read-copy-update, etc.

In a first example, the data interface may include an API. An API may provide one or more interfaces for the application logic 314 to invoke that manipulate a region. The interface(s) for the application logic 314 to invoke that manipulate a region may include interface(s) that manipulate data included in the region, interface(s) that manipulate the metadata associated with the region, interface(s) that manipulate the access controls for the region, and/or any other interface(s) related to the region. For example, an interface may enable the application logic 314 to read or write data to a specific location within the region. Alternatively, or in addition, an API may provide one or more interface(s) for the application logic 314 to invoke that manipulate an external memory allocation. The interface(s) for the application logic 314 to invoke that manipulate an external memory allocation may include interface(s) that manipulate data included in the regions referenced by the external memory allocation, interface(s) that manipulate the metadata associated with the regions, interface(s) that manipulate the metadata associated with the logical relationships between the regions, interface(s) that manipulate the metadata associated with the external memory allocation, interface(s) that manipulate the access controls for the regions, interface(s) that manipulate the access controls for the external memory allocation, and/or any other interface(s) related to the external memory allocation, the logical relationships between the regions, and/or the regions referenced by the external memory allocation. In an example, an interface may enable the application logic 314 to read or write data to a specific location within the external memory allocation. Reading data from a first location within an external memory allocation may cause data to be read from one or more second locations within one or more regions referenced by the external memory allocation. Writing data to a first location within an external memory allocation may cause data to be written to one or more second locations within one or more regions referenced by the external memory allocation. The second locations and the regions may be determined based upon the logical relationships between the regions. In a second example, an interface may enable the application logic 314 to run a consistency check upon an external memory allocation that uses a parity-based logical relationship. In a third example, an interface may facilitate the application logic 314 to register the memory of the client and/or a portion of the memory with one or more communication interfaces. Registering memory may cause subsequent client-side memory access operations using the registered memory to proceed more quickly and/or more efficiently than operations not using the registered memory.

In another example, an API may allow the application logic 314, the client logic 312, and/or another logic to provide one or more passed functions to manipulate a region 214 and/or an external memory allocation. The passed function(s) may be used to perform custom and/or flexible manipulations upon the region 214 and/or the external memory allocation that may be cumbersome to express in other ways. For example, the passed function(s) may perform a matrix multiply operation upon the data of the region 214 and/or the external memory allocation. The logic of the passed function(s) may be operated at one or more of: the client 130, the memory appliance 110, the management server 120 and/or any other entity capable of operating the logic of the passed function, such as a metadata server. In one example, the logic of the passed function(s) may be operated at the client 130, such as by the client logic 312 performing a sequence of read and/or write operations specified by the passed function. In another example, the logic of the passed function(s) may be operated at the memory appliance 110, such as by the region access logic 212 performing a matrix add operation upon the data of the region 214. In another example, the logic of the passed function(s) may be operated at the management server 120, such as by the allocation logic 412 performing one or more operations upon the external memory allocation metadata 414. In other examples, the logic of the passed function(s) may be operated at multiple locations, such as if one passed function is operated at the management server 120 and another is operated at the memory appliance 110 or if a single passed function is operated partially at the client 130 and continues operation at the memory appliance 110.

Alternatively, or in addition, an API may provide one or more interfaces for the application logic 314 to invoke that retrieve, present, and/or manipulate information related to the management servers, the memory appliance, the external memory allocations, the regions referenced by the external memory allocations, and/or the logical relationships between the regions. The interface(s) may provide functionality similar to the allocation logic requests and/or region access logic requests. Alternatively, or in addition, the interface(s) may provide functionality similar to a combination of one or more of the allocation logic requests and/or region access logic requests. In a first example, an API may provide interface(s) for the application logic 314 to retrieve a list of management servers. In a second example, an API may provide interface(s) for the application logic 314 to retrieve a list of memory appliances, such as the memory appliances associated with a management server and/or known by the allocation logic of a management server. In a third example, an API may provide interface(s) for the application logic 314 to retrieve a list of external memory allocations, such as the external memory allocations associated with a management server. In a fourth example, an API may provide interface(s) for the application logic 314 to retrieve a list of regions, such as the regions included in the memory of a memory appliance or the regions associated with an external memory allocation. In a fifth example, an API may provide interface(s) for the application logic 314 to retrieve information related to an external memory allocation, such as the size of the external memory allocation, the regions referenced by the external memory allocation, and/or the logical relationships between the regions. In a fifth example, an API may provide interface(s) for the application logic 314 to manipulate an external memory allocation. An API may manipulate the external memory allocation using the allocation logic requests and/or the region access logic requests. In a sixth example, an API may provide interface (s) for the application logic 314 to manipulate a region. An API may manipulate a region using the region access logic requests.

In a second example, the data interface may include a block-level interface. The block-level interface may provide block-level access to data of a region. Alternatively or in addition, the block-level interface may provide block-level access to data of one or more of the regions referenced by an external memory allocation. Alternatively or in addition, the block-level interface may provide block-level access to data of the external memory allocation. Block-level access to data may include reading data from or writing data to a consistently-sized and/or aligned portion of a region or an external memory allocation. The client logic may provide block-level access using a block device interface. Alternatively, or in addition, the client logic may provide block-level access using any storage protocol now known or later discovered. A storage protocol may be any communications protocol used to transfer data between a block storage device, interface, or system, such as the block-level interface or any other data interface, and a device or system, such as the client or another client, that stores data in, and/or retrieves data from, the block storage device, interface, or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the one or more interconnects, that conforms to the USB standard. In a second example, the storage protocol may be the Small Computer System Interface (SCSI) command protocol. In a third example, the storage protocol may be the Serial Advanced Technology Attachment (SATA) protocol. Additional examples of the storage protocol include Serial Attached SCSI (SAS) and Internet Small Computer System Interface (iSCSI). Alternatively or in addition, the block-level interface may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, NVMe over Fabrics, NVMe over Fibre Channel, or any other combination of storage protocol and data transfer protocol known now or discovered in the future. Alternatively, or in addition, the block-level interface may provide block-level access by emulating the storage protocol and/or data transfer protocol. In one example, the block-level interface may provide block-level access by providing a SCSI command interface to the application logic. In a second example, the block-level interface may provide block-level access using a storage protocol with an emulated data transfer protocol, such as with a virtualized communication interface.

In a third example, the data interface may include a character-level interface. The character-level interface may provide character-level and/or byte-level access to data of a region. Alternatively or in addition, the character-level interface may provide character-level and/or byte-level access to data of one or more of the regions referenced by an external memory allocation. Alternatively or in addition, the character-level interface may provide character-level and/or byte-level access to data of the external memory allocation. The client logic may provide character-level access using a character device interface. Character-level access may enable the application logic 314 to read and/or write to character-aligned portions of the external memory allocation or of the regions referenced by the external memory allocation. Byte-level access may enable the application logic 314 to read and/or write to byte-aligned portions of the external memory allocation or of the regions referenced by the external memory allocation. Alternatively or in addition, the character-level interface may enable the application logic 314 to seek to a specified location within the external memory allocation or the regions referenced by the external memory allocation. Seeking to a specified location may cause subsequent attempts to read and/or write to the external memory allocation or the regions referenced by the external memory allocation to start at the most recently seeked-to location. Alternatively, or in addition, attempts to read and/or write to the external memory allocation or the regions referenced by the external memory allocation may start at a location after the most recently read and/or written portion.

In a fourth example, the data interface may include a memory-mapped interface. The memory mapped interface may enable the application logic 314 to map all of or a portion of a region, an external memory allocation and/or of one or more regions referenced by the external memory allocation into a virtual address space, such as the virtual address space of the application logic. The memory-mapped interface may include an API. Alternatively, or in addition, the memory-mapped interface may include and/or utilize a block-level interface and/or a character-level interface. In one example, the memory-mapped interface may enable the application logic 314 to map all of or a portion of a block device interface into a virtual address space, such as the virtual address space of the application logic.

The virtual address space may be one or more ranges of virtual addresses that are made available for one or more application logics to access memory, hardware devices, input-output interfaces, and/or any other resource known now or later discovered that the application may be configured to access. The virtual addresses of the virtual address space may be translated to other addresses, such as physical addresses, guest physical addresses, guest virtual addresses, host virtual addresses, host physical addresses, and/or any other addresses, locations, and/or identifiers known now or later discovered which reference the resource that may be mapped to the virtual addresses. The virtual addresses may be referred to as virtual memory addresses. Guest physical addresses and/or guest virtual addresses may be addresses used by a virtual machine as physical addresses and/or virtual addresses, respectively, such as by an operating system running within the virtual machine. Guest physical addresses may be treated as virtual addresses by a hypervisor operating the virtual machine. Host virtual addresses and/or host physical addresses may be addresses used by the hypervisor as virtual and/or physical addresses, respectively.

The virtual address space of the application logic may be the virtual address space made available to the application logic 314. The client 130 may include multiple virtual address spaces and/or multiple application logics 314. Each application logic 314 may be associated with a corresponding virtual address space. Alternatively or in addition, multiple application logics 314 may be associated with the same virtual address space, such as with a multi-threaded application and/or with an application that utilizes additional logic, such as from a shared library. For example, if all of or a portion of the client logic 312 is implemented as a shared library, that portion of the client logic 312 may be associated with the virtual address space of the application logic when invoked by the application logic 314.

The memory mapped interface may include a page fault handler interface. The page fault handler interface may be executed when the application logic attempts to access a first portion of the virtual address space. The first portion may be configured to trigger the page fault handler when accessed. The first portion may be a page of the virtual address space. Alternatively, or in addition, the first portion may be included in the mapped portion of the virtual address space. The page fault handler may perform client-side memory access to read a second portion of the external memory allocation and/or of one or more regions referenced by the external memory allocation into a third portion of the memory of the client. The third portion may be a page of the memory of the client. Alternatively, or in addition, the page fault handler may allocate the third portion of the memory of the client 130. The page fault handler may map the first portion of the virtual address space to the third portion of the memory. The first portion may correspond to the second portion. For example, the offset of the first portion within the mapped portion of the virtual address space may equal the offset of the second portion within the external memory allocation or the regions referenced by the external memory allocation. Alternatively, or in addition, the second portion may include a fourth portion corresponding to the third portion. The portion of the second portion not included in the fourth portion may be considered a fifth portion. For example, the page fault handler interface may determine based upon a pattern of calls to the page fault handler interface that the fifth portion of the external memory allocation and/or of the one or more regions may be needed soon and therefore, may be read into the memory in anticipation, such as with a read-ahead predicting algorithm.

Alternatively, or in addition, the memory mapped interface may include a background process and/or logic. The background process and/or logic may periodically flush dirty pages. Flushing dirty pages may include performing client-side memory access to write the data from the dirty pages to the corresponding locations within the external memory allocation and/or the one or more regions referenced by the external memory allocation. Dirty pages may be pages included in the memory of the client which have been written to by the application logic 314 and/or the client logic 312 since they were last read from or written to the external memory allocation and/or the one or more regions referenced by the external memory allocation.

Alternatively, or in addition, the memory mapped interface may include one or more page-reading interfaces. For example, the memory mapped interface may include an interface to read data for a page, and/or to read data for multiple pages. The interface to read data for a page may perform client-side memory access to read a corresponding portion of the external memory allocation and/or of one or more regions referenced by the external memory allocation (such as the second portion) into the page. The interface to read data for multiple pages may perform client-side memory access to read one or more corresponding portions of the external memory allocation and/or of one or more regions referenced by the external memory allocation into the pages. The corresponding portion(s) may be fully or partially contiguous portion(s) of the external memory allocation and/or of the one or more regions, such that a single client-side memory access operation may be performed to read the data for all of the pages. Alternatively, or in addition, the interface to read data for multiple pages may utilize multiple client-side memory access operations and/or a scatter-gather operation to access multiple and/or non-contiguous portions. The page-reading interface(s) may be invoked by the page fault handler interface. Alternatively, or in addition, the page-reading interface(s) may invoked by another logic, such as a prefetch and/or read-ahead logic.

The prefetch and/or read-ahead logic may invoke the page-reading interface(s) and/or may otherwise cause one or more portions of the external memory allocation and/or of one or more regions referenced by the external memory allocation to be read into the memory 310 of the client 130. By reading the portion(s) into the memory 310, the prefetch and/or read-ahead logic may avoid one of more future invocations of the page fault handler interface for one or more of the portion(s) and/or may allow the page fault handler interface to complete without needing to read the corresponding portion(s) into the memory, such as by adding a page-table entry for a page that has already been read into the memory 310 of the client 130 by the prefetch and/or read-ahead logic. The prefetch and/or read-ahead logic may determine the portion(s) to read using any mechanism and/or combination of mechanisms for selecting pre-fetch portion (s) and/or for predicting future page faults known now or later discovered. Examples of mechanisms for selecting pre-fetch portion(s) and/or for predicting future page faults may include fixed synchronous prefetching, adaptive synchronous prefetching, fixed asynchronous prefetching, adaptive asynchronous prefetching, perfect prefetching, etc. Alternatively or in addition, the prefetch and/or read-ahead logic may incorporate additional information to help determine the portion(s), such as prefetch hints from a compiler and/or profiling logic. Alternatively or in addition, the prefetch and/or read-ahead logic or another logic, such as the client logic 312, may include an interface that may enable the application logic 314 to request one or more portions of the memory to be read into the memory 310 of the client 130. The interface may be utilized by the application logic 314 explicitly, such as by adding pre-fetch requests to the application logic's source code, and/or implicitly, such as if pre-fetch requests are added by a compiler, a profiler, and/or other logic.

Alternatively, or in addition, the memory mapped interface may include one or more page-writing interfaces. For example, the memory mapped interface may include interface(s) to write data for a page, and/or to write data for multiple pages. The interface(s) to write data for a page may perform client-side memory access to write data from the page to a corresponding portion of the external memory allocation and/or of one or more regions referenced by the external memory allocation (such as the second portion). The interface(s) to write data for multiple pages may perform client-side memory access to write data from the pages to one or more corresponding portions of the external memory allocation and/or of one or more regions referenced by the external memory allocation into the pages. The corresponding portion(s) may be fully or partially contiguous portion(s) of the external memory allocation and/or of the one or more regions, such that a single client-side memory access operation may be performed to write the data for all of the pages. Alternatively, or in addition, the interface(s) to write data for multiple pages may utilize multiple client-side memory access operations and/or a scatter-gather operation to access multiple and/or non-contiguous portions. The page-writing interface(s) may be invoked by the background process and/or logic, a page evicting interface, and/or another logic, such as a writeback worker of an operating system.

Alternatively, or in addition, the memory mapped interface may include a page evicting interface. Pages to be evicted may include the one or more pages of the memory used to hold the third portion of the memory of the client. The page evicting interface may be executed when the memory-mapped interface and/or an operating system determines that the pages to be evicted are unlikely to be accessed again soon, when the memory-mapped interface determines that the pages to be evicted are needed to hold data for other executions of the page fault handler interface, and/or when the pages to be evicted are needed to hold data for any other purpose. If one or more of the pages to be evicted are dirty pages, the page evicting interface may perform client-side memory access to write data from the dirty pages to a corresponding portion of the external memory allocation and/or the regions referenced by the external memory allocation. The page evicting interface may update metadata to indicate that the pages to be evicted may be re-used for other purposes, such as by the page fault handler interface.

In a fifth example, the data interface may include a memory allocation interface. The memory allocation interface may include an API. The memory allocation interface may include one or more interfaces that enable the application logic 314 to allocate one or more buffers. For example, an application may allocate a buffer to hold an integer, an array of integers, a character, a string, and/or any other data. Alternatively, or in addition, the memory allocation interface may include one or more interfaces that enable an application-level memory allocator to allocate one or more slabs of memory. A slab of memory may include one or more pages. The one or more pages included in the slab may be contiguous in a physical address space and/or in a virtual address space. A slab of memory may be further sub-divided by the application-level memory allocator. For example, the application-level memory allocator may enable the application logic 314 to allocate buffer(s) from one or more portions of the slab of memory. The memory allocation interface may utilize a memory-mapped interface. For example, allocating the buffer(s) and/or allocating the slabs of memory may include mapping all of or a portion of an external memory allocation and/or of one or more regions referenced by the external memory allocation into a virtual address space, such as the virtual address space of the application. The virtual address of a buffer and/or of a slab may be included in a portion of the virtual address space corresponding to a portion of the external memory allocation and/or of the regions. Alternatively, or in addition, allocating the buffer(s) and/or allocating the slabs of memory may include creating one or more external memory allocations and/or regions. The memory allocation interface may be made available selectively to one or more application logics. Alternatively, or in addition, the memory allocation interface may be made available to all application logics.

The memory allocation interface may initialize the buffer(s), the slab(s), and/or the portion(s) of memory prior to mapping. Initializing the buffer(s), slab(s), and/or the portion(s) of memory may have security advantages, such as by avoiding exposing data in freed memory of one application logic 314 to another application logic. In one example, the memory allocation interface may fill the buffer(s), the slab(s), and/or the portion(s) with zeros, such as by writing to the external memory allocation and/or the region(s). In another example, the memory allocation interface may allocate one or more cache portions, such as pages of page cache, initialize the cache portion(s), and/or associate the cache portion(s) with the buffer(s), the slab(s), and/or the portion(s) of memory.

In other examples, the memory allocation interface may not initialize some or all of the buffer(s), the slab(s), and/or the portion(s) of memory prior to mapping. For example, the memory allocation interface may defer initialization of some or all of the buffer(s), the slab(s), and/or the portion(s) of memory until the memory is accessed and/or written to, such as during a page fault. In examples such as these, at least a second portion may be initialized after it is mapped. When handling page faults for reading a mapped portion of the buffer(s), the slab(s), and/or the portion(s) of memory, the memory allocation interface may register a read-only page table entry for a pre-initialized page, such as a page full of zeros. The page full of zeros may be provided for multiple page faults and/or may be referenced by multiple page table entries. When handling page faults for reading a mapped portion of the buffer(s), the slab(s), and/or the portion(s) of memory, the memory allocation interface may allocate one or more cache portion(s), such as pages of page cache, initialize the cache portion(s), and/or associate the cache portion(s) with the buffer(s), the slab(s), and/or the portion(s) of memory. Alternatively or in addition, the memory allocation interface may allocate the one or more cache portion(s) when handling page faults for reading.

Deferring initialization of some or all of the buffer(s), the slab(s), and/or the portion(s) of memory until accessed and/or written to may be advantageous, because it may enable the memory allocation interface to handle requests to allocate memory more quickly and/or because it may enable the memory allocation interface to avoid accessing the external memory allocation and/or the region(s) for initialization of the buffer(s), the slab(s), and/or the portion(s) of memory. For example, the external memory allocation and/or the region(s) may only be written to if and/or when the cache portion(s) are to be written-back to the external memory allocation and/or the region(s). For buffer(s), slab(s), and or portion(s) or memory which are freed shortly after being allocated, the memory allocation interface may avoid accessing the external memory allocation and/or the region(s) entirely, such as by initializing the cache portion(s) when the memory is accessed and discarding the cache portion(s) when the buffer(s), the slab(s), and/or the portion(s) of memory are freed.

In some embodiments, the client logic 312 may select a portion of the region 214 and/or of the external memory allocation to be the slab in coordination with one or more other logics. For example, the client logic 312 may select a portion of the region 214 and/or of the external memory allocation to be the slab in coordination with at least one of a different client logic, the region access logic 212, the observer logic 218, the allocation logic 412, the application logic 314, and/or any other logic. Collectively, the client logic 312 and/or the one or more other logics may be considered allocation-coordinating logics.

The client logic 312 and/or other logic(s) may coordinate access using one or more memory-allocation data structures. The memory-allocation data structure(s) may be shared by the client logic 312 and/or other logic(s). For example, the memory-allocation data structure(s) may be included in a shared memory and/or shared storage medium. In some embodiments, the memory-allocation data structure(s) may be accessible via client-side memory access. Alternatively, or in addition, one or more of the client logic 312 and/or other logic(s) may maintain a copy of the memory-allocation data structure(s).

The memory-allocation data structure(s) may include one or more indicators which convey whether one or more portions of the region 214 and/or of the external memory allocation have been allocated. For example, the indicator(s) may include one or more flags corresponding to one or more fixed-size portions of the region and/or of the external memory allocation. In some examples, the fixed-size portion(s) may be the size of a page of memory. In other examples, the fixed-size portion(s) may be smaller or larger than a page of memory, such as a chunk, a huge page, and/or an arena of memory. In other examples, the indicator(s) may correspond to one or more variable-sized portions of the region and/or of the external memory allocation. For example, the indicator(s) may be associated with and/or included in one or more data structures which identify one or more portions of the region 214 and/or of the external memory allocation. The one or more data structures may be organized to facilitate efficient memory allocation and/or deallocation. For example, the one or more data structures may include one or more collections of portions which may be allocated to a corresponding application logic and/or which may be unallocated. In some examples, the one or more data structures may convey whether portion(s) of the region 214 and/or of the external memory allocation have been allocated, without including explicit indicator(s), such as if the one or more data structures include one or more collections of portions which may be allocated to a corresponding application logic 314 and/or which may be unallocated. Collection(s) of portions may be organized, such as with an array, a list, a tree, a red-black tree, a B-tree, a B+ tree, a hash table, a distributed hash table, and/or with any other collection data structure.

In at least one example implementation, the memory-allocation data structure(s) may include an array of indicators, such as a bit-array, wherein the nth indicator corresponds to the nth fixed-sized portion of the region 214 and/or of the external memory allocation.

The memory-allocation data structure(s) may include other information related to the portion(s). For example, the memory-allocation data structure(s) may include addresses, offsets, and or sizes which describe the position and/or size of the portion(s) within the region 214 and/or the external memory allocation. Alternatively, or in addition, the memory-allocation data structure(s) may include client identifier(s), process identifier(s), and/or virtual address(es) to which the portion(s) are mapped. Alternatively, or in addition, the memory-allocation data structure(s) may be associated with one or more other data structures which include the other information, such as by including a pointer to the other data structure(s).

The memory-allocation data structure(s) and/or the other data structure(s) may be stored in the region 214, in the external memory allocation, in the region metadata 215, in the external memory allocation metadata 318 414, and/or in another area of memory and/or storage. The memory-allocation data structure(s) and/or the other data structure(s) may be stored at one or more well-known locations, such as at the beginning and/or the end of the region 214, at a specific offset within the region metadata 215 and/or external memory allocation metadata 318 414, etc.

Figure 8:
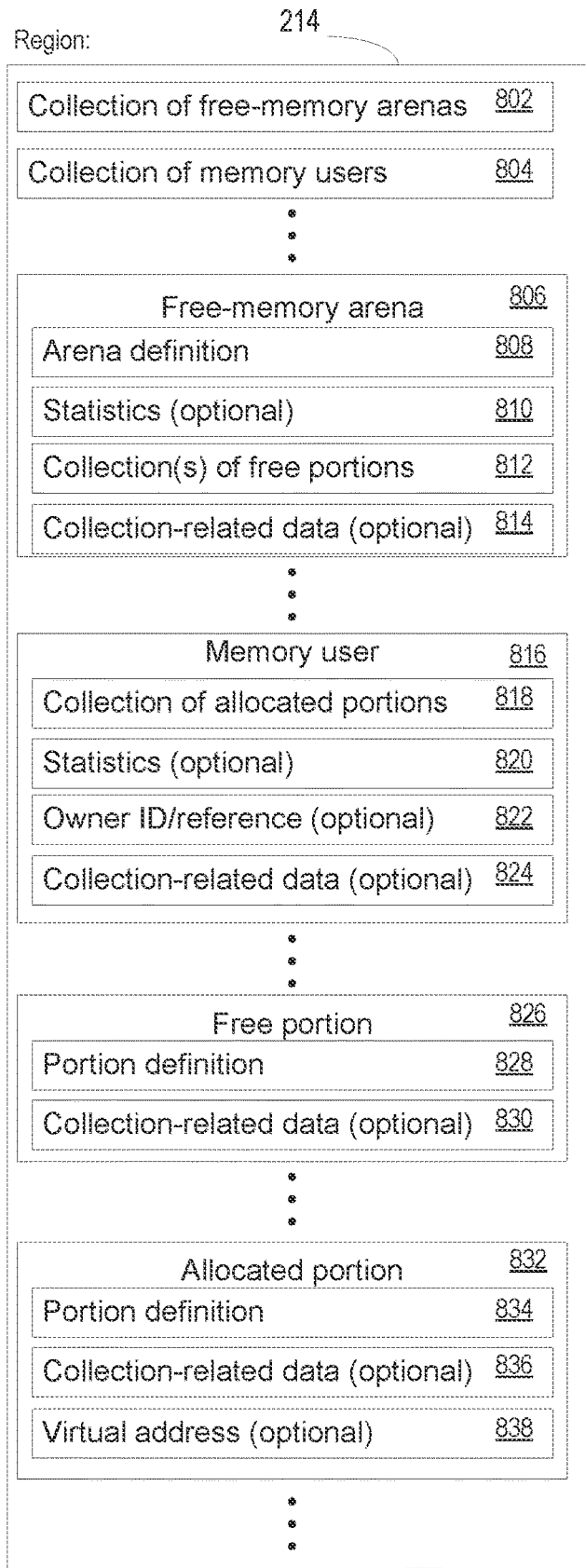
FIG. 8 illustrates an example of memory-allocation data structure(s)

FIG. 8 illustrates an example of the memory-allocation data structure(s). In an example implementation, the memory allocation data structures may be stored in the region 214. The memory allocation data structures may include a collection of free-memory arenas 802 and/or a collection of memory users 804.

In some examples, there may be only one arena, and/or the collection of free-memory arenas 802 may be replaced by a free-memory arena data structure 806. Alternatively or in addition, there may be only one memory user, and/or the collection of memory users 804 may be replaced by a memory user data structure 816.

Collection(s), such as the collection of free-memory arenas 802, the collection of memory users 804, and/or any other collections described herein, may be organized, such as with an array, a list, a tree, a red-black tree, a B-tree, a B+ tree, a hash table, a distributed hash table, and/or with any other collection data structure. Collection(s) may include and/or may reference zero or more other data structures. For example, the collection of free-memory arenas 802 may include and/or may reference zero or more free-memory arena data structures 806, such as if the collection of free-memory arenas 802 includes an array of free-memory arena data structures 806. In another example, the collection of free-memory arenas 802 may reference zero or more free-memory arena data structures 806, such as with an array of references to free-memory arena data structures, a linked list of free-memory arena data structures, a tree of free-memory arena data structures, and/or any other collection data structure. In other examples, the collection of memory user(s) 804 may include and/or may reference zero or more memory user data structures 816.

The free-memory arena data structure(s) 806 may include an arena definition 808, statistics 810, one or more collections of free portions 812, and/or collection-related data 814. The free-memory arena data structure(s) 806 may include more, fewer, and/or different elements. For example, the free-memory arena data structure(s) 806 may not include the arena definition 808. As another example, the free-memory arena data structure(s) 806 may not include the statistics 810. In some examples, the free-memory arena data structure(s) 806 may only include the collection(s) of free portions 812. The arena definition 828 may describe the corresponding arena, such as by including an offset within the region and/or a size of the arena. Alternatively, or in addition, the arena definition 828 may include a start and/or an end offset within the region for the corresponding arena. As such, the arena definition may enable the client logic 312 and/or another logic to identify the appropriate arena(s) for portions being freed. The statistics 810 may include a total of already-allocated memory associated with the free-memory arena, a total of available memory associated with the free-memory arena, a total of un-allocated memory associated with the free-memory arena, high watermarks, low watermarks, and/or any other information and/or statistics which may be useful for allocating, freeing, and/or tracking portions of the region/arena, and/or for any other purpose.

The one or more collections of free portions 812 may include and/or may reference zero or more free portion data structures 826. For example, the one or more collections of free portions 812 may include a red-black tree of zero or more free portion data structures 826. Other examples may involve using any other collection data structure to include and/or reference zero or more free portion data structures 826.

The collection-related data 814 may be data which enables the free-memory arena data structure(s) 806 to be considered part of the collection of free-memory arenas 802. For example, the collection-related data 814 may include one or more references to other data structures, such as other free-memory arena data structure(s) 806 and/or the collection of free memory arenas 802. The references may be organized in such a way as to suit the particular collection of which it is considered a part. For example, for a list collection, the references may point to a previous and/or next element in the list. For a tree collection, the references may point to a left, right, and/or upward element in the tree. In some examples, the free-memory arena data structure 806 may not contain any collection-related data 814, such as if there is only one free-memory arena and/or if the collection of free-memory arenas 802 is based upon an array collection.

The free portion data structure(s) 826 may each include a portion definition 828 and/or collection-related data 830. The free portion data structure(s) 826 may include more, fewer, and/or different elements. For example, the free portion data structure(s) 826 may not include the collection-related data 830. In some examples, the free portion data structure(s) 826 may only include the portion definition 828. The portion definition 828 may describe the corresponding portion, such as by including an offset within the region and/or a size of the portion. Alternatively, or in addition, the portion definition 828 may include a start and/or an end offset within the region for the corresponding portion.

The collection-related data 830 may be data which enables the free portion data structure 826 to be considered part of a collection of free portions 812. For example, the collection-related data 830 may include one or more references to other data structures, such as other free-portion data structure(s) 826 and/or the collection of free portions 812. The references may be organized in such a way as to suit the particular collection of which it is considered a part. For example, for a list collection, the references may point to a previous and/or next element in the list. For a tree collection, the references may point to a left, right, and/or upward element in the tree. In some examples, the free portion data structure 826 may not contain any collection-related data 830, such as if there is only one free portion and/or if the collection of free portions 812 is based upon an array collection.

The memory user data structure(s) 816 may include a collection of allocated portions 818, statistics 820, an owner identifier and/or reference 822, and/or collection-related data 824. The memory user data structure(s) 816 may include more, fewer, and/or different elements. For example, the memory user data structure(s) 816 may not include the owner identifier and/or reference 822. In some examples, the memory user data structure(s) 816 may only include the collection of allocated portions 818. The statistics 820 may include a total of allocated memory associated with the memory user, a total of available memory associated with the memory user, high watermarks, low watermarks, and/or any other information and/or statistics which may be useful for allocating, freeing, and/or tracking portions of the region/arena, and/or for any other purpose.

The owner identifier and/or reference 822 may refer to one or more application logics 314 and/or virtual address spaces of the application logic(s) 314 and/or may associate the memory user data structure 816 with the one or more application logics 314 and/or virtual address spaces of the application logic(s) 314. The one or more application logics 314 and/or virtual address spaces referenced and/or associated by the owner identifier and/or reference 822 may be considered the memory user for the memory user data structure 816.

The collection of allocated portions 818 may include and/or may reference zero or more allocated portion data structures 832. For example, the collection of allocated portions 818 may include a red-black tree of zero or more allocated portion data structures 832. Other examples may involve using any other collection data structure to include and/or reference zero or more allocated portion data structures 832.

The collection-related data 824 may be data which enables the memory user data structure(s) 816 to be considered part of the collection of memory users 804. For example, the collection-related data 824 may include one or more references to other data structures, such as other memory user data structure(s) 816 and/or the collection of memory users 804. The references may be organized in such a way as to suit the particular collection of which it is considered a part. For example, for a list collection, the references may point to a previous and/or next element in the list. For a tree collection, the references may point to a left, right, and/or upward element in the tree. In some examples, the memory user data structure 816 may not contain any collection-related data 824, such as if there is only one memory user and/or if the collection of memory users 804 is based upon an array collection.

The allocated portion data structure(s) 832 may each include a portion definition 834, collection-related data 836, and/or a virtual address 838. The allocated portion data structure(s) 832 may include more, fewer, and/or different elements. For example, the allocated portion data structure (s) 832 may not include the virtual address 838. In some examples, the allocated portion data structure(s) 832 may only include the portion definition 834. The portion definition 834 may describe the corresponding portion, such as by including an offset within the region and/or a size of the portion. Alternatively, or in addition, the portion definition 834 may include a start and/or an end offset within the region for the corresponding portion.

The virtual address 838 may be an address within the virtual address space of one or more application logics 314 to which the corresponding portion is mapped. The one or more application logics 314 associated with the virtual address space may be associated with the memory user data structure 816. For example, the collection of allocated portions 818 may be a collection of portions allocated for the application logic(s) 314 and/or mapped to the virtual address space of the application logic(s) 314.

The collection-related 836 data may be data which enables the allocated portion data structure 832 to be considered part of a collection of allocated portions 818. For example, the collection-related data 836 may include one or more references to other data structures, such as other allocated-portion data structure(s) 832 and/or the collection of allocated portions 818. The references may be organized in such a way as to suit the particular collection of which it is considered a part. For example, for a list collection, the references may point to a previous and/or next element in the list. For a tree collection, the references may point to a left, right, and/or upward element in the tree. In some examples, the allocated portion data structure 832 may not contain any collection-related data 836, such as if there is only one allocated portion and/or if the collection of allocated portions 818 is based upon an array collection.

The collection(s) may be ordered and/or unordered. For example, the free portion data structure(s) 826 may be ordered by starting offset of the corresponding portion(s) within the region 214. Ordering may be advantageous in that it may improve the computational efficiency of freeing memory and/or of identifying adjacent portions while freeing and/or allocating memory. Alternatively and/or in addition, the collection(s) may be binned and/or unbinned. Binning may be advantageous in that it may improve the computational efficiency of allocating memory and/or may help minimize memory fragmentation. For example, the collection(s) may be binned based on the size of the portion(s) described by the corresponding free portion data structure(s) 826. In such examples, one bin may include a collection of free portion data structure(s) 826 with sizes in a range corresponding to small portions, another bin may include a collection of free portion data structures 826 with sizes in a range corresponding to medium-sized portions, while other bins may include collection(s) of free portion data structures 826 with sizes in a range corresponding to larger portions. Consequently, in handling an allocation request for a specified buffer size, the client logic 312 and/or the memory allocation interface may ignore bins containing portions smaller than the specified portion size, and may begin searching in the smallest bin with portions larger than the specified portion size. The bins may be designed to suit any preferred allocation strategy. For example, the minimum and/or maximum sizes of portions included in and/or referenced by a bin may be powers of two, multiples of a page-size, and/or, power-of-two multiples of page-sizes. Alternatively or in addition, the minimum and/or maximum sizes may be based upon some other one or more criteria and/or may be arbitrarily chosen.

In some examples, a free portion data structure 826 may be considered part of multiple collections of free portions 812, such as if a free memory arena 806 includes an overall collection of free portions containing and/or referencing all free portion data structures 826 for the arena plus a set of binned collections of free portions containing and/or referencing free portion data structures 826 associated with corresponding bins. In these examples, the collection-related data 830 may include data which enables the free portion data structure 826 to be considered part of multiple collections of free portions 812, such as the overall collection of free portions and/or one or more binned collections of free portions. For example, the collection-related data 830 may include multiple sets of references to other data structures. In one example, if the free portion data structure 826 is considered to be part of multiple list collections, the collection-related data 830 may include references pointing to multiple previous and/or next elements for the multiple list collections. If the free portion data structure 826 is considered to be part of multiple tree collections, the collection-related data 830 may include references pointing to multiple left, right, and/or upward elements in the tree. Other examples are possible, such as if the free portion data structure 826 is considered to be part of a single list collection and a single tree collection, multiple list and/or tree collections, and/or any other combination of multiple collection data structures.

The collection of free-memory arenas 802, the collection of memory users 804, and/or any other data and/or data structures may be stored at one or more well-known locations. For example, the collection of free-memory arenas 802 may be stored at the beginning of the region 214, as illustrated in this example. Alternatively or in addition, the collection of memory users 804 may be stored immediately after the collection of free-memory arenas 802, such as illustrated in this example. Examples of other well-known locations include: at the end of the region 214, at a particular offset within the region 214, immediately preceding other data and/or data structure(s) within the region, and/or at any other absolute and/or relative position that can be relied upon to locate and/or identify the data structure(s). Alternatively or in addition, the collection(s), data, and/or data structure(s) may be stored elsewhere, such as with the region metadata 215, the memory 210, the backing store 260, and/or any other location capable of holding information. In some examples, the collection(s), data, and/or data structure(s) may be stored in multiple locations, such as by replicating and/or distributing them.

A reference to a data structure included in the region may enable the client logic and/or any other logic to access the data structure included in the region, such as by providing its location within the region. The location may be provided directly, such as with a reference value equal to an offset in the region at which the data structure is stored, and/or indirectly, such as with a virtual address which may be translatable to a position within the region. In cases where references are virtual addresses, coordinating client logics 312 may use a similarly-configured address space to map one or more portions of the region, such that virtual addresses referencing a given data structure would be the same at each corresponding client 130, and therefore may be dereferenced directly by the client logic 312 and/or other logic to access the data structure.

Access to the memory-allocation data structure(s) may be coordinated using one or more synchronization primitives and/or methods. For example, the memory-allocation data structure(s) may be accessed using atomic operations. Atomic operations may be any operation which appears to the rest of the system to occur at once without being interrupted. Examples of atomic operations may include read, write, exchange, compare-and-exchange, compare-and-swap, test-and-set, test-and-clear, add-and-return, subtract-and-return, fetch-and-add, and/or fetch-and-subtract. In a first example, the client logic 312 and/or other logic(s) may perform a test-and-set upon a flag corresponding to a portion of the region 214 and/or external memory allocation to mark the portion as allocated. In second example, the client logic 312 and/or other logic(s) may perform a test-and-clear upon the flag to mark the corresponding portion as unallocated. In a third example, the client logic 312 and/or other logic(s) may perform atomic operations to access and/or manipulate a more complex data structure. For example, the client logic 312 and/or other logic(s) may perform compare-and-swap operations to manipulate a red-black tree, as described in "Lock-Free Red-Black Trees Using CAS" by Jong Ho Kim, et al.

Alternatively or in addition, one or more lock primitives may be used to coordinate access to the memory-allocation data structure(s). Lock primitives may include logic and/or data structures which enforces a concurrency control policy. Examples of lock primitives include binary semaphores, counting semaphores, spinlocks, readers-writers spinlocks, mutexes, recursive mutexes, and/or readers-writers mutexes. Lock primitives may include distributed locks and/or may be provided by a distributed lock manager. Examples of distributed locks and/or distributed lock managers include VMSCluster, Chubby, ZooKeeper, Etcd, Redis, Consul, Taooka, OpenSSI, and/or Corosync and/or any other distributed lock(s) and/or distributed lock manager(s) known now or later discovered.

Alternatively, or in addition, access to and/or updates to the memory-allocation data structures may be coordinated via message-passing. For example, a first client logic and/or another logic may serve as a primary owner of the memory-allocation data structure(s) and/or a second client logic may request the first client logic and/or other logic (such as by sending a message to the first client logic and/or other logic) to check and/or update the memory-allocation data structure(s), to perform atomic operations upon the memory-allocation data structure(s), to allocate the portion and/or the slab, and/or to free the portion and/or the slab. Upon completing the requested operation, the first client logic and/or other logic may respond to the request, such as by sending a response message to the second client logic.

The primary owner may be elected using any leader election logic and/or coordinator election logic now known or later discovered. Examples of leader election logics and/or coordinator election logics are Shout, Mega-Merge, YO-YO, Bully, Chang and Roberts, Hirschberg-Sinclair, Korach-Kutten-Moran, Paxos, Virtual Synchrony, and/or Raft. The leader election logic and/or coordinator election logic may use any one or more characteristics and/or configurations of the client 130 to differentiate the corresponding client logic(s) and/or other logic(s), such as serial numbers of the client 130 and/or any component parts (such as the communication interface(s) 330), configured priority value(s), uptime, resource availability, etc. In examples where one or more preferred differentiating characteristics and/or configurations fail to differentiate between two or more logics, the leader election logic and/or coordinator election logic may use other characteristics and/or configurations as secondary, tertiary, etc. differentiators until each logic is differentiated from all others.

In other examples, the allocation-coordinating logics may coordinate allocation via message-passing without a primary owner. For example, the second client logic may select a portion to allocate and/or may announce the selected portion to all other allocation-coordinating logics, such as by sending a message to the first client logic and/or other logic(s). Upon receiving the message, each allocation-coordinating logic may check if the portion is already allocated and may respond (such as by sending a response message) acknowledging the message announcing the selected portion. If all other allocation-coordinating logics acknowledge the message announcing the selected portion, the second client logic may conclude that the selected portion is allocated to it. Message-passing may include a transmission of a message using User Datagram Protocol (UDP) or any other connectionless and/or unreliable communication protocol. Alternatively or in addition, Message-passing may include a transmission of a message using a TCP connection, an SSL connection, InfiniBand reliable connections, RoCE, iWARP, HTTP, or any other communications protocol known now or later discovered.

Figure 9A:
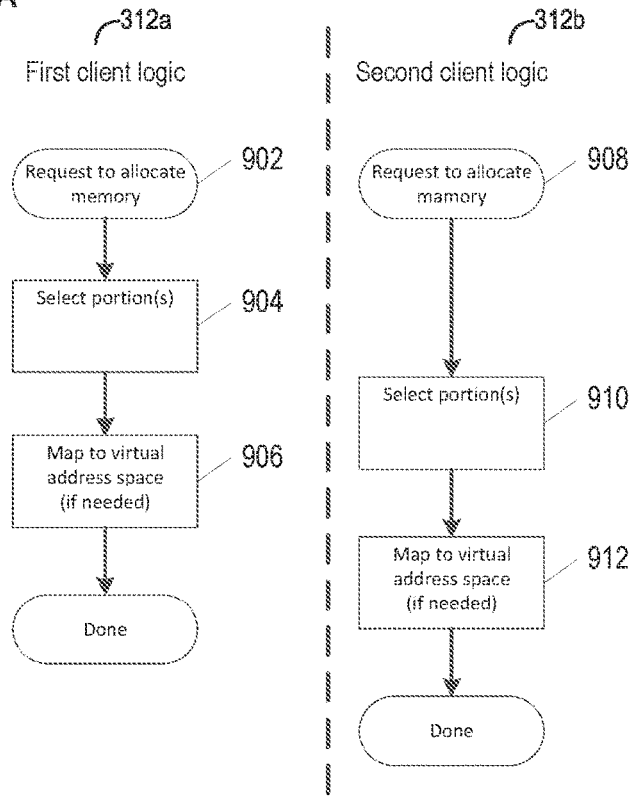
FIG. 9A, FIG. 9B, FIG. 9C, and FIG. 9D illustrate an example scenario of coordinated allocation of external memory.
Figure 9B:
Figure 9C:
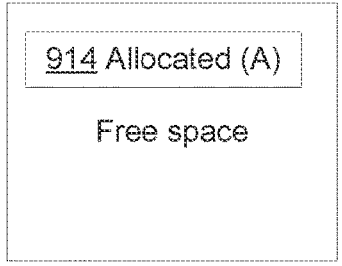

FIG. 9A, FIG. 9B, FIG. 9C, and FIG. 9D illustrate an example scenario of coordinated allocation of external memory. A client logic 312 of a first client 130 (a first client logic 312*a*) may receive a first request for allocation of memory (902). In response to the first request, the first client logic 312*a* may select one or more portions 914 of the external memory allocation X1 and/or of the region(s) 214 (such as at least one of the constituent regions R1 R2 R3 of the external memory allocation X1) (904). The selected portion(s) may be and/or may constitute the slab. Alternatively or in addition, the selected portion(s) may be and/or may constitute a buffer. FIG. 9B illustrates the state of the eternal memory allocation X1 prior to selecting (904) the one or more portions 914. FIG. 9C illustrates the state of the external memory allocation X1 after selecting (904) the one or more portions 914.

Upon selecting the portion(s) (904), the first client logic 312*a* may optionally map the portion(s) to a first virtual address space of the first client 130 (906). In other examples, the portion(s) may already be mapped, such as if the first client logic 312*a* and/or the application logic 314 maps all of and/or a portion of the external memory allocation X1 and/or of one or more regions 214 to the first virtual address space prior to receiving the request (902) and/or prior to selecting the portion(s) (904). In examples where the portion(s) are already mapped, mapping the portion(s) to the first virtual address space (906) may be skipped.

Upon completing and/or skipping mapping the portion(s) to the first virtual address space (906), the first client logic 312*a* may complete the first request for allocation of memory, such as by returning the virtual address and/or size of the selected portion to the first application logic 314.

Figure 9D:
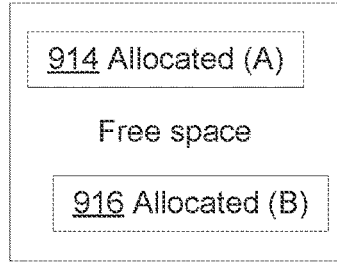

Concurrent to the first client logic 312*a* handling the first request for allocation of memory (902), a client logic 312 of a second client 130 (a second client logic 312*b*) may receive a second request for allocation of memory (908). In response to the second request, the second client logic 312*b* may select one or more portions 916 of the external memory allocation and/or of the region 214 (910). The external memory allocation and/or the region 214 may be the same external memory allocation X1 and/or the same region(s) R1 R2 and/or R3 as used by the first client logic 312*a*. Alternatively, the external memory allocation and/or the region 214 may be different. The selected portion(s) may be and/or may constitute the slab. Alternatively or in addition, the selected portion(s) may be and/or may constitute a buffer. FIG. 9D illustrates the state of the external memory allocation X1 after selecting (910) the one or more portions 916 by the second client logic 312*b*.

Selecting the portion (904, 910) may include accessing and/or updating the memory-allocation data structure(s). For example, the first client logic 312*a* and/or the second client logic 312*b* may perform one or more atomic operations to check if the portion(s) are allocated and/or to mark the portion(s) as allocated, as described elsewhere in this disclosure. In other examples, the first client logic 312*a* and/or the second client logic 312*b* may use one or more lock primitives to coordinate access to the memory-allocation data structure(s). Therefore, selecting the portion (904, 910) and/or accessing and/or updating the memory-allocation data structure(s) may be performed such that multiple client logics 312*a* 312*b* can handle multiple concurrent requests for allocation of memory without any client logics 312*a* 312*b* selecting the same portion(s) for different requests.

Upon selecting the portion(s) (910), the second client logic 312*b* may optionally map the portion(s) to a second virtual address space of the second client 130 (912). In other examples, the portion(s) may already be mapped, such as if the second client logic 312*b* and/or the application logic 314 maps all of and/or a portion of the external memory allocation and/or of one or more regions 214 to the second virtual address space prior to receiving the request (908) and/or prior to selecting the portion(s) (910). In examples where the portion(s) are already mapped, mapping the portion(s) to the second virtual address space (912) may be skipped.

Upon completing and/or skipping mapping the portion(s) to the second virtual address space (912), the second client logic 312*b* may complete the second request for allocation of memory, such as by returning the virtual address and/or size of the selected portion to the second application logic 314.

In response to one or more application logic(s) 314 being destroyed, the client logic 312 may free one or more slabs, such as all slabs previously allocated to the application logic(s) 314. For example, the application logic(s) may be destroyed upon completing a sequence of logic operations, executing an exit operation, and/or being terminated by a user and/or a supervisor logic. To facilitate freeing the one or more slabs, the client logic 312 may track which slab(s)

are allocated to each application logic 314, such as with the memory-allocation data structure(s) and/or other data structure(s).

Alternatively or in addition, one or more application logic(s) 314 may be considered destroyed if the corresponding client 130 stops operation and/or becomes unresponsive and/or unreachable, such as if the client 130 has lost power, crashed, and/or has become disconnected from its interconnect 140. Upon one or more application logic(s) 314 being considered destroyed, a different client logic 312 and/or another logic may free the one or more slabs, such as all slabs allocated to the application logic(s) 314. The one or more application logic(s) 314 may be considered destroyed if other logic(s), such as other client logic(s) 312, region access logic(s), and/or the allocation logic 412 determines that the application logic(s) 314 are no longer operational. The other logic(s) may determine that the application logic(s) 314 are no longer operational in a distributed manner, such as by checking connectivity to the corresponding client 130 from one or more other client(s) 130, memory appliance(s) 110, and/or management server(s) 120. In another example, the other logic(s) may determine that the application logic(s) 314 are no longer operational by checking the last time at which the application logic(s) 314, the corresponding client logic(s) 312, and/or client(s) 130 accessed the external memory allocation and/or the region(s) referenced by the external memory allocation.

In some embodiments, the client logic 312 and/or another logic may select a portion of local primary memory to be the slab in response to some memory allocation requests and/or may select a portion of external primary memory to be the slab in response to other (and/or the same) memory allocation requests. In some examples, in response to a memory allocation request for a slab of memory having a size A, the client logic 312 and/or another logic may select a portion of local primary memory having a size A or a portion of external primary memory having a size A to be the slab. In some other examples, in response to a memory allocation request for a slab of memory having a size A, the client logic 312 and/or another logic may select a portion of local primary memory having a size B and a portion of external primary memory having a size C to be the slab, where A=B+C. Selecting a portion of local primary memory to be the slab may be useful, for example, where the amount of available local primary memory exceeds the amount of available external primary memory and/or when the amount of available local primary memory is nearly sufficient to cover the needs of one or more application logics 314. For example, an application logic 314 that allocates 1.4 TiB of memory may be operated with a client 130 containing 1 TiB of available local primary memory in communication with a memory appliance 110 containing 512 GiB of available local primary memory. In examples such as this, the client logic 312 and/or another logic may utilize some portion of the memory 310 of the client 130 as a cache for the data stored in external primary memory. In one such example, 0.9 TiB of local primary memory may be allocated for direct use by the application logic 314 plus 512 GiB of external primary memory. The remaining 0.1 TiB of local primary memory may be operated as a cache for the data in the 512 GiB of external primary memory. In some examples, this approach may enable over-subscribing and/or under-provisioning of memory, such as discussed elsewhere in this disclosure.

Figure 10:
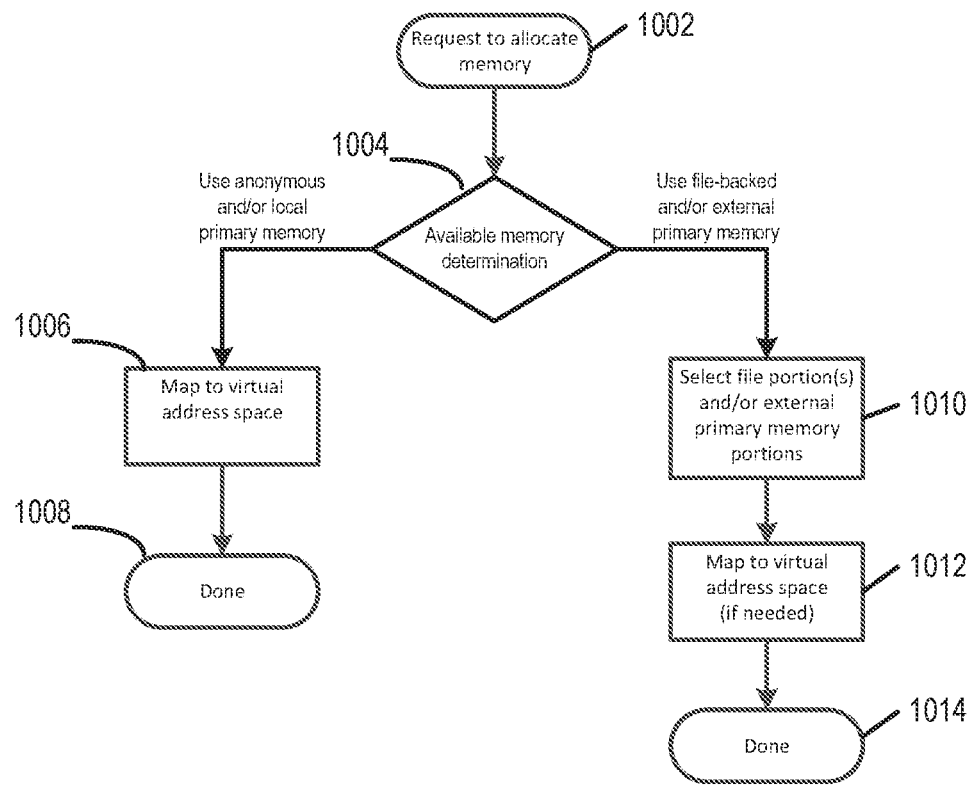
FIG. 10 illustrates an example flowchart for selecting between multiple types of memory in response to a request to allocate memory.

FIG. 10 illustrates an example flowchart for selecting between multiple types of memory in response to a request to allocate memory. The client logic 312 and/or another logic may perform the operations shown in FIG. 10 and/or other figures herein. The client logic 312 may include, for example, a swap implementation of an operating system. In addition to the operations shown in FIG. 10, the swap implementation of the operating system may manage, for example, operations related to swapping data into or out of local primary memory. Although external primary memory, in some examples, may be implemented at least in part in the swap implementation of the operating system, may be accessible via a memory swapping interface, and/or may be accessible in the client logic 312 via a storage protocol, the term "swap space" as used herein refers to memory stored in a conventional swap file, swap partition, and/or swap device, which may be remotely accessed via a storage protocol and/or may be accessed over a local bus via a storage protocol, such as with the backing store 360.

The client logic 312 and/or another logic may receive a request for allocation of memory (1002). The request for allocation of memory (1002) may be any one or more mechanisms that may trigger the operations described for FIG. 10. Examples of possible requests include: a message, a programmatic signal, an electrical signal, an optical signal, a wireless signal, a method invocation, a function call, a TCP and/or UDP message, an HTTP request, etc. The request (1002) may be received from another logic, such as the application logic 314, and/or the request (1002) may be received from the client logic 312, such as by the client logic 312 making a determination to allocate memory. The request for allocation of memory may include an invocation of any operating system programmatic procedure configured to allocate memory for a caller of the operating system programmatic procedure. For example, the request for allocation of memory may include a method invocation of malloc( ), mmap( ), brk( ), and/or sbrk( ) in C programs. Alternatively, the request for allocation of memory may include an invocation of a programmatic procedure that is not part of an operating system. The client logic 312, the application logic 314, and/or any other one or more logics may make the determination independently and/or in coordination with each other and/or with any other one or more logics based on any one or more conditions, parameters, configurations, and/or other properties of the client 130 and/or of the one or more memory appliances 110 and/or for any other reason. In some examples, there may be no request (1002), such as if the determination is made by the client logic 312.

In response to the request and/or determination, the client logic 312 and/or another logic may perform a determination of available memory (1004). The determination of available memory (1004) may include evaluating between whether to provide anonymous memory and/or local primary memory and/or whether to provide file-backed memory (for example, from a memory-mapped file) and/or external primary memory in response to the request to allocate memory. The determination (1004) may be based on an evaluation of one or more conditions, parameters, configurations, and/or other properties of the client 130, of one or more memory appliances 110, and/or of the request to allocate memory. Conditions, parameters, configurations, and/or other properties of the client 130 may include: the total amount of memory 310 installed in the client 130; the total amount of memory 210 installed in one or more memory appliances 110; the amount of available local primary memory; the amount of available external primary memory; the amount of local primary memory configured for use as a cache of data in external primary memory; the amount of memory requested by the request to allocate memory; configurable thresholds, margins, and/or hysteresis settings; performance characteristics of local primary memory; performance characteristics of one or more memory appliances 110; configured constraints, such as constraints configured by a user and/or administrator; and/or any other information, configuration(s), policy/policies, assignment(s), and/or other one or more criteria that may be useful for determining one or more types of memory to select in response to the request to allocate memory. Alternatively or in addition, the determination of available memory (1004) may be based on an evaluation of one or more of: duration of use (e.g. not above 80% of time), time, rate of change, margin, frequency of use, periodicity, load, load balancing, number of times reused, and/or one or more computations, algorithm(s), function(s), heuristic(s), passed function(s), event(s), trigger(s), event trigger(s), applied heuristic(s), computational benefit(s), policy/policies, data pattern(s), read/write relationship(s), modify/update relationship(s), defined trigger(s), etc.

In one example, the determination of available memory (1004) may include comparing the amount of memory requested to the amount of available local primary memory. The client logic 312 and/or another logic may choose to use anonymous memory and/or local primary memory for the request to allocate memory if the amount of memory requested is available as local primary memory. In comparing the amount of memory requested to the amount of available local primary memory, the client logic 312 and/or another logic may optionally include an amount of margin in the comparison, and/or may choose to use anonymous memory and/or local primary memory for the request if the amount of memory requested plus a margin is available as local primary memory.

Margin may be an amount of memory to attempt to keep available such as to accommodate operating system use, allocation overhead, memory-conversion overhead, and/or for any other purpose. The margin may be specified in absolute and/or relative terms in one or more ways, such as by one or more numbers of bytes, kilobytes, megabytes, gigabytes, kibibytes, mebibytes, gibibytes, pages, chunks, buffers, percentages, ratios, and/or any other way of quantifying an amount of memory and/or data. In some examples, the margin may be specified in relation to some other quantity, such as a percentage of total and/or available local primary memory and/or external primary memory, a percentage and/or amount of data above and/or below the total and/or available local primary memory and/or external primary memory, and/or in any other way derived from one or more of these and/or any other useful quantity related to the memory allocation request(s). In other examples, the margin may be specified in dynamic terms, such as via one or more policies, passed functions, steps, and/or rules. Memory-conversion may include activities for converting between anonymous memory mappings and file-backed memory mappings, such as described for FIG. 11 and/or FIG. 12.

In another example, the determination of available memory (1004) may include comparing the amount of memory requested to the amount of available external primary memory and/or may choose to use anonymous memory and/or local primary memory for the request to allocate memory if the amount of memory requested is not available as external primary memory. In comparing the amount of memory requested to the amount of available external primary memory, the client logic 312 and/or another logic may optionally include an amount of margin in the comparison, and/or may choose to use anonymous memory and/or local primary memory for the request if the amount of memory requested plus or minus a margin is not available as external primary memory. An advantage of choosing to use anonymous memory and/or local primary memory for the request to allocate memory if the amount of memory requested is not available as external primary memory may be that systems using this approach may continue to operate, even after exhausting all available local primary memory and all available external primary memory such as by utilizing swap space to hold data for some of the allocated anonymous memory and/or local primary memory.

Alternatively or in addition, the determination of available memory (1004) may include an evaluation of the rate of change of available local primary memory and/or external primary memory and/or the margin may be adjusted based in part and/or in whole upon the rate of change of available local primary memory and/or external primary memory. For example, if the amount of available local primary memory is decreasing rapidly (in other words, decreasing at a rate greater than a threshold rate), the client logic 312 and/or another logic may determine (1004) to use file-backed memory and/or external primary memory in examples where the currently-available local primary memory may otherwise be adequate to accommodate the request to allocate memory. Alternatively or in addition, if the amount of available local primary memory is decreasing slowly (in other words, decreasing at a rate less than a threshold rate), the client logic 312 and/or another logic may determine (1004) to use anonymous memory and/or local primary memory. In another example, if the amount of available external primary memory is decreasing rapidly (in other words, decreasing at a rate greater than a threshold rate), the client logic 312 and/or another logic may determine (1004) to use anonymous memory and/or local primary memory in examples where the currently-available external primary memory may otherwise be adequate to accommodate the request to allocate memory. Alternatively or in addition, if the amount of available external primary memory is decreasing slowly (in other words, decreasing at a rate less than a threshold rate), the client logic 312 and/or another logic may determine (1004) to use file-backed memory and/or external primary memory. Other examples may include any one or more combinations of parameters increasing and/or decreasing rapidly (e.g. greater than a threshold) and/or slowly (e.g. less than a threshold), such as: the amount of available local primary memory; amount of external primary memory; amount of used anonymous memory; amount of used local primary memory; amount of used file-backed memory; amount of used external primary memory; amount of remaining margin(s) for any one or more parameters; percent and/or ratio of remaining margin(s) for any one or more parameters; any characteristic(s) and/or configuration(s) of one or more clients 130, memory appliances 120, and/or management servers 120; etc. Examples of the available memory may include unmapped memory in address space, unallocated local primary memory, unallocated local primary memory within a division of the local primary memory, and/or unmapped file-backed and/or external primary memory.

In some examples, there may be no determination of available memory (1004), and/or file-backed memory and/or external primary memory may always be chosen for the request to allocate memory. In other examples, anonymous memory and/or local primary memory may always be chosen for the request to allocate memory. In other examples, multiple types of memory may be chosen for the request to allocate memory, such as by choosing anonymous memory and/or local primary memory for one or more portions of the request to allocate memory and/or choosing file-backed memory and/or external primary memory for one or more other portions of the request to allocate memory. In some examples, such as where multiple types of memory are chosen for the request to allocate memory, the resulting operations, (1006) (1008) and/or (1010) (1012) (1014), may be performed in sequence, such as (1006) (1008) followed by (1010) (1012) (1014) or (1010) (1012) (1014) followed by (1006) (1008); the operations may be interleaved, such as (1010) (1006) (1012) (1008) (1014), or any other interleaved ordering; and/or the operations may be performed concurrently, such as (1006) (1008) concurrent with (1010) (1012) (1014). Each set of operations may be performed upon portions of the request corresponding to anonymous memory, local primary memory, file-backed memory, and/or external primary memory.

Upon completing or skipping the determination of available memory (1004), if anonymous memory and/or local primary memory is to be used for all of and/or for one or more portions of the request, the client logic 312 and/or another logic may map anonymous memory and/or local primary memory to a virtual address space (1006), such as a virtual address space of the application logic 314. The anonymous memory and/or local primary memory to be mapped may be selected from a pool of available portions of anonymous memory and/or local primary memory. Mapping anonymous memory and/or local primary memory to the virtual address space (1006) may include updating, modifying, and/or replacing one or more data structures indicating that one or more portions of the virtual address space are mapped to anonymous memory and/or local primary memory. Alternatively or in addition, mapping anonymous memory and/or local primary memory to the virtual address (1006) space may include updating, modifying, and/or replacing one or more page table entries to reference portions of local primary memory and/or swap space. Upon completing mapping anonymous memory and/or local primary memory to the virtual address space (1006), the client logic 312 and/or another logic may complete handling of the request to allocate memory (1008), such as by returning a result code to the application logic 314 and/or other requesting logic.

Upon completing or skipping the determination of available memory (1004), if file-backed memory and/or external primary memory is to be used for all of and/or for one or more portions of the request, the client logic 312 and/or another logic may select one or more portions of the file and/or of external primary memory (1010). The one or more portions of the file and/or of external primary memory may be sufficient to cover the amount of memory requested and/or determined to be covered by file-backed and/or external primary memory. For example, a single portion may be selected that is equal to or larger than the amount of memory requested and/or determined to be covered by file-backed and/or external primary memory. In another example, multiple portions may be selected, such that the total of the sizes of the multiple portions is equal to or larger than the amount of memory requested and/or determined to be covered by file-backed and/or external primary memory. Alternatively or in addition, the one or more portions of the file and/or of external primary memory may be insufficient to cover the amount of memory requested and/or determined to be covered by file-backed and/or external primary memory. For example, one or more portions may be selected that have a total size less than the amount of memory requested and/or determined to be covered by file-backed and/or external primary memory. In examples such as these, the client logic 312 and/or another logic may cover a subset of the amount of the memory requested and/or previously determined to be covered by file-backed and/or external primary memory. For example, more of the memory requested may be covered by anonymous memory and/or local primary memory. Alternatively or in addition, the request may fail.

In some examples, the file portion(s) and/or external memory portion(s) may be included in one or more regions 214 and/or external memory allocations. The file portion(s) and/or external memory portion(s) may be selected and/or the region(s) 214 and/or external memory allocation(s) in which the portion(s) are selected may be selected using any of the methods and/or logic described herein, such as for provisioning, allocation, selection, slab allocation, allocation strategies, policies, passed functions, steps, and/or rules, etc. Alternatively or in addition, the portion(s) may be selected and/or the region(s) 214 and/or external memory allocation(s) in which the portion(s) are selected may be selected using any selection strategy known now or later discovered. In examples where more than one portion of external primary memory is to be selected, the same region 214 and/or external memory allocation may be selected for multiple portions to be selected and/or one or more different regions and/or external memory allocations may be selected for one or more portions to be selected.

In some examples, such as when there is an implicit mapping between file offsets and corresponding offsets in an underlying region 214 and/or external memory allocation, selecting a portion of the file may be equivalent to selecting a corresponding portion of the underlying region 214 and/or external memory allocation associated with the file. An implicit mapping may be a logical relationship between sets of numbers in which a mathematical or otherwise derivable relationship exists between corresponding pairs of numbers in each set. For example, corresponding numbers may be the same in both sets, and/or there may be a linear relationship between the two sets of numbers.

In alternative examples, there may not be an implicit mapping between file offsets and corresponding offsets in an underlying region 214 and/or external memory allocation. Such a scenario is possible, at least initially, if the file is a pseudo file. When there is no implicit mapping between file offsets and offsets in the region 214 and/or external memory allocation, selecting a portion of the file may serve to allocate metadata space, such as parts of a data structure that tracks page-cache pages in an operating system, without selecting a corresponding portion of the underlying region 214 and/or external memory allocation associated with the file. In these examples, the client logic 312 and/or another logic may proceed to select one or more portions of the underlying region 214 and/or external memory allocation to associate with the file portion(s), and/or the client logic 312 and/or another logic may delay selecting one or more portions of the underlying region 214 and/or external memory allocation to a later time, such as prior to or while writing data from local primary memory to the file.

In some examples when there is no implicit mapping between file offsets and offsets in the region 214 and/or external memory allocation, one or more regions 214 and/or external memory allocations may be created after selecting the portion of the file. For example, one or more regions and/or external memory allocations may not be created until there are insufficient available portions of previously-created region(s) 214 and/or external memory allocation(s) to satisfy current needs. In some examples, no regions 214 and/or external memory allocations may be created until after at least one portion of the underlying region 214 and/or external memory allocation is needed to map to a portion of the file. This approach may be advantageous in that it may reduce the amount of external primary memory reserved for created region(s) 214 and/or external memory allocations in example systems where creating a region 214 and/or external memory allocation reserves some amount of external primary memory for the region 214 and/or external memory allocation.

Upon selecting the file portion(s) and/or portions of external primary memory (1010), the client logic 312 and/or another logic may map the one or more file portions to the virtual address space (1012). Mapping the one or more file portions to the virtual address space (1012) may include updating, modifying, and/or replacing one or more data structures indicating that one or more portions of the virtual address space are mapped to the file portion(s) and/or external primary memory portion(s) and/or indicating that the one or more file portions and/or external primary memory portion(s) are mapped to one or more portions of the virtual address space. Alternatively or in addition, mapping the one or more file portions and/or external primary memory portions to the virtual address space (1012) may include updating, modifying, and/or replacing one or more page table entries to reference one or more portions of local primary memory, the file portion(s), and/or the portion(s) of external primary memory.

In other examples, the file portion(s) and/or portion(s) of external primary memory may already be mapped, such as if the client logic 312 and/or the application logic 314 maps all of and/or a portion of the external memory allocation and/or of one or more regions 214 to the virtual address space prior to receiving the request (1002) and/or prior to selecting the portion(s) (1010). In examples where the file portion(s) and/or external primary memory portion(s) are already mapped, mapping the portion(s) to the virtual address space (1012) may be skipped.

Upon completing or skipping the mapping of the one or more file portions and/or external primary memory portions to the virtual address space (1012), the client logic 312 and/or another logic may complete handling of the request to allocate memory (1014), such as by returning a result code to the application logic 314 and/or other requesting logic.

During operation of the system 100, one or more of the conditions, parameters, configurations, and/or other properties of the client 130 and/or of one or more memory appliances 110 may change. Alternatively, or in addition, the application logic 314 may have one or more varying resource requirement(s) and/or access pattern(s) over time. To accommodate these changes, the client logic 312 and/or another logic may provide a capability to change previous allocations from anonymous memory to file-backed memory and/or from file-backed memory to anonymous memory. Alternatively or in addition, a background process may monitor memory usage and change previous allocations from anonymous memory to file-backed memory and/or from file-backed memory to anonymous memory.

Figure 11:
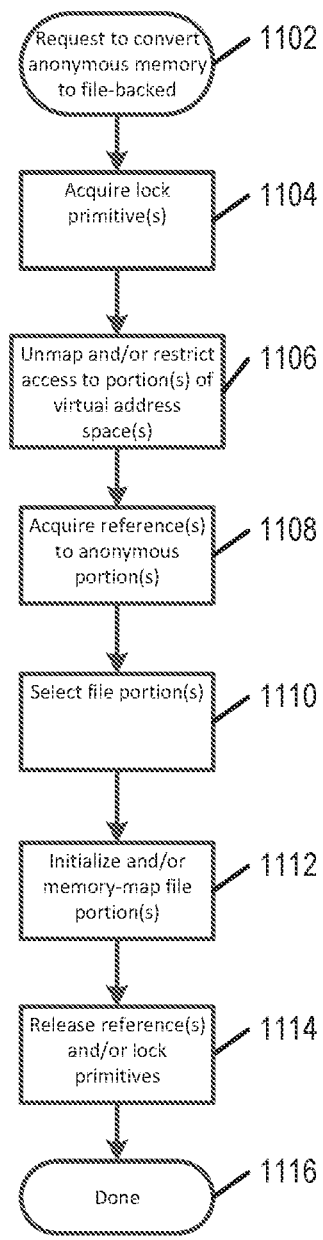
FIG. 11 illustrates an example flowchart for converting anonymous memory to file-backed memory.

FIG. 11 illustrates an example flowchart of operations for converting anonymous memory to file-backed memory. A client logic 312 and/or another logic may receive a request to convert anonymous memory to file-backed memory (1102). The request to convert anonymous memory to file-backed memory may indicate one or more virtual addresses and/or one or more ranges of virtual addresses as the anonymous memory to convert.

The request to convert anonymous memory to file-backed memory (1102) may be any one or more mechanisms that may trigger the operations described for FIG. 11. Examples of possible requests include: a message, a programmatic signal, an electrical signal, an optical signal, a wireless signal, a method invocation, a function call, a TCP and/or UDP message, an HTTP request, or any other programmatic or electrical signal. The request (1102) may be received from another logic, such as the application logic 314, and/or the request (1102) may be received from the client logic 312, such as by the client logic 312 making a determination to convert anonymous memory to file-backed memory. The client logic 312, the application logic 314, any other one or more logics may make the determination independently and/or in coordination with any other one or more logics based on any one or more of the conditions, parameters, configurations, and/or other properties of the client 130 and/or of the one or more memory appliances 110 and/or for any other reason. In some examples, there may be no request (1102), such as if the determination is made by the client logic 312.

In response to the request and/or determination to convert anonymous memory to file-backed memory, the client logic 312 and/or another logic may acquire one or more lock primitives (1104). Acquiring one or more lock primitives may prevent a page fault logic and/or a segmentation fault logic from making progress until the lock primitive is released. As a result, acquiring the one or more lock primitives may prevent the application logic 314 from accessing and/or modifying the contents of the anonymous memory pages. For example, the page fault logic and/or the segmentation fault logic may attempt to acquire one or more of the same lock primitive(s), causing it to wait until the corresponding lock primitive(s) are released.

Upon acquiring one or more lock primitives (1104), the client logic 312 and/or another logic may unmap and/or restrict access to portion(s) of one or more virtual address spaces (1106). Unmapping and/or restricting access to portion(s) of the virtual address space(s) (1106) may prevent the application logic 314 from accessing and/or modifying the contents of the anonymous memory and/or may cause attempts to access and/or modify the contents of the anonymous memory to trigger the page fault logic and/or the segmentation fault logic.

Unmapping and/or restricting access to portion(s) of the virtual address space(s) (1106) may include invalidating, removing, replacing, updating, and/or modifying one or more page table entries and/or may include flushing and/or shooting-down one or more TLB (Translation Lookaside Buffer) entries for one or more virtual address spaces. For example, one or more page table entries may be marked not writable, invalid, clean, not dirty, not modified, and/or not present, and/or corresponding TLB entries may be flushed and/or shot down. A TLB may be a processor's cache of translations from virtual memory addresses to physical memory addresses. When the processor changes the virtual-to-physical mapping of an address, the processor may notify any other processors sharing that memory to invalidate that mapping in their TLBs. This process may be called "shooting-down" a TLB entry. Alternatively or in addition, unmapping and/or restricting access to portion(s) of the virtual address space(s) (1106) may include updating, modifying, and/or replacing one or more data structures related to the anonymous memory, such as data structure(s) describing which portions of a virtual address space are mapped to anonymous memory, data structure(s) describing access permissions, and/or any other data structure(s) related to the anonymous memory or related to the virtual address space(s). Alternatively or in addition, unmapping and/or restricting access to the portion(s) may include invalidating one or more page table entries and/or clearing one or more valid and/or present bits in one or more page table entries without removing one or more references to corresponding portion(s) of local primary memory from the one or more page table entries. In cases where the anonymous memory is mapped to multiple virtual address spaces, the client logic 312 and/or another logic may skip these portions. Alternatively or in addition, the client logic 312 and/or another logic may unmap and/or restrict access to portion(s) of the multiple virtual address spaces.

Upon unmapping and/or restricting access to portion(s) of the virtual address space(s) (1106), the client logic 312 and/or another logic may acquire one or more references to one or more anonymous memory portions (1108). For example, the client logic 312 and/or another logic may identify the address(es) of one or more portions of local primary memory referenced by one or more page table entries associated with the anonymous memory to convert. Alternatively or in addition, the client logic 312 and/or another logic may identify the address(es) of one or more data structures related to the portion(s) of local primary memory referenced by the page table entries. Alternatively or in addition, the client logic 312 and/or another logic may increment, decrement, and/or change one or more reference counts associated with portion(s) of local primary memory. Incrementing, decrementing, and/or changing the reference count(s) associated with a portion may prevent the portion from being reclaimed for other purposes, such as with a reference-counting memory-freeing algorithm that reclaims portions of memory when a corresponding reference count reaches a specified number (such as 1, 0, −1, and/or any other number). As such, by incrementing, decrementing, and/or changing the reference count(s) of the one or more portions of local primary memory referenced by the one or more page table entries associated with the anonymous memory to convert, the client logic 312 and/or another logic may prevent the portions(s) of local primary memory from being reclaimed.

In cases where unmapping and/or restricting access to portion(s) of the virtual address space(s) (1106) would otherwise release one or more references to one or more anonymous memory portions, acquiring one or more references to the one or more anonymous memory portions (1108) may be performed in coordination with unmapping and/or restricting access to portion(s) of the virtual address space(s) (1106), such that the corresponding page(s) of local primary memory would not be reclaimed. For example, the client logic 312 and/or another logic may avoid incrementing, decrementing, and/or changing the reference count(s) of the one or more pages of local primary memory when unmapping and/or restricting access to portion(s) of the virtual address space(s) (1106). Alternatively or in addition, the client logic 312 and/or another logic may acquire the one or more references to the one or more anonymous memory portions (1108) prior to unmapping and/or restricting access to portion(s) of the virtual address space(s) (1106).

Upon acquiring the one or more references to one or more anonymous memory portions (1108), the client logic 312 and/or another logic may select one or more file portions to serve as backing portions for the file-backed memory (1110). The one or more file portions may be sufficient to cover the amount of memory being converted from anonymous memory to file-backed memory. For example, a single portion may be selected that is equal to or larger than the amount of memory specified in the request. In another example, multiple portions may be selected, such that the total of the sizes of the multiple portions is equal to or larger than the amount of memory specified in the request.

Alternatively or in addition, the one or more file portions selected (1110) may have a total size less than the amount of memory specified in the request. For example, the one or more portions selected may have a total size equal to or less than the total size of the anonymous memory portions for which the client logic 312 has acquired references. In cases such as these, one or more portions of the virtual address(es) and/or the range(s) of virtual addresses indicated by the request may be unused—for example, may never have been accessed, may never have been written-to, and/or may reference a read-only portion of local primary memory containing zeroed memory. Instead of, or in addition to, selecting one or more file portions to correspond with these unused portions, the client logic 312 and/or another logic may update, modify, and/or replace one or more data structures related to the file indicating that the portions are to be zeroed. In other cases, one or more portions of the virtual address(es) and/or the range(s) of virtual addresses indicated by the request may reference corresponding swap portion(s). Instead of or in addition to selecting one or more file portions to correspond with the swap portions, the client logic 312 and/or another logic may select one or more portions of the region 214 and/or of the external memory allocation for the swap portions.

In other examples, the one or more file portions selected (1110) may be insufficient to cover the amount of memory being converted from anonymous memory to file-backed memory, such as if the total of the sizes of the one or more file portions is less than the amount of memory specified in the request and/or than the total size of the anonymous memory portions for which the client logic 312 has acquired references. In examples such as these, the client logic 312 and/or another logic may convert a subset of the amount of the memory specified in the request. Alternatively or in addition, the request may fail.

In some examples, the file portion(s) may be included in one or more regions 214 and/or external memory allocations. The file portion(s) may be selected and/or the region(s) 214 and/or external memory allocation(s) in which the portion(s) are selected may be selected using any of the methods and/or logic described herein, such as for provisioning, allocation, selection, slab allocation, allocation strategies, policies, passed functions, steps, and/or rules, etc. Alternatively or in addition, the portion(s) may be selected and/or the region(s) 214 and/or external memory allocation(s) in which the portion(s) are selected may be selected using any selection strategy known now or later discovered. In examples where more than one portion of external primary memory is to be selected, the same region 214 and/or external memory allocation may be selected for multiple portions to be selected and/or one or more different regions and/or external memory allocations may be selected for one or more portions to be selected.

Upon selecting one or more file portions to serve as backing portions for the file-backed memory (1110), the client logic may initialize and/or memory-map the file portion(s) (1112). Initializing the file portion(s) may include copying data from the one or more anonymous memory portions and/or one or more portions of local primary memory to the one or more file portions. For example, the client logic 312 and/or another logic may allocate one or more portions of local primary memory, copy data from one or more of the anonymous memory portions to the portion(s) of local primary memory, and/or associate the one or more portions of local primary memory with corresponding file portion(s) (such as by including an address associated with the portion(s) in a data structure related to the file portion(s)). Alternatively or in addition, initializing the file portion(s) may include copying data from the one or more swap portions to the one or more file portions. For example, the one or more anonymous memory portions and/or the one or more portions of local primary memory to be converted to file-backed memory may have been swapped out to a swap file, swap partition, and/or swap device, so data from these portions may be copied to the one or more file portions that are to serve as backing portions for the file-backed memory. Memory-mapping the file portion(s) may include associating the file portion(s) with corresponding addresses of the virtual address space(s) where the corresponding anonymous memory portions had been mapped. Alternatively or in addition, the client logic 312 and/or another logic may restore access to the portion(s) of the virtual address space(s) that had been previously restricted, if any.

Alternatively or in addition, the client logic 312 and/or another logic may re-associate one or more of the anonymous memory portions with one or more corresponding file portions. Re-associating one or more anonymous memory portions with corresponding file portion(s) may include dis-associating the portion(s) from one or more virtual address space(s) that reference the portion(s), associating the portion(s) with the corresponding file portion(s), and/or associating the corresponding file portion(s) with the one or more virtual address space(s). Dis-associating the portion(s) from one or more virtual address space(s) that reference the portion(s) may include removing, replacing, updating, and/or modifying page table entries, and/or may include flushing and/or shooting-down TLB entries, if not already done. Associating the corresponding file portion(s) with the one or more virtual address space(s) may include updating, modifying, and/or replacing one or more data structures related to the virtual address space(s), such as data structures describing which portions of the virtual address space(s) are mapped to which portions of which file(s). For example, the client logic 312 and/or another logic may add one or more entries to an interval tree and/or other data structure describing contiguous portions of a virtual address space that are mapped to corresponding contiguous portions of the file. Alternatively or in addition, associating the corresponding file portion(s) with the one or more virtual address space(s) may include adding, replacing, updating, and/or modifying page table entries, such as by causing the page table entries to reference the file portions and/or the anonymous memory portion(s) being re-associated with the file. In some examples where one or more portions of anonymous memory may already be associated with the one or more virtual address spaces, the portion(s) may be left associated with the virtual address space(s), and/or the portion(s) may be associated with the corresponding file portion(s).

Alternatively or in addition, the client logic 312 and/or another logic may initialize the contents of the file, the region 214, and/or the external memory allocation. For example, the client logic 312 and/or another logic may copy data from the one or more anonymous memory portions to corresponding portions of the file, the region 214, and/or the external memory allocation. Alternatively or in addition, the client logic 312 and/or another logic may copy data from the one or more swap portions to corresponding portions of the file, the region 214, and/or the external memory allocation. In cases such as these, the client logic 312 and/or another logic may or may not allocate local primary memory to hold the data from one or more of the anonymous memory portion(s), may or may not copy the data to the local primary memory, and/or may or may not re-associate one or more of the anonymous memory portion(s) with corresponding file portion(s). Instead or in addition, the client logic 312 and/or another logic may associate the corresponding portions of the file, the region 214, and/or the external memory allocation with the file portion(s), and/or may memory-map the file portions, the file, the region 214, and/or the external memory allocation to the virtual address space(s) where the corresponding anonymous memory portions had been mapped.

Upon initializing and/or memory mapping the file portion(s) (1112), the client logic 312 and/or another logic may release the one or more references to the anonymous memory portion(s) and/or the one or more lock primitives (1114).

Upon releasing the one or more references to the anonymous memory portion(s) and/or the one or more lock primitives (1114), the client logic 312 and/or another logic may complete handling of the request to convert anonymous memory to file-backed memory (1116), such as by returning a result code to the application logic 314 and/or other requesting logic.

While the descriptions for FIG. 11 illustrate a simple set of operations, it would be clear to one skilled in the art that the operations described here may be performed iteratively upon successive sub-portions of the request to convert anonymous memory to file-backed memory. Performing these operations iteratively may have the advantage of reducing the impact upon the application logic of acquiring the one or more lock primitives (1104) and/or of unmapping and/or restricting access to portion(s) of the virtual address space(s) (1106). For example, the one or more lock primitives acquired may only prevent a page fault logic and/or a segmentation fault logic from making progress upon a corresponding subset of virtual address space addresses until the lock primitive is released. Similarly, the portion(s) of the virtual address space(s) that are unmapped and/or restricted access to may be a smaller subset than would be needed to convert the entirety of the portion(s) specified via the request to convert anonymous memory to file-backed memory.

In some examples, the one or more lock primitives may not be acquired (1104) and/or released (1114), the one or more lock primitives may be held for a reduced duration, the one or more lock primitives may affect corresponding subset(s) of virtual address space addresses and/or file portions, and/or the one or more lock primitives may correspond to individual portions. One or more of these approaches may be advantageous in that performance impacts of locking may be reduced.

In a first example, performance impacts of locking may be reduced by avoiding overhead associated with initializing the file portion(s) (1112), such as by re-associating one or more of the anonymous memory portions with one or more corresponding file portions. In examples where one or more of the anonymous memory portions are re-associated with one or more corresponding file portions, unmapping and/or restricting access to portion(s) of the virtual address space(s) (1106) may be skipped, such as by not invalidating, removing, replacing, updating, and/or modifying one or more page table entries and/or by not flushing and/or shooting down TLB entries for one or more virtual address spaces. Alternatively or in addition, the client logic 312 and/or another logic may update, modify, and/or replace one or more data structures related to the anonymous memory, such as data structure(s) describing which portions of a virtual address space are mapped to file-backed and/or anonymous memory, data structure(s) describing access permissions, and/or any other data structure(s) related to the anonymous memory or related to the virtual address space(s). For example, the client logic 312 and/or another logic may associate one or more of the anonymous memory portion(s) with the corresponding file portion(s) by including an address and/or reference associated with the portion(s) in a data structure related to the file portion(s) and/or by remapping the corresponding portion(s) of the virtual address space(s) to the file portion(s) (such as by adding one or more entries to the interval tree and/or other data structure describing contiguous portions of the virtual address space(s) that are mapped anonymous memory and/or to corresponding contiguous portions of the file). In examples such as these, where re-associating one or more of the anonymous memory portions with one or more corresponding file portions, the one or more lock primitives may not be acquired (1104) and/or released (1114), and/or one or more page faults for corresponding virtual address(es) may be allowed to make progress in parallel with converting anonymous memory portion(s) to file-backed.

In a second example, performance impacts of locking may be reduced by initializing the file portion(s) (1112) without preventing page faults from making progress, such as with the one or more lock primitives. For example, acquiring the one or more lock primitives (1104) may be skipped, one or more page table entries may be marked not writable, invalid, clean, not dirty, not modified, and/or not present, corresponding TLB entries may be shot down, and/or initializing the file portion(s) (1112) may be performed without preventing page faults from making progress in parallel. In lieu of preventing page faults from making progress in parallel, after initializing the file portion(s), the client logic 312 and/or another logic may detect whether one or more of the anonymous memory portion(s) may have been modified prior to completing the initialization. For example, the client logic 312 and/or another logic may determine whether one or more page faults have occurred for the anonymous memory portion(s) by checking one or more indicators and/or counters in one or more portion tracking data structures associated with the portion(s). The one or more indicators may be set, cleared, updated, modified, and/or replaced when page faults are handled, may indicate whether or not corresponding portion(s) are mapped into one or more page tables, and/or may indicate the number of page tables into which the portion(s) are mapped. Alternatively or in addition, the client logic 312 and/or another logic may determine whether one or more anonymous memory portions may have been modified by checking a dirty and/or modified bit in one or more page table entries and/or page-tracking data structures. If the client logic 312 and/or another logic determines that one or more of the anonymous memory portions may have been modified, then unmapping and/or restricting access to portion(s) of the virtual address space(s) (1106) and/or initializing the file portion(s) (1112) may be repeated. Alternatively or in addition, converting the corresponding anonymous memory portion(s) to file-backed portion(s) may be skipped, aborted, and/or cancelled. In cases where converting is skipped, aborted, and/or cancelled, selected file portion(s) may be deselected and/or deallocated, and/or any acquired lock primitives (if any) may be released. In some examples, unmapping and/or restricting access to portion(s) of the virtual address space(s) (1106) and/or initializing the file portion(s) (1112) may be repeated a limited number of times before skipping the conversion, aborting the conversion, cancelling the conversion, and/or executing any other applicable action and/or policy. If the client logic 312 and/or another logic determines that one or more page faults have not occurred for the file portion(s) and/or that the anonymous memory portion(s) have not been modified, then the client logic 312 and/or another logic may proceed to memory-map the file portion(s) (1112). In some examples, determining that one or more page faults have not occurred for the anonymous portion(s) and/or that the anonymous portion(s) have not been modified may be performed atomically with memory-mapping the file portion(s) (1112). For example, one or more compare-and-exchange operations may be performed on one or more corresponding page table entries to memory-map the file portion(s) (1112) if the value(s) being replaced do not have their accessed bit(s), modified bit(s), dirty bit(s), and/or any other relevant indicators set (and/or cleared, as appropriate). In other examples, one or more lock primitives and/or access bits may be used to perform these operations atomically, such as the one or more lock primitives described for step (1104).

In examples where one or more page faults, segmentation faults, and/or other accesses are allowed to make progress during the conversion, the client logic 312 and/or another logic may detect whether one or more additional portions need to be converted. For example, the client logic 312 and/or another logic may identify additional portion(s) of local primary memory referenced by one or more page table entries associated with the anonymous memory to convert that were not present while performing one or more of the operations described for FIG. 11 and/or may repeat one or more of the operations to convert one or more of these portions. Alternatively or in addition, one or more of these portions may not be converted.

Furthermore, while some of the operations may have been described as an ordered set of operations, it would be clear to one skilled in the art that other sequences may be equally effective in response to the request to convert anonymous memory to file-backed memory. For example, other sequences may have additional operations, some operations may be skipped, and/or some operations may be performed in a different order than described. For example, restoring access to the portion(s) of the virtual address space(s) that had been previously restricted may be performed while releasing the one or more references to the anonymous memory portion(s) and/or the one or more lock primitives (1114).

Figure 12:
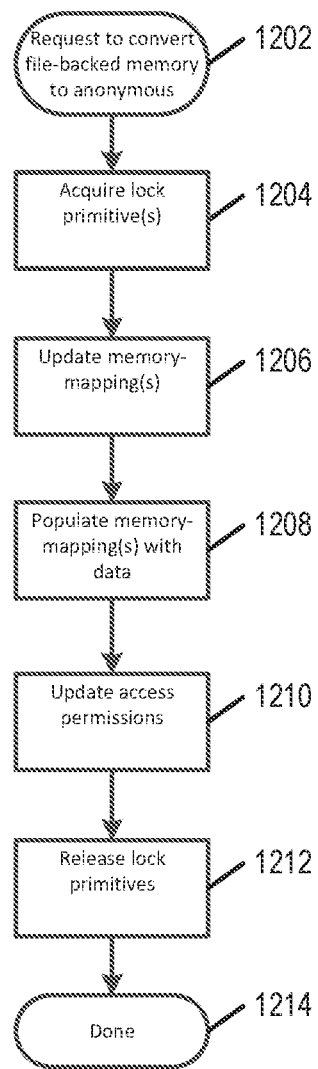
FIG. 12 illustrates an example flowchart for converting file-backed memory to anonymous memory.

FIG. 12 illustrates an example flowchart for converting file-backed memory to anonymous memory. A client logic 312 and/or another logic may receive a request to convert file-backed memory to anonymous memory (1202). The request to convert file-backed memory to anonymous memory may indicate one or more virtual addresses and/or one or more ranges of virtual addresses as the file-backed memory to convert.

The request to convert file-backed memory to anonymous memory (1202) may be any one or more mechanisms that may trigger the operations described for FIG. 12. Examples of possible requests include: a message, a programmatic signal, an electrical signal, an optical signal, a wireless signal, a method invocation, a function call, a TCP and/or UDP message, an HTTP request, etc. The request (1202) may be received from another logic, such as the application logic 314, and/or the request (1202) may be received from the client logic 312, such as by the client logic 312 making a determination to convert file-backed memory to anonymous memory. The client logic 312, the application logic 314, any other one or more logics may make the determination independently and/or in coordination with any other one or more logics based on any one or more of the conditions, parameters, configurations, and/or other properties of the client 130 and/or of the one or more memory appliances 110 and/or for any other reason. In some examples, there may be no request (1202), such as if the determination is made by the client logic 312.

In response to the request and/or determination to convert to file-backed memory to anonymous memory, the client logic 312 and/or another logic may acquire one or more lock primitives (1204). Acquiring one or more lock primitives may prevent a page fault logic and/or a segmentation fault logic from making progress until the lock primitive is released, which may prevent the application logic 314 from accessing and/or modifying the contents of the file-backed memory pages. For example, the page fault logic and/or the segmentation fault logic may attempt to acquire one or more of the same lock primitive(s), causing it to wait until the corresponding lock primitive(s) are released.

Upon acquiring one or more lock primitives (1204), the client logic 312 and/or another logic may update, modify, and/or replace one or more memory mappings (1206). Updating, modifying, and/or replacing one or more memory mappings (1206) may prevent the application logic 314 from accessing and/or modifying the contents of the mapped memory and/or may cause attempts to access and/or modify the contents of the mapped memory to trigger the page fault logic and/or the segmentation fault logic. For example, the mapped memory may be specified with access permissions that disallow reading, writing, and/or executing the contents of the mapped memory. An example protection mode that disallows reading, writing, and/or executing the contents of the mapped memory is PROT_NONE on a Linux or a Microsoft Windows operating system. Alternatively or in addition, updating, modifying, and/or replacing one or more memory mappings (1206) may include invalidating, removing, replacing, and/or updating one or more page table entries and/or may include flushing and/or shooting-down one or more TLB entries for one or more virtual address spaces. For example, one or more page table entries may be marked not writable, invalid, clean, not dirty, not modified, and/or not present, and/or corresponding TLB entries may be flushed and/or shot down. Alternatively or in addition, updating, modifying, and/or replacing one or more memory mappings (1206) may include updating, modifying, and/or replacing one or more data structures related to the mapped memory, such as data structure(s) describing which portions of a virtual address space are mapped to file-backed and/or anonymous memory, data structure(s) describing access permissions, and/or any other data structure(s) related to the mapped memory or related to the virtual address space(s). In cases where the file-backed memory is mapped to multiple virtual address spaces, the client logic 312 and/or another logic may skip these portions. Alternatively or in addition, the client logic 312 and/or another logic may update, modify, and/or replace one or more memory mappings for the multiple virtual address spaces.

Upon updating, modifying, and/or replacing the one or more memory mappings (1206), the client logic may populate the memory mapping(s) with data (1208). Populating the memory mappings with data (1208) may include copying data from one or more portion(s) of file-backed memory included in local primary memory (such as portion(s) of file data) to one or more anonymous memory portions. For example, the client logic 312 and/or another logic may allocate one or more portions of local primary memory, copy data from one or more of the file-backed memory portions to the portion(s) of local primary memory, and/or associate the portion(s) of local primary memory with the memory mappings. Associating the portion(s) of local primary memory with the memory mappings may include adding, replacing, updating, and/or modifying one or more page table entries, such as by causing the page table entries to reference the portion(s) of local primary memory. Alternatively or in addition, data may be copied from the file, the region 214, and/or the external memory allocation to the portion(s) of local primary memory, such as if the data is not present in one or more portions of file-backed memory included in local primary memory. Alternatively or in addition, populating the memory mappings with data (1208) may include re-associating one or more portions of file-backed memory included in local primary memory with the memory mappings. Re-associating one or more portions of file-backed memory may include dis-associating the portion(s) from the file and/or associating the portion(s) of file-backed memory with the corresponding memory mapping(s). In some examples, the client logic may populate the memory mappings with data (1208) using a combination of these approaches. For example, the client logic may allocate one or more portions of local primary memory, copying some data from one or more file-backed memory portions and other data from the file, the region 214, and/or the external memory allocation. Other portions may be re-associated from file-backed memory to the memory mappings.

Upon completing populating the memory mapping(s) with data (1208), the client logic 312 and/or another logic may optionally update, modify, and/or replace access permissions (1210). Updating, modifying, and/or replacing access permissions may include restoring access permissions for the memory mappings to their original settings from before updating, modifying, and/or replacing the memory mapping(s) (1206). For example, if prior to updating, modifying, and/or replacing the memory mapping(s) (1206), the access permissions for one or more memory mappings were configured such that reading and writing was allowed, then the access permissions for the corresponding file-backed memory mapping(s) would be configured to allow reading and writing.

Upon optionally completing updating, modifying, and/or replacing access permissions (1210) and/or upon completing populating the memory mapping(s) with data (1208), the client logic may release the one or more lock primitives (1212).

Upon releasing the one or more lock primitives (1212), the client logic 312 and/or another logic may complete handling of the request to convert file-backed memory to anonymous memory (1214), such as by returning a result code to the application logic 314 and/or other requesting logic.

While the descriptions for FIG. 12 illustrate a simple set of operations, it would be clear to one skilled in the art that the operations described here may be performed iteratively upon successive sub-portions of the request to convert file-backed memory to anonymous memory. Performing these operations iteratively may have the advantage of reducing the impact upon the application logic of acquiring the one or more lock primitives (1204) and/or of restricting access to memory mappings. For example, the one or more lock primitives acquired may only prevent a page fault logic and/or a segmentation fault logic from making progress upon a corresponding subset of virtual address space addresses until the lock primitive is released. Similarly, the memory mapping(s) to which access is restricted may be a smaller subset than would be needed to convert the entirety of the portion(s) specified via the request to convert file-backed memory to anonymous memory.

In some examples, the one or more lock primitives may not be acquired (1204) and/or released (1212), the one or more lock primitives may be held for a reduced duration, the one or more lock primitives may affect corresponding subset(s) of virtual address space addresses and/or file portions, and/or the one or more lock primitives may correspond to individual portions. One or more of these approaches may be advantageous in that performance impacts of locking may be reduced.

In a first example, performance impacts of locking may be reduced by avoiding overhead associated with populating the memory mappings with data (1208), such as by re-associating one or more portions of file-backed memory included in local primary memory with the memory mappings. In examples where one or more portions of file-backed memory are re-associated with the memory mappings, updating, modifying, and/or replacing the one or more memory mappings (1206) may be skipped, such as by not invalidating, removing, replacing, updating, and/or modifying one or more page table entries and/or by not flushing and/or shooting down TLB entries for one or more virtual address spaces. Alternatively or in addition, the client logic 312 and/or another logic may update, modify, and/or replace one or more data structures related to the mapped memory, such as data structure(s) describing which portions of a virtual address space are mapped to file-backed and/or anonymous memory, data structure(s) describing access permissions, and/or any other data structure(s) related to the mapped memory or related to the virtual address space(s). For example, the client logic 312 and/or another logic may re-associate one or more of the file-backed memory portions with the memory mappings by updating, modifying, replacing, and/or populating one or more page table entries to reference the corresponding portions of local primary memory and/or by re-mapping the corresponding portion(s) of the virtual address space(s) to anonymous memory (such as by adding one or more entries to the interval tree and/or other data structure describing contiguous portions of the virtual address space(s) that are mapped to anonymous memory and/or to corresponding contiguous portions of the file). In examples such as these, where re-associating one or more portions of file-backed memory included in local primary memory with the memory mappings, the one or more lock primitives may not be acquired (1204) and/or released (1212), and/or one or more page faults for corresponding virtual address(es) may be allowed to make progress in parallel with converting file backed portion(s) to anonymous memory.

In a second example, performance impacts of locking may be reduced by populating the memory mappings with data (1208) without preventing page faults from making progress, such as with the one or more lock primitives. For example, acquiring the one or more lock primitives (1204) may be skipped, one or more page table entries may be marked not writable, invalid, clean, not dirty, not modified, and/or not present, corresponding TLB entries may be shot down, and/or populating the memory mapping(s) with data (1208) may be performed without preventing page faults from making progress in parallel. In lieu of preventing page faults from making progress in parallel, after populating the memory mapping(s) with data (1208), the client logic 312 and/or another logic may detect whether one or more of the file-backed portion(s) may have been modified prior to completing the initialization. For example, the client logic 312 and/or another logic may determine whether one or more page faults have occurred for the file portion(s) by checking one or more indicators and/or counters in one or more portion tracking data structures associated with the portion(s). The one or more indicators may be set, updated, modified, and/or replaced when page faults are handled, may indicate whether or not corresponding portion(s) are mapped into one or more page tables, and/or may indicate the number of page tables into which the portion(s) are mapped. Alternatively or in addition, the client logic 312 and/or another logic may determine whether one or more file portions may have been modified by checking a dirty and/or modified bit in one or more page table entries and/or page-tracking data structures. If the client logic 312 and/or another logic detects that one or more of the file-backed portion(s) may have been modified prior to completing the initialization, then updating/modifying/replacing the memory mapping(s) (1206) and/or populating the memory mapping(s) with data (1208) may be repeated. Alternatively or in addition, converting the corresponding file-backed portion(s) to anonymous memory portion(s) may be skipped, aborted, and/or cancelled. In cases where converting is skipped, acquired lock primitives (if any) may be released. In some examples, updating/modifying/replacing the memory mapping(s) (1206) and/or populating the memory mapping(s) with data (1208) may be repeated a limited number of times before skipping the conversion, aborting the conversion, cancelling the conversion, and/or executing any other applicable action and/or policy. If the client logic 312 and/or another logic determines that one or more page faults have not occurred for the file portion(s) and/or that the portion(s) have not been modified, then the client logic 312 and/or another logic may proceed to memory-map the anonymous memory portion(s) and/or update/modify/replace the access permissions (1210), such as by updating, modifying, and/or replacing the one or more data structures related to the mapped memory (such as the data structure(s) describing which portions of a virtual address space are mapped to file-backed and/or anonymous memory). In some examples, determining that one or more page faults have not occurred for the file portion(s) and/or that the portion(s) have not been modified may be performed atomically with memory-mapping the anonymous memory portion(s) and/or by updating, modifying, and/or replacing the access permissions (1210). For example, one or more compare-and-exchange operations may be performed on one or more corresponding page table entries to memory-map the anonymous memory portion(s) and/or update/modify/replace the access permissions (1210) if the value(s) being replaced do not have their accessed bit(s), modified bit(s), dirty bit(s), and/or any other relevant indicators set (and/or cleared, as appropriate). In other examples, one or more lock primitives and/or access bits may be used to perform these operations atomically, such as the one or more lock primitives described for step (1204).

In examples where one or more page faults, segmentation faults, and/or other accesses are allowed to make progress during the conversion, the client logic 312 and/or another logic may detect whether one or more additional portions need to be converted. For example, the client logic 312 and/or another logic may identify additional portion(s) of file-backed memory included in local primary memory (such as portion(s) of file data) that were not present while populating the memory mapping(s) with data (1208) and/or may repeat one or more operations to convert one or more of these portions. Alternatively or in addition, one or more of these portions may not be converted.

Furthermore, while some of the operations may have been described as an ordered set of operations, it would be clear to one skilled in the art that other sequences may be equally effective in response to the request to convert file-backed memory to anonymous memory. For example, other sequences may have additional operations, some operations may be skipped, and/or some operations may be performed in a different order than described. For example, in some example implementations, populating the memory mappings with data (1208) may be performed in connection with updating, modifying, and/or replacing the one or more memory mappings (1206), such as with a MAP_POPU-LATE option to a memory mapping operation interface (such as mmap).

While FIGS. 11 and 12 illustrate converting between anonymous memory and file-backed memory, converting between external primary memory and anonymous memory (local primary memory) is performed similarly even if the external primary memory is not implemented with a memory mapped file. For example, instead of selecting the portion(s) of the memory-mapped file (1110), portion(s) of the region(s) of external primary memory are selected.

FIG. 13A and FIG. 13B illustrate example flow diagrams for handling a page fault for portions of an address space and/or for reclaiming portions of local primary memory using external primary memory. One or both flow diagrams may be useful for example systems in which there is no implicit mapping between file offsets and offsets in the region 214 and/or external memory allocation.

A page fault and/or other event, such as a request to access a portion of an address space and/or file, may occur (1302), triggering a flow such as the example illustrated in FIG. 13A. The request to access a portion of an address space and/or file may be any one or more mechanisms that may trigger the operations described for FIG. 13A. Examples of possible requests include: a message, a programmatic signal, an electrical signal, an optical signal, a wireless signal, a method invocation, a function call, a TCP and/or UDP message, an HTTP request, etc. The request may be received from another logic, such as the application logic 314, and/or the request may be received from the client logic 312, such as by the client logic 312 making a determination to access a portion of an address space and/or file. The client logic 312, the application logic 314, any other one or more logics may make the determination independently and/or in coordination with any other one or more logics based on any one or more of the conditions, parameters, configurations, and/or other properties of the client 130 and/or of the one or more memory appliances 110 and/or for any other reason. In some examples, there may be no request, such as if the determination is made by the client logic 312 and/or another logic.

In response to the page fault and/or other event, the client logic 312 and/or another logic (such as an operating system, a kernel, a device driver, a device firmware, a hypervisor service, a cloud computing interface, and/or any other hardware, software, and/or firmware entity which may perform the same functions as described) may allocate a portion of local primary memory (1304). The size of the portion may be selected to satisfy the triggering event (1302). For example, for a page fault, the size may be equal to the size of a page, a huge page, a chunk, and/or any other suitable size. In other examples, such as for the request to access the portion of the address space and/or file, the size may be specified by and/or implied by the request.

Upon allocating the portion of local primary memory (1304), the client logic 312 and/or another logic may determine (1306) whether data for the portion is in external primary memory. In an example implementation, the determination (1306) may be made by evaluating whether or not an address associated with the triggering event (1302) is associated with a portion of external primary memory, such as a portion of the region 214 and/or external memory allocation. If data for the portion is not in external primary memory, the portion of local primary memory may be initialized (1308). If data for the portion is in external primary memory, the data may be written (1310) to the portion of local primary memory, such as by copying the data from the portion of the region 214 and/or external memory allocation. In some examples, the data may be copied using client-side memory access, via one or more RDMA operations, and/or via any other one or more suitable data transfer operations. In these and/or other examples, the data may be optionally encrypted, decrypted, compressed, decompressed, and/or may undergo data translation before, during, and/or after being written (1310). Other examples of data translation may be described elsewhere in this disclosure. In some examples, the encryption, decryption, compression, decompression, and/or data translation may be performed in whole or in part by one or more communication interfaces 230, 330, 430, one or more processors 240, 340, 440, other devices, and/or other logic.

Upon initializing (1308) and/or writing data to (1310) the portion of local primary memory, the client logic 312 and/or another logic may map (1312) one or more addresses to the portion of local primary memory. The one or more addresses that are mapped may include the address associated with the triggering event (1302) used to determine (1306) whether the data for the portion is in external primary memory, and/or may include some other address(es), such as other address(es) within the address space and/or such as address(es) within one or more other address spaces. The address space and/or the other address space(s) may be virtual address spaces. Alternatively or in addition, the address space and/or the other address space(s) may be some other type of address space, such as a physical address space, an IO virtual address space, and/or any other type of address space known now or later discovered and/or defined. In some examples, no addresses may be mapped, such as for some requests to access a portion of a file. Upon mapping (1312) the one or more addresses to the portion of local primary memory, handling of the page fault and/or other event may be complete (1314).

A low memory condition, exceeding configured memory limits, and/or other event(s), such as a determination that one or more portions of local primary memory have not been used recently and/or are unlikely to be used in the near future may occur (1316), triggering a portion reclaim flow such as the example illustrated in FIG. 13B. In response, the client logic 312 and/or another logic (such as an operating system, a kernel, a device driver, a device firmware, a hypervisor service, a cloud computing interface, and/or any other hardware, software, and/or firmware entity which may perform the same functions as described) may allocate one or more portions of external primary memory (1318). In allocating the one or more portion(s), the portion(s) of external primary memory may be selected at the client 130, by the client logic 312, by another logic, in coordination with other client logics 312, in coordination with other logics, and/or independently of the memory appliance 110 and/or of any one or more logics, such as the region access logic 212 and/or the allocation logic 412. The portion(s) of external primary memory may be portion(s) of one or more regions 214 and/or external memory allocations. One or more of the region(s) 214 and/or external memory allocation(s) including the selected portion(s) of external primary memory may be associated with one or more portions being reclaimed, with one or more address spaces associated with the portion(s) being reclaimed, with one or more application logics 214 associated with the portion(s) being reclaimed, and/or with one or more application logics associated with the address space(s). For example, the region(s) 214 and/or external memory allocation(s) may be associated with one or more virtualization instances, virtual machine(s), container(s), jail(s), and/or zone(s), that have previously accessed one or more of the portions being reclaimed. In other examples, one or more of the region(s) 214 and/or external memory allocation(s) may be provisioned to one or more entities associated with the address space(s), with one or more application logics 314 associated with the portion(s) being reclaimed, and/or with one or more application logics 314 associated with the address space(s). For example, the region(s) 214 may be provisioned to one or more virtualization instances, to one or more application logics 314, to one or more clients 130, and/or to any other one or more entities.

In some examples, one or more regions 214 and/or external memory allocations may be created in response to the low memory condition, exceeding configured memory limits, and/or other event(s). For example, one or more regions and/or external memory allocations may not be created until there are insufficient available portions of previously-created region(s) 214 and/or external memory allocation(s) to satisfy current needs. In some examples, no regions 214 and/or external memory allocations may be created until after at least one portion of external primary memory is needed to reclaim one or more portions of local primary memory. This approach may be advantageous in that it may reduce the amount of external primary memory reserved for created region(s) 214 and/or external memory allocations in example systems where creating a region 214 and/or external memory allocation reserves some amount of external primary memory for the region 214 and/or external memory allocation.

In some examples, the portion(s) of external primary memory may be, may include, and/or may constitute a slab, a page, a huge page, a chunk, a buffer, and/or any other suitable unit of allocation. In other examples, one or more of the portion(s) of external primary memory may have already been allocated and/or may already be associated with one or more portions of local primary memory to be reclaimed. In these examples, one or more previously-allocated portion(s) may not be allocated.

In some examples, one or more of the portion(s) of local primary memory to be reclaimed may be anonymous memory. Alternatively or in addition, one or more of the portion(s) of local primary memory to be reclaimed may be file-backed memory and/or a portion of a memory-mapped file. One or more of the region(s) 214 and/or external memory allocation(s) including the selected portion(s) of external primary memory may be associated with and/or provisioned to the memory-mapped file.

In some examples, such as if there is insufficient external primary memory to allocate the one or more portions of external primary memory, swap space may be selected. The swap space may be selected to accommodate data for all of, or a portion of, the portions to reclaim. In some examples, both swap space and external primary memory may be selected. An advantage of selecting swap space for all or a portion of the portions to reclaim may be that systems using this approach may continue to operate, even after exhausting all available local primary memory and external primary memory by utilizing swap space to hold data for portions to be reclaimed.

As explained above, the term "swap space" as used herein refers to memory stored in a conventional swap file, swap partition, and/or swap device, which may be remotely accessed via a storage protocol and/or may be accessed over a local bus via a storage protocol, such as with the backing store 360. Swap space may be one or more areas of memory and/or storage that may hold data that would otherwise be held in local primary memory. For example, the data may have been previously stored in local primary memory and/or may have been removed from local primary memory in response to a low memory condition, in response to determining that the data is unlikely to be used soon, in order to make room in local primary memory for other data, and/or for any other reason. Once held in swap space, all or some of the data may be copied to local primary memory in response to and/or in anticipation of an attempt to access the data. The one or more areas of memory and/or storage of swap space may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a phase change memory, 3D XPoint memory, a memristor memory, any type of memory configured in an address space addressable by the processor, or any combination thereof. Alternatively or in addition, one or more areas of memory and/or storage of swap space may include one or more solid state memories, solid state storage devices, and/or any other one or more types of memory, storage, storage device, and/or storage system known now or later discovered.

Upon completing and/or skipping allocation of the one or more portions of external primary memory (1318), the client logic 312 and/or another logic may write (1320) data from the one or more portions of local primary memory to be reclaimed to the one or more portions of external primary memory, such as by copying the data to the one or more portions of one or more regions 214 and/or external memory allocations. In some examples, the data may be copied using client-side memory access, via one or more RDMA operations, and/or via any other one or more suitable data transfer operations. In these and/or other examples, the data may be optionally encrypted, decrypted, compressed, decompressed, and/or may undergo data translation before, during, and/or after being written (1320). Other examples of data translation may be described elsewhere in this disclosure. In some examples, the encryption, decryption, compression, decompression, and/or data translation may be performed in whole or in part by one or more communication interfaces 230, 330, 430, one or more processors 240, 340, 440, other devices, and/or other logic. In examples where the data is compressed, the compression may be performed prior to allocating (1318) the one or more portions of external primary memory. Compressing the data before allocating (1318) may be advantageous when using compression algorithms for which it may be difficult to predict the resulting size of compressed data.

Upon writing the data (1320), the client logic 312 and/or another logic may associate one or more addresses with the one or more portions of external primary memory (1322). The one or more addresses associated may be previously associated with and/or mapped to the one or more portions of local primary memory that had not been used recently and/or were determined to be unlikely to be used in the near future. In some examples, the one or more portions of local primary memory may be disassociated and/or unmapped from the one or more addresses before, after, or while associating the one or more addresses with the one or more portions of external primary memory (1322).

For example, such as may be the case with anonymous memory pages, one or more references to the one or more portions of local primary memory may be removed from one or more page table entries and/or other data structure(s), and/or references and/or identifiers to the one or more portions of external primary memory may be stored in place of the reference(s) to portion(s) of local primary memory. In the same and/or other examples, the one or more page table entries may be updated, modified, and/or replaced. While storing the references and/or identifiers to the one or more portions of external primary memory, the page table entries may be invalidated and/or may be marked as not present. This may be advantageous in cases where the portions of external primary memory are not addressable by the processor 340 of the client 130. A portion may be considered not addressable by the processor if it cannot be accessed via a load and/or store instruction as part of the processor's instruction set without triggering a page fault.

In other examples, such as may be the case with file-backed memory, one or more references to the one or more portions of local primary memory may be removed from, updated in, modified in, and/or replaced in a data structure, such as a data structure associating portions of a corresponding file with portions of external primary memory and/or with some other backing store. Examples of data structures suitable for this purpose may include an array, an extensible array, a sparse array, a radix tree, a mapping, a hash table, and/or any other data structure that facilitates associating file portions and/or file offsets with references and/or identifiers.

The identifier(s) stored in, removed from, updated in, modified in, and/or replaced in the one or more page table entries and/or other data structure(s) may be usable to identify the corresponding portions of external primary memory. For example, the identifier(s) may indicate and/or include one or more references to one or more regions 214, to one or more external memory allocations, and/or to one or more memory appliances 110. Alternatively or in addition, the identifier(s) may be usable with some other data structure to identify the corresponding portions of external primary memory. For example, the identifier(s) may be usable with a distributed hash table and/or other data structure to identify one or more regions 214, one or more external memory allocations, and/or one or more memory appliances 110 that include the corresponding portion(s) of external primary memory. Other examples of data structures suitable for this purpose may include an array, an extensible array, a sparse array, a radix tree, a mapping, a hash table, and/or any other data structure that may associate identifiers with: other identifiers, regions 214, external memory allocations, and/or memory appliances 110.

Upon associating the one or more addresses with the one or more portions of external primary memory (1322), handling of the low memory condition, exceeding configured memory limits, and/or other event(s) may be complete (1324).

The operations depicted in FIG. 13A and FIG. 13B may occur independently, concurrently, repeatedly, and/or may be interleaved. In some examples, after reclaiming a portion of local primary memory using the operations described for FIG. 13B, a page fault for the same address may occur, causing a second portion of local primary memory to be allocated (1304), data to be copied (1310) from the selected portion of external primary memory to the second portion of local primary memory, and causing the address to be mapped (1312) to the second portion of local primary memory. Similarly, the second portion of local primary memory may be subsequently selected to be reclaimed, triggering the operations described for FIG. 13B for the second portion of local primary memory.

In some examples, the operations depicted in FIG. 13A and FIG. 13B may occur on the same and/or different clients 130. For example, after one or more portions of local primary memory are reclaimed at a first client using the operations described for FIG. 13B, an application logic 314, such as a virtualization instance, a virtual machine, a container, a jail, and/or a zone, may be migrated from the first client to a second client, and/or one or more page faults may occur while the application logic 314 is operating with the second client. In response to the page fault, the operations described for FIG. 13A may be triggered at the second client. For example, one or more portions of local primary memory may be allocated (1304) at the second client, data from one or more portions of external primary memory that were selected (1318) during earlier reclaim operations may be copied (1310) to the one or more portions of local primary memory of the second client, and/or one or more addresses at the second client may be mapped (1312) to the one or more portions of local primary memory at the second client. As the application logic 314 continues to operate with the second client, the application logic 314 may then access the data in the portions of local primary memory of the second client, such as via the mapped address(es).

The portion(s) being reclaimed and/or the portion(s) of local primary memory that have not been used recently and/or are unlikely to be used in the near future may be selected using any one or more selection strategies, portion replacement strategies, and/or page replacement strategies known now or later discovered. For example, one or more portion(s) of local primary memory may be tracked using one or more sorted and/or unsorted collections, such as one or more least-recently used lists. As portion(s) of local primary memory are accessed, read, written, referenced, etc., the collection(s) may be updated, modified, and/or replaced to reflect the action that occurred. For example, the position of the portion of local primary memory may be moved to the back of a sorted list of least-recently used portions, and/or may be moved to a different collection, such as to a collection of active portions. Alternatively or in addition, the position of other portion(s) of local primary memory may be updated, modified, and/or replaced in response to the action. For example, one or more other portions may be moved from the collection of active portions to a collection of inactive portions. Other examples of portion replacement strategies may include not-recently-used, first-in-first-out, second-chance, clock, random replacement, not-frequently-used, aging, longest-distance-first, any other portion replacement strategy known now or later discovered, and/or any combination of two or more of these and/or any other strategies.

The one or more selection strategies, portion replacement strategies, and/or page replacement strategies used may be selected by a user and/or an administrator, may be configured, and/or may be selected based on any one or more policies, passed functions, steps, and/or rules that the client logic 312 and/or another logic follows to determine which one or more selection strategies, portion replacement strategies, and/or page replacement strategies to use and/or which parameter(s) and/or configuration(s) to use with the one or more selection strategies, portion replacement strategies, and/or page replacement strategies. The one or more policies, passed functions, steps, and/or rules may use any available information, such as any one or more of the characteristics and/or configurations of the client(s) 130, the memory appliance(s) (110), and/or the management server(s), to select the one or more selection strategies, portion replacement strategies, and/or page replacement strategies. For example, a policy and/or passed function may specify to use a random replacement strategy unless the number of page faults that result in reading from external primary memory reaches a threshold, and/or to use a least-recently-used strategy after reaching the threshold.

Alternatively or in addition, the one or more selection strategies, portion replacement strategies, and/or page replacement strategies used may be affected by one or more policies, passed functions, steps, and/or rules that the client logic 312 and/or another logic follows to determine how the one or more selection strategies, portion replacement strategies, and/or page replacement strategies should operate. The one or more policies, passed functions, steps, and/or rules may use any available information, such as any one or more of the characteristics and/or configurations of the client(s) 130, the memory appliance(s) (110), and/or the management server(s), to affect the one or more selection strategies, portion replacement strategies, and/or page replacement strategies. For example, a policy and/or passed function may specify an amount of memory to unmap from page table entries and/or to reclaim when activated. In another example, a policy and/or passed function may specify an amount of data to retain in local primary memory as frequently-used and/or "hot" data.

In some examples, a sorted collection may be approximated by storing one or more values with portion-tracking data structures. The one or more values stored may include one or more generation counters and/or timestamp values. For example, a generation counter may be maintained and/or may be incremented and/or decremented as portion(s) are accessed and/or as page fault(s) occur. As the portion(s) are accessed and/or as page fault(s) occur, the one or more values may be stored with one or more portion tracking data structures that correspond to the portion(s) being accessed and/or the portion(s) being page-faulted. Alternatively or in addition, the one or more values stored may include a count of the number of times corresponding portion(s) were accessed and/or page-faulted.

Periodically and/or in response to an event and/or condition, all of or a subset of all portion tracking data structures may be inspected and/or corresponding stored values may be collected in a data structure. For example, all portion tracking data structures for a file and/or allocation domain may be inspected and/or corresponding stored values may be collected. An allocation domain may be a logical partitioning of computing resources and/or may be controlled via one or more file data limits, such as described in U.S. Non-provisional patent application Ser. No. 15/424,395, filed Feb. 3, 2017, which is hereby incorporated by reference. In some examples, one or more virtualization instances, virtual machines, containers, jails, and/or zones may be and/or may be included in an allocation domain. The collected values may be stored in the data structure with one or more identifiers for the corresponding portions, such as an address, offset, and/or index of the corresponding portions and/or an address and/or reference to corresponding portion tracking data structures. The collected values may be sorted while being collected and/or after being collected. In some examples, all of or a subset of all portion tracking data structures may be updated, modified, and/or replaced periodically and/or in response to the event and/or condition and/or in response to another event and/or condition. For example, in examples where the one or more values stored include a count of the number of times corresponding portion(s) were accessed and/or page-faulted, the value(s) may be reset, cleared, zeroed, removed, updated, modified, replaced, and/or invalidated, such as by setting the value(s) to zero and/or setting and/or clearing one or more indicators indicating that the value(s) are invalid and/or not present.

The sorted collected values may be used to identify portion(s) of local primary memory that have not been used recently and/or are unlikely to be used in the near future by inspecting the portion-tracking data structures for the portions corresponding to the first and/or last value in the sorted collected values. For example, if the sorted collected values are sorted based upon a timestamp and/or generation counter for the most recent access and/or page fault of corresponding portions, then the lowest value may correspond to the portion which was least recently used. Alternatively or in addition, if the sorted collected values are sorted based upon the count of the number of times corresponding portions were accessed and/or page-faulted, then the lowest value may correspond to a portion which is relatively infrequently used and/or which has not been used frequently since the value(s) were last reset. As such, storing, collecting, and/or sorting the stored values may be used to approximate a least-recently-used strategy, a not-frequently-used strategy, and/or any other strategy that traditionally includes maintaining a sorted collection to identify one or more candidates to reclaim.

A timestamp value may be any value that corresponds to the current time. The timestamp value may be specified in any one or more units of time, such as seconds, milliseconds, microseconds, jiffies, etc., and or may be relative to some other defined time. For example, a timestamp may be the number of seconds since midnight on Jan. 1, 1970. In another example, a timestamp may be the number of seconds and microseconds since midnight on Jan. 1, 2000. The timestamp value may be specified in a defined time zone, such as UTC, GMT, and/or any other time zone. Alternatively or in addition, the timestamp value may be specified in the time zone where one or more clients 130, one or more memory appliances 110, one or more management servers 120, and/or any other one or more entities are physically located.

In some examples, the actual values for one or more portions may change between when the values in the sorted collected values are collected and when portion(s) of local primary memory are to be identified for reclaim. Prior to selecting a portion of local primary memory for reclaim and/or prior to reclaiming the selected portion, the client logic 312 and/or another logic may inspect the corresponding portion tracking data structure and/or obtain the current value for the portion. If the current value for the portion is equal to the value in the sorted collected values data structure, the portion may be considered a good candidate to reclaim. Alternatively or in addition, the current value for the portion may be compared with a threshold value to determine if the portion is a good candidate to reclaim. For example, the threshold value may be the mean and/or median value from the sorted collected values, the 80th percentile value from the sorted collected values, any other value from the sorted collected values, a calculated value based upon one or more values from the collected values, a value based on the current timestamp and/or generation counter, and/or any other value which may be useful for determining suitability for reclaiming a portion. In some examples, the current value for the portion may be checked during other and/or additional steps of reclaiming portion(s) of local primary memory. For example, the current value may be compared to the stored and/or threshold value prior to associating the one or more addresses with the one or more portions of external primary memory (1322) and/or prior to removing the one or more references to the one or more portions of local primary memory from the one or more page table entries and/or other data structure(s).

In some examples, the collected values may be analyzed and/or used to determine the threshold value, but not used directly to identify candidate portions to reclaim. For example, the collected values may be sorted, analyzed, and/or partially sorted in order to determine the value that would be at the 80th percentile and/or any other position of the sorted collected values and choose this value as the threshold value. In another example, the threshold value may be calculated based on one or more of the collected values and/or sorted collected values. In lieu of using the collected values directly to identify candidate portions to reclaim, candidate portions may be chosen using any selection strategy, portion replacement strategy, and/or page replacement strategy known now or later discovered. For example, candidate portions to reclaim may be selected randomly and/or portion tracking data structures for candidate portions may be inspected to compare one or more stored values to one or more threshold values that were determined from the collected values.

An advantage of using the sorted collected values and/or threshold values as described herein over maintaining one or more sorted collections may be that lock contention may be reduced and/or eliminated. For example, if a lock primitive would be used to access, update, modify, and/or replace the sorted collection(s), the lock primitive could be avoided when not attempting to maintain the sorted collection(s), and/or the lock primitive may not need to be acquired when handling a page fault and/or other type of access operations which may otherwise cause the sorted collection(s) to be updated/modified/replaced and/or one or more portions to be moved within the sorted collection(s) and/or between multiple collections.

In some example systems the sorted collected values may be collected and/or sorted without acquiring any highly-contended lock primitives. For example, when using a lock-free page cache and/or other data structure, portions of a file and/or address space may be iterated by speculatively referencing entries in a radix tree and/or other data structure that uses a read-copy-update and/or other lock-free mechanism to coordinate access. Speculatively-referenced entries may be individually locked and/or verified to exist when collecting the stored values for corresponding portion tracking data structures. In some examples, if a portion is already locked, invalid, and/or unable to be verified, the portion may be skipped. Skipping these portions may be advantageous and/or may improve efficiency of collecting values in example systems where locked and/or invalid portions are unlikely to be good candidates to reclaim.

FIG. 14A and FIG. 14B illustrate example mappings and/or associations between address spaces, file data, local primary memory, and/or external primary memory for example systems in which some portions of an address space are mapped to local primary memory and/or some portions of the address space are associated with external primary memory. As illustrated in FIG. 14A, an address space 1402 may include and/or map to a mapped portion 1404, such as with an anonymous memory mapping. In some examples, the address space 1402 may be a virtual address space. One or more data structures may be updated, modified, and/or replaced to indicate that the portion of the address space 1402 corresponding to the mapped portion 1404 includes and/or is mapped to anonymous memory. As portions 1406 of the address space 1402 for the mapped portion 1404 are accessed and/or reclaimed, the portions 1406 may become mapped to one or more local memory portions 1408 and/or associated with one or more portions 1410, 1412 of one or more regions 214a, 214b of external primary memory. In some examples, one or more portions 1408 of local primary memory may be associated with one or more portions of external primary memory 1414, such as when writing to the portion of external primary memory 1414 (such as prior to reclaiming the portion of local primary memory 1408 with operations, such as described for FIG. 13B) and/or when reading from the portion of external primary memory 1414 (such as in response to a page fault and/or other event, such as described for FIG. 13A).

As portions 1406 of the mapped portion 1404, other portions of the address space 1402, and/or other portions of other address spaces are accessed, the mappings and/or associations illustrated for FIG. 14A may change. For example, other mappings to other portions of local primary memory may be formed using operations similar to those described for FIG. 13A. Alternatively or in addition, mappings to portions of local primary memory may be replaced with associations with external primary memory using operations similar to those described for FIG. 13B.

As illustrated in FIG. 14B, an address space 1416 may include and/or map to a mapped portion 1418, such as with a file-backed memory mapping. The corresponding file may be a pseudo file or a conventional file. The address space 1416 may be the same address space or a different address space as the address space 1402 illustrated in FIG. 14A. In some examples, the address space 1416 may be a virtual address space. The mapped portion 1418 may be the same as or different than the mapped portion 1404 illustrated in FIG. 14A. The mapped portion 1418 may map to a mapped file portion 1420 of a file and/or may be included in the file data 1422 for a file. In the example illustrated in FIG. 14B, the file data 1422 represents the entire contents of the file.

As portions of the address space 1416 for the mapped portion 1418 are accessed and/or reclaimed, some portions 1424 of the address space 1416 may become mapped to one or more local memory portions 1426 and/or some portions 1428, 1430 of the file data 1422 may become associated with one or more portions 1432, 1434 of one or more regions 214a, 214b and/or of one or more external memory allocations. For example, a portion 1424 of the mapped portion 1418 in the address space 1416 may map to the local memory portion(s) 1426. A reference and/or address to the local memory portion 1426 may be stored in a page table entry corresponding to the portion 1424 of the mapped portion 1418 in the address space 1416. Alternatively, or in addition, a portion 1436 of the mapped filed portion 1420 in the file data 1422 may map to the local memory portion 1426. For example, a reference to the local memory portion 1426 may be stored in the file data 1422 and/or in a data structure related to the file and/or file data 1422, such as the data structure associating portions of a corresponding file with portions of external primary memory and/or with some other backing store.

As portions of the mapped portion 1418, other portions of the address space 1416, and/or other portions of other address spaces are accessed, the mappings and/or associations illustrated for FIG. 14B may change. For example, other mappings to other portions of local primary memory may be formed using operations similar to those described for FIG. 13A. Alternatively or in addition, mappings to portions of local primary memory may be replaced with associations with external primary memory using operations similar to those described for FIG. 13B.

Figure 15:
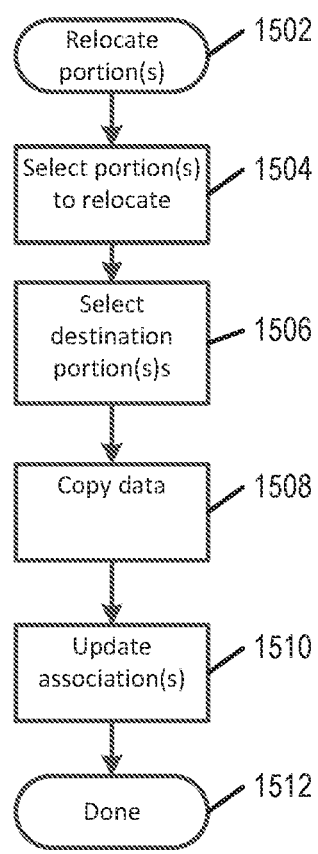
FIG. 15 illustrates an example flow diagram for relocating one or more portions of external primary memory.

FIG. 15 illustrates an example flow diagram for relocating one or more portions of external primary memory. Operations for relocating one or more portions of external primary memory may begin (1502) in response to a triggering event and/or condition. For example, an administrator may request that all data from a first region and/or external memory allocation be migrated to a second region and/or external memory allocation. This may be desirable in examples where a memory appliance 110 that includes the first region may need to be taken offline for maintenance, repairs, upgrades, replacement, and/or for any other reason. In other examples, an administrator may request that all data from a memory appliance 110 be migrated to other memory appliances and/or to other locations.

Upon starting the operations for relocating one or more portions of external primary memory, the client logic 312, region access logic 212, and/or another logic may select (1504) one or more portions to relocate. In some examples with a triggering event, the portion(s) may be specified by the triggering event. Alternatively or in addition, the portion(s) may be selected via some other strategy. For example, the client logic 312 and/or another logic may select all previously-allocated portions in one or more regions 214 and/or external memory allocations that may have been selected to be destroyed. In another example, the client logic 312 and/or another logic may select all previously-allocated portions in one or more memory appliances 110 that may need to be taken offline for maintenance, repairs, upgrades, replacement, and/or for any other reason. In another example, the client logic 312 and/or another logic may select all previously-allocated portions in one or more parts of one or more regions 214 and/or external memory allocations that are to be shrunk, truncated, hole-punched, resized, and/or marked not present.

Upon selecting the one or more portions to relocate, the client logic 312, region access logic 212, and/or another logic may select (1506) one or more destination portions. There may be the same number of destination portions, more destination portions, or fewer destination portions than portions of external primary memory to relocate. For example, there may be one destination portion of size equal to or larger than the sum of the sizes of all portions to relocate. In other examples, there may be multiple destination portions. In still other examples, for each portion to relocate, there may be a corresponding same-sized destination portion. In other examples, there may be only one portion to relocate and one destination portion.

In some examples, the destination portion(s) may be included in one or more regions 214 and/or external memory allocations. The destination portion(s) may be selected and/or the region(s) 214 and/or external memory allocation(s) in which the portion(s) are selected may be selected using any of the methods and/or logic described herein, such as for provisioning, allocation, selection, slab allocation, allocation strategies, policies, passed functions, steps, and/or rules, etc. Alternatively or in addition, the portion(s) may be selected and/or the region(s) 214 and/or external memory allocation(s) in which the portion(s) are selected may be selected using any selection strategy known now or later discovered. In examples where more than one portion of external primary memory is to be relocated, the same region 214 and/or external memory allocation may be selected for multiple portions to be relocated and/or one or more different regions and/or external memory allocations may be selected for one or more portions to be relocated. In other examples, the one or more of the destination portion(s) may be included in local primary memory, such as in the memory 310 of the client 130.

Upon selecting the one or more destination portions, the client logic 312, the region access logic 212, and/or another logic may copy (1508) data from the portion(s) to relocate to the destination portion(s). In some examples, the data may be copied using client-side memory access, via one or more RDMA operations, and/or via any other one or more suitable data transfer operations. In these and/or other examples, the data may be optionally encrypted, decrypted, compressed, decompressed, and/or may undergo data translation before, during, and/or after being copied (1508). Other examples of data translation may be described elsewhere in this disclosure. In some examples, the encryption, decryption, compression, decompression, and/or data translation may be performed in whole or in part by one or more communication interfaces 230, 330, 430, one or more processors 240, 340, 440, other devices, and/or other logic.

Upon copying the data, the client logic 312, region access logic 212, and/or another logic may update, modify, and/or replace (1510) one or more portion associations. Updating, modifying, and/or replacing the association(s) may include disassociating one or more addresses with one or more of the portions to relocate. Alternatively, or in addition, updating, modifying, and/or replacing the associations may include removing one or more identifiers of the portions to relocate from one or more data structures, such as one or more page tables and/or the data structure associating portions of a corresponding file with portions of external primary memory and/or with some other backing store, as described elsewhere in this disclosure. Alternatively or in addition, updating, modifying, and/or replacing the associations may include associating one or more addresses with one or more of the destination portions and/or adding one or more identifiers of the destination portions to the one or more data structures, such as one or more page tables and/or the data structure associating portions of a corresponding file with portions of external primary memory and/or with some other backing store. Alternatively or in addition, one or more identifiers may not be updated, modified, and/or replaced, such as if the identifiers are used with one or more other data structures to identify the portions to relocate and/or the destination portions. For example, the one or more other data structures may be updated, modified, and/or replaced to identify the destination portions instead of the portions to be relocated. Alternatively or in addition, no updates/modifications/replacements may be needed, such as if the other data structure(s) include a hash table (or a data structure with similar utility), and/or if the portion(s) to relocate and the destination portion(s) are both identifiable from the same identifiers using the one or more data structures. Upon updating, modifying, and/or replacing (1510) the one or more portion associations, the operations for relocating one or more portions of external primary memory may be complete (1512).

Alternatively or in addition to the operations described herein, other operations may be performed to relocate one or more portions of external primary memory. For example, the client logic 312, the application logic 314, the allocation logic 412, and/or another logic may transmit the request to migrate a region and/or the request to restructure an external memory allocation, which are described elsewhere in this disclosure. The request to migrate a region and/or the request to restructure an external memory allocation may cause one or more region(s) 214 and/or one or more external memory allocations to be relocated from one memory appliance 110 to another. By causing the one or more region(s) 214 and/or one or more external memory allocations to be relocated, one or more portions included in the one or more region(s) 214 and/or one or more external memory allocations may also be relocated. Upon completing the request to migrate a region and/or the request to restructure an external memory allocation, the client logic 312, region access logic 212, and/or another logic may update, modify, and/or replace (1510) one or more portion associations, as described for FIG. 15. Alternatively or in addition, one or more portion associations may not be updated, modified, and/or replaced, such as if the portion associations are defined independently of which memory appliance(s) 110 include the one or more regions 214 and/or external memory allocations.

Methods and/or systems may be provided that provide fork-safe access to data on memory appliances or other devices accessed via memory-mapped I/O (Input/Output). Memory-mapped I/O is a mechanism in which communication with an I/O device is accomplished by accessing memory that is mapped to the I/O device. For example, memory and/or registers of the I/O device may be mapped to (or associated with) memory addresses accessible by a CPU (central processing unit) or other processor. The mapped memory addresses may be referred to as virtual addresses and/or virtual memory addresses. When any virtual memory address is accessed by the CPU, the virtual memory address may reference a portion of physical RAM in primary memory and/or memory of the I/O device. Thus, instructions executed by the CPU that access the virtual memory address may also access the I/O device.

The memory-mapped I/O may involve a memory-mapped file. The memory-mapped file may be a segment of virtual memory which has been assigned to a portion of a file or a pseudo file. Accordingly, the memory-mapped file may be accessed via memory-mapped I/O. A memory-mapped file comprises virtual memory backed by a file or pseudo file. The memory-mapped file may be created, in some examples, by invoking mmap( ) on a POSIX-compliant Unix operating system.

By way of an example, a system may provide one or more pseudo files in a filesystem; a user and/or a process may open the one or more of the pseudo files; and memory map (for example, mmap) operations may be performed on the one or more pseudo files. A pseudo file may be a logical entity accessible through a file interface, where the pseudo file may be accessed or otherwise used like a file through the file interface, but the pseudo file may not actually be a file stored in a traditional file system. For example, reads and writes to the pseudo file may be translated into reads and writes to one or more of the memory appliances instead of accessing data in the traditional file system. In addition to accessing the pseudo file directly through the file interface, the pseudo file may be accessed through a memory operation on a virtual memory address mapped to the pseudo file. Alternatively or in addition to the pseudo file, the memory map operations may be performed on any other type of file.

The file may be a regular file in a filesystem, a special file, a block device file, a character device file, a pseudo file, any other type of file, and/or any other interface that can be memory-mapped. The file may be backed by any medium capable of holding data, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, V-NAND, Z-NAND, a phase change memory, 3D XPoint memory, a memristor memory, a solid state storage device, a magnetic disk, tape, and/or any other media capable of holding data known now or later discovered. In one example, the file may include an interface to enable memory mapping to a peripheral that enables access to solid state memory, such as a PCIe-attached flash-memory peripheral. In another example, the file may include an interface, such as an interface in a virtual filesystem that provides access to a corresponding area of the memory 210 in the memory appliance 110, such as the region 214. As such, reading or writing data to a specified offset within the file may cause the virtual filesystem to read or write data from the corresponding offset within the memory 210 of the memory appliance 110. Similarly, when the file is memory-mapped, page faults in memory backed by the file may cause the virtual filesystem to read data from the corresponding offset within the memory 210 of the memory appliance 110, and/or writeback to the file may cause the virtual filesystem to write data to the corresponding offset within the memory 210 of the memory appliance 110.

The capability to memory map the file may be provided by an operating system. A memory allocation wrapper around this memory map capability may be provided through which a user and/or a process may allocate memory from the memory appliance to use as its application memory. The memory allocation wrapper or interface may be used without re-compiling the application, such as if the memory allocation wrapper and/or related logic is configured to override and/or take the place of interfaces and/or programmatic procedures that would otherwise be provided by another logic, such as the operating system or a system library.

In order to implement a complete memory allocation solution using memory-mapped files, the system may address inherent differences in how memory-mapped files are treated versus anonymous memory. Anonymous memory is memory usually obtained from the operating system by memory allocation interfaces, such as malloc( ), mmap( ), brk( ), and/or sbrk( ) in C programs. Specifically, when a process forks using anonymous memory, the child process effectively obtains a copy of the parent process's anonymous memory at the time of the fork (most modern operating systems achieve this via copy-on-write semantics). The copying of anonymous memory means that changes to the anonymous memory in either the child process or the parent process after the fork do not appear in the other respective process's view of the memory. A process may fork for different reasons. In one example, a process may fork in order to achieve greater parallelization in doing some computation. In another example, a process may fork in order to start processes that do different parts of a larger task. In another example, a process may fork in order to start other processes requested by a user (such as a login shell forking, and then executing a program typed by the user into the shell's command prompt). Without the ability to support proper forking semantics, a memory allocation solution using memory-mapped files may be severely limited. The system may provide fork-safe allocation from memory-mapped files as described in U.S. Non-Provisional patent application Ser. No. 15/076,561, entitled "FORK-SAFE MEMORY ALLOCATION FROM MEMORY-MAPPED FILES WITH ANONYMOUS MEMORY BEHAVIOR", which published as U.S. Patent Application Publication 2016/0283127 A1, and which is hereby incorporated by reference.

While some capabilities of the memory allocation interface and/or any other data interface(s) may have been described separately in order to simplify the explanations, it should be understood that any one or more capabilities may be present in an example embodiment. For example an embodiment may include any one or more of: allocation at the client device 130, coordinated allocation, fork-safe allocation, allocation of local-primary memory, and/or allocation of external primary memory in response to a memory allocation request. Alternatively and/or in addition, the example embodiment may include conversion of anonymous memory to file-backed memory, conversion of file-backed memory to anonymous memory, handling of page faults, reclaiming of local primary memory, relocating one or more portions of external primary memory, and/or any other capability described herein.

In a sixth example, the data interface may include a memory swapping interface. The memory swapping interface may include an API. The memory swapping interface may enable the application logic 314 to remove infrequently accessed data from primary memory. In one example implementation, the application logic 314 may be an operating system, or a portion of an operating system, such as a kernel and/or a memory management subsystem. For example, the memory swapping interface may be available to, or part of, the swap implementation. In another example, the memory swapping interface may be an interface through which the swap implementation is invoked. The memory swapping interface may include a block-level interface. The memory swapping interface may include a swap device. Alternatively, or in addition, the memory swapping interface may include a character-level interface. For example, the memory swapping interface may emulate a swap file using a character device interface and/or a block device interface. In another example, the memory swapping interface may emulate a swap file using a filesystem interface. The filesystem interface may include an interface which may allow the application logic and/or any other logic to perform read and/or write operations without storing the read/written data in a page cache. Other examples may include any other suitable interface for storing and/or retrieving portions of memory (such as the memory 310 of the client 130) to be swapped into/out-of memory. The memory swapping interface may be made available to all applications in the client 130, such as the application logic 314, or to a subset of applications. The memory swapping interface may include a transcendental memory interface. For example, the memory swapping interface may include a front-swap interface. The front-swap interface may include one or more interfaces to initialize the front-swap interface, to store one or more pages, to get one or more pages, to invalidate one or more pages, and/or to invalidate multiple pages.

An interface to initialize the front-swap interface may initialize metadata. The metadata may include offsets within the external memory allocations and/or the regions for where to find the data from zero or more pages. The metadata may include one or more data structures to facilitate fast lookup of the offsets. For example, the metadata may include a hash table, a red-black tree, a radix tree, and/or any other data structure known now or later discovered. The one or more data structures may be indexed and/or may include an index based upon an identifier for the zero or more pages. The metadata may be included in the memory of the client. Alternatively, or in addition, the metadata may be included in the external memory allocations, regions referenced by the external memory allocations, in the region metadata 215, and/or in the external allocation metadata 318.

An interface to store one or more pages may perform client-side memory access to write data from the page(s) to corresponding portion(s) of one or more external memory allocations and/or one or more regions referenced by the one or more external memory allocations. Alternatively, or in addition, the interface to store one or more pages may update metadata indicating the presence and/or offset of the data from the page(s) in the external memory allocations and/or the regions. The interface to store one or more pages may perform client-side memory access to read and/or write the metadata from/to one or more locations within the external memory allocations and/or regions referenced by the external memory allocations.

A interface to get one or more pages may perform client-side memory access to read data into the page(s) from corresponding portion(s) of the external memory allocations and/or the regions referenced by the external memory allocations. The interface to get one or more pages may utilize the metadata and/or the one or more data structures to determine the offset for where to find the data from the page(s). The interface to get one or more pages may perform client-side memory access to read and/or write the metadata from/to one or more locations within the external memory allocations and/or regions referenced by the external memory allocations.

A interface to invalidate one or more pages may update metadata indicating the non-presence of the data from the page(s) in the external memory allocations and/or the regions. Updating the metadata may include updating the one or more data structures. The interface to invalidate one or more pages may perform client-side memory access to read and/or write the metadata from/to one or more locations within the external memory allocations and/or regions referenced by the external memory allocations. Alternatively, or in addition, the interface to invalidate one or more pages may perform client-side memory access to overwrite data from the page(s) to one or more corresponding portion(s) of the external memory allocations and/or the regions referenced by the external memory allocations.

An interface to invalidate multiple pages may update metadata indicating the non-presence of the data from the multiple pages in the external memory allocation and/or the regions. The multiple pages may be all pages associated with a specified swap area, swap device, swap partition, and/or swap file. Updating the metadata may include updating the one or more data structures. For example, updating the metadata may include emptying and/or removing one or more data structures. The interface to invalidate a page may perform client-side memory access to read and/or write the metadata from/to a location within the external memory allocations and/or regions referenced by the external memory allocations. Alternatively, or in addition, the interface to invalidate multiple pages may perform client-side memory access to overwrite data from the multiple pages to one or more corresponding portions of the external memory allocations and/or the regions referenced by the external memory allocations.

In a seventh example, the data interface may include a memory caching interface. The memory caching interface may include an API. The memory caching interface may enable the application logic 314 to store data from secondary memory in external memory. For example, the memory caching interface may store data from secondary memory in regions, in an external memory allocation, and/or in the regions referenced by the external memory allocation. In one example implementation, the application logic 314 may be an operating system, or a portion of an operating system, such as a kernel and/or a page cache subsystem. Data from secondary memory may include data from a block-level interface, from a block device interface, from a file system, and/or from any other form of secondary memory. In one example, data from secondary memory may include pages of data from a file system. The memory caching interface may be made available to all applications in the client 130, such as the application logic 314. The memory caching interface may include a page-caching interface. Alternatively, or in addition, the memory may include a transcendental memory interface. For example, the memory caching interface may include a clean-cache interface. The clean-cache interface may include one or more interfaces to initialize a file system cache, to put one or more pages, to get one or more pages, to invalidate one or more pages, and/or to invalidate multiple pages.

An interface to initialize a file system cache may initialize metadata. The metadata may include offsets within the external memory allocations and/or the regions for where to find the data from zero or more pages. The metadata may include one or more data structures to facilitate fast lookup of the offsets. For example, the metadata may include a hash table, a red-black tree, a radix tree, and/or any other data structure known now or later discovered. The one or more data structures may be indexed and/or may include an index based upon an identifier for the zero or more pages, an identifier for the file system, an identifier for a file system object, any other identifier relevant to the data being stored in external memory, and/or a combination of multiple identifiers, such as a concatenation and/or hash of identifiers. The file system object may be an inode, a file, a directory, and/or any other representation of data in a file system. The metadata may be included in the memory of the client 130. Alternatively, or in addition, the metadata may be included in the external memory allocations, regions referenced by the external memory allocations, in the region metadata, and/or in the external allocation metadata. Alternatively, or in addition, the interface to initialize a file system cache may initialize a file system cache for a shared and/or clustered file system. Alternatively, or in addition, the memory caching interface may include a separate interface to initialize a file system cache for a shared and/or clustered file system.

An interface to put one or more pages may perform client-side memory access to write data from the page(s) to corresponding portion(s) of one or more external memory allocations and/or one or more regions referenced by the one or more external memory allocations. Alternatively, or in addition, the interface to put one or more pages may update metadata indicating the presence and/or offset of the data from the page(s) in the external memory allocations and/or the regions. The interface to put one or more pages may perform client-side memory access to read and/or write the metadata from/to one or more locations within the external memory allocations and/or regions referenced by the external memory allocations.

An interface to get one or more pages may perform client-side memory access to read data into the page(s) from corresponding portion(s) of the external memory allocations and/or the regions referenced by the external memory allocations. The interface to get one or more pages may utilize the metadata and/or the one or more data structures to determine the offset for where to find the data from the page(s). The interface to get one or more pages may perform client-side memory access to read and/or write the metadata from/to one or more locations within the external memory allocations and/or regions referenced by the external memory allocations.

An interface to invalidate one or more pages may update metadata indicating the non-presence of the data from the page(s) in the external memory allocations and/or the regions. Updating the metadata may include updating the one or more data structures. The interface to invalidate one or more pages may perform client-side memory access to read and/or write the metadata from/to one or more locations within the external memory allocations and/or regions referenced by the external memory allocations. Alternatively, or in addition, the interface to invalidate one or more pages may perform client-side memory access to overwrite data from the page(s) to corresponding portion(s) of the external memory allocations and/or the regions referenced by the external memory allocations.

An interface to invalidate multiple pages may update metadata indicating the non-presence of the data from the multiple pages in the external memory allocation and/or the regions. The multiple pages may be all pages associated with a specified block device interface, file system, and/or file system object. Updating the metadata may include updating the one or more data structures. For example, updating the metadata may include emptying and/or removing one or more data structures. The interface to invalidate multiple pages may perform client-side memory access to read and/or write the metadata from/to a location within the external memory allocations and/or regions referenced by the external memory allocations. Alternatively, or in addition, the interface to invalidate multiple pages may perform client-side memory access to overwrite data from the multiple pages to one or more corresponding portions of the external memory allocations and/or the regions referenced by the external memory allocations.

In an eighth example, the data interface may include a hardware-accessible interface. The hardware-accessible interface may be a physically-addressable interface. A physically-addressable interface may be an interface which provides access to the underlying data using physical addresses, such as the physical addresses used on an address bus, a CPU interconnect, a memory interconnect, and/or on a peripheral interconnect. Alternatively or in addition, the hardware-accessible interface may be a virtually-addressable interface. For example, the hardware-accessible interface may be addressed using IO-virtual addresses. IO-virtual addresses may be translated to physical addresses by one or more address translation logics. Examples of address translation logics include memory management units (MMUs), input-output memory management units (IO-MMUs), translation lookaside buffers, and/or any other logic capable of translating virtual addresses to physical addresses known now or later discovered.

The hardware-accessible interface may enable a hardware application component to access data of a region. Alternatively or in addition, the hardware-accessible interface may enable the hardware application component to access data of one or more of the regions referenced by an external memory allocation. Alternatively or in addition, the hardware-accessible interface may enable the hardware application component to access data of the external memory allocation. The hardware application component may be a processor, a GPU, a communication interface, a direct memory access controller, an FPGA, an ASIC, a chipset, a compute module, a hardware accelerator module, a hardware logic, and/or any other physical component that accesses memory. The hardware application component may be included in the application logic 314. The hardware-accessible interface may include a hardware client component. A hardware client component may be and/or may include a processor, a GPU, an MMU, an IO-MMU, a communication interface, such as the one or more communication interfaces 330, a direct memory access controller, an FPGA, an ASIC, a chipset, a compute module, a hardware accelerator module, a hardware logic, a memory access transaction translation logic, any other hardware component, and/or a combination of multiple hardware components. The hardware client component may be included in the client logic 312. The hardware client component, the hardware application component, and/or the one or more communication interfaces may be embedded in one or more chipsets. The hardware client component may include a memory and/or cache. The memory and/or cache of the hardware client component may be used to hold portions of the data of external memory allocations and/or regions. Alternatively, or in addition, the hardware client component may utilize a portion of the memory of the client to hold portions of the data of external memory allocations and/or regions.

The hardware client component may respond to and/or translate attempts to access virtual addresses, physical addresses, logical addresses, IO addresses, and/or any other address used to identify the location of data. Alternatively, or in addition, the hardware client component may participate in a cache coherency protocol with the hardware application component. In a first example, the hardware client component may respond to attempts of the hardware application component to access physical addresses by accessing data included in the memory and/or cache of the hardware client component. In a second example, the hardware component may interface with a CPU interconnect and handle cache fill requests by reading data from the memory and/or cache included in the hardware client component. In a third example, the hardware client component may redirect and/or forward attempts of the hardware application component to access physical addresses to alternate physical addresses, such as the physical addresses of the portion of the memory 310 of the client 130 utilized by the hardware component. In a fourth example, the hardware client component may translate attempts of the hardware application component to access physical addresses into client-side memory access. For example, the hardware client component may interface with the CPU interconnect and handle cache fill requests by performing client-side memory access to read the requested data from the external memory allocation. Alternatively, or in addition, the hardware client component may handle cache flush requests by performing client-side memory access to write the requested data to the external memory allocation. Alternatively, or in addition, the hardware client component may handle cache invalidate requests by updating the memory and/or cache of the hardware client component to indicate the non-presence of the data indicated by the cache invalidate requests. In a fifth example, the hardware client component may translate attempts of the hardware application component to access IO addresses into client-side memory access. For example, the hardware client component may interface with a peripheral interconnect, such as PCI Express, and may respond to requests to read a portion of the IO address space by reading data from the memory included in the hardware client component, by reading the portion of the memory and/or cache of the client utilized by the hardware component, and/or by performing client-side memory access to read the requested data from the external memory allocation. In another example, the hardware client component may interface with a memory-fabric interconnect, such as Gen-Z and/or CXL, and may respond to memory read operations by reading data from the memory included in the hardware client component, by reading the portion of the memory 310 and/or cache of the client 130 utilized by the hardware component, and/or by performing client-side memory access to read the requested data from the external memory allocation.

In a ninth example, the data interface may include an interface to enable peripheral devices of the client 130 to access the external memory allocations. For example, the data interface may include a Graphics Processing Unit (GPU) accessible interface. The GPU accessible interface may enable a GPU application to access data of a region. Alternatively or in addition, the GPU accessible interface may enable the GPU application to access data of one or more of the regions referenced by an external memory allocation. Alternatively or in addition, the GPU accessible interface may enable the GPU application to access data of the external memory allocation. The GPU application may be an application logic, such as the application logic, executable on one or more processors of a GPU. The GPU may be included in the client. The GPU may include a client-side memory access interface that may enable the GPU application and/or the GPU accessible interface to perform client-side memory access using the one or more communication interfaces included in the client. The client-side memory access interface may be a GPUDirect, which is a trademark of NVIDIA Corporation, RDMA interface. The GPU accessible interface may include any one or more data interfaces. The GPU accessible interface may provide the one or more data interfaces to the GPU application. Examples of data interfaces included in the GPU-accessible interface and/or provided to the GPU application may be: an API, a block-level interface, a character-level interface, a memory-mapped interface, a memory allocation interface, a memory swapping interface, a memory caching interface, a hardware-accessible interface, any other interface used to access the data of the external memory allocations and/or of the regions, and/or a combination of data interfaces.

The client logic 312, the application logic 314, and/or another logic may be notified prior to, during, and/or after the size of the external memory allocation and/or the region 214 is changed (such as by the request to resize the region 214 and/or the request to resize an external memory allocation). Alternatively or in addition, one or more data interfaces may be updated. In one example, the size of a block device exposed by the block-level interface may be reduced before reducing the size of a corresponding external memory allocation and/or region 214. In another example, the size of a file exposed by the character-level interface may be increased after increasing the size of the corresponding external memory allocation and/or region 214. In another example, the capacity of a memory-allocation interface may be grown after increasing the size of the corresponding external memory allocation and/or region 214. The memory-allocation data structures and/or other data structures may be updated to correspond to the new capacity.

In examples where reducing the size of the corresponding external memory allocation and/or region 214 would cause in-use portions of the external memory allocation and/or region 214 to be discarded, the client logic 312, the application logic 314, and/or another logic may relocate the data of the in-use portions upon being notified. For example, with a memory-allocation interface, the client logic 312 may allocate one or more different portions of the external memory allocation and/or region 214, may copy the data of the in-use portions to the different portions, and/or may map the different portions to the virtual address space in place of the in-use portions. The client logic 312 may prevent access to in-use portions while copying and/or mapping to preserve data integrity. For example, the client logic 312 may mark the corresponding page table entries as read-only prior to copying and/or mapping. Alternatively or in addition, the client logic 312 may hold one or more lock primitives while allocating, copying, and/or mapping, such as lock primitives protecting changes to page table entries and/or mapping data structures of an operating system. Alternatively or in addition, the client logic 312 may not prevent access to the in-use portions and/or may iteratively copy the in-use portions until all portions have been copied without being modified.

Alternatively or in addition, the client logic 312, the application logic 314, and/or another logic may be notified prior to, during, and/or after discarding data at a location other than the end of the region 214, such as when configuring the communication interface 230 to treat the discarded data as not-present. Alternatively or in addition, one or more data interfaces may be updated. In one example, corresponding portions of a cache (such as a page cache) may be discarded. In another example, where discarding the data would cause in-use portions of the external memory allocation and/or region 214 to be discarded, the client logic 312, the application logic 314, and/or another logic may relocate the data of the in-use portions upon being notified, such as described in this disclosure. Alternatively or in addition, the client logic 312 may cause the discarded portions to become not allocable with the memory-allocation interface. For example, the client logic 312 may allocate the portions being discarded, such as with a balloon allocator, prior to the data being discarded. Alternatively or in addition, the client logic 312 may update the memory-allocation data structures and/or other data structures to indicate that the portions are not present and/or not allocable.

Ownership of, management of, administration of, control of, and/or access to all or part of the external memory allocation and/or the region may be transferred from one client to another. Ownership, management, administration, control, and/or access may be represented by an association in the metadata of the external memory allocation and/or the region with the client, an account on the client, and/or a virtual machine on the client. Ownership, management, administration control, and/or access may be the ability of one or more entities (such as one or more clients 130 and/or logics) to read from, write to, and/or manipulate the external memory allocation and/or the region. A capability to transfer ownership, management, administration, control, and/or access from one client to another may facilitate moving the application logic from one client to another client more efficiently and/or more rapidly. For example, the application logic may include a virtual machine that is to be migrated from a hypervisor running on a first client to a hypervisor running on a second client. When migrating data of the virtual machine, the hypervisors or other component may elect not to migrate data that is stored in the external memory allocation and/or the region. The hypervisors or other component may instead transfer ownership of, management of, administration of, control of, and/or access to all or part of the external memory allocation and/or the region from the first client to the second client. For example, the allocation logic 412 may update the metadata to transfer the ownership, management, administration, control, and/or access. By updating the metadata to transfer ownership, management, administration, control, and/or access, the corresponding data stored in the external memory allocation and/or the region may be effectively migrated from the hypervisor of the first machine to the hypervisor of the second machine without copying the data. In examples where access to the data of the external memory allocation and/or the region 214 is controlled by an encryption key and/or another identifier, the encryption key and/or other identifier may be provided to the second machine. Alternatively, or in addition, if data translation (such as encryption and/or decryption) is being performed for the external memory allocation and/or for the region 214, the encryption key(s), data translation method, and/or other parameters for data translation may be provided to the second machine. Alternatively, or in addition, ownership of, management of, administration of, control of, and/or access to all or part of the external memory allocation and/or the region may be associated with the virtual machine that is being migrated, and the ownership, management, administration, control, and/or access may be transferred implicitly as the virtual machine is migrated. Alternatively, or in addition, prior to migrating the virtual machine, the hypervisor and/or the virtual machine may elect to discard cached copies of data that are otherwise stored in the external memory allocation and/or the region, which may reduce the total amount of data to be migrated with the virtual machine. Ownership of, management of, administration of, control of, and/or access to all or part of the external memory allocation and/or the region may be transferred from one client to another by sending, for example, a request to modify settings for the region to the region access logic of each memory appliance which includes the regions for which ownership, management, administration, control, and/or access is being transferred.

One or more of the hypervisor, the virtual machine, and/or any other component (such as a container, a jail, a zone, the client logic, the application logic, the allocation logic, the region access logic, and/or any other logic) may elect to allocate additional external memory for use by the virtual machine, container, jail, and/or zone using the methods described in this document. For example, the hypervisor or another component may allocate an additional external memory allocation and/or an additional region and assign the additional external memory to the virtual machine, container, jail, and/or zone. Alternatively, or in addition, the virtual machine, container, jail, zone, and/or other component may allocate an additional external memory allocation and/or an additional region for use by the virtual machine, container, jail, and/or zone. Alternatively or in addition, one or more of the hypervisor, the virtual machine, and/or another component may resize an existing external memory allocation and/or region. Allocating additional external memory for use by the virtual machine, container, jail, and/or zone may be done in place of or in addition to allocating additional local memory for use by the virtual machine, container, jail, and/or zone. For example, if not enough local memory is available to satisfy the demand of an application running within the virtual machine, container, jail, and/or zone, additional external memory may be allocated for use by the virtual machine, container, jail, and/or zone in order to satisfy all or part of the demand. Using external memory may avoid a need to otherwise migrate the virtual machine, container, jail, and/or zone to a different client to satisfy the virtual machine's, container's, jail's, and/or zone's demand for memory in cases where not enough local memory is available to allocate for use by the virtual machine, container, jail, and/or zone.

In some embodiments, external memory may be used as an extension to local primary memory provided to one or more virtualization instances. For example, a hypervisor and/or other logic may associate and/or map both local primary memory and external primary memory to the virtualization instance(s). A mechanism may be provided that enables the virtualization instance(s) and/or one or more logics operating with the virtualization instance(s), such as a hypervisor or a guest operating system, to distinguish between the local primary memory and the external primary memory.

Figure 16A:
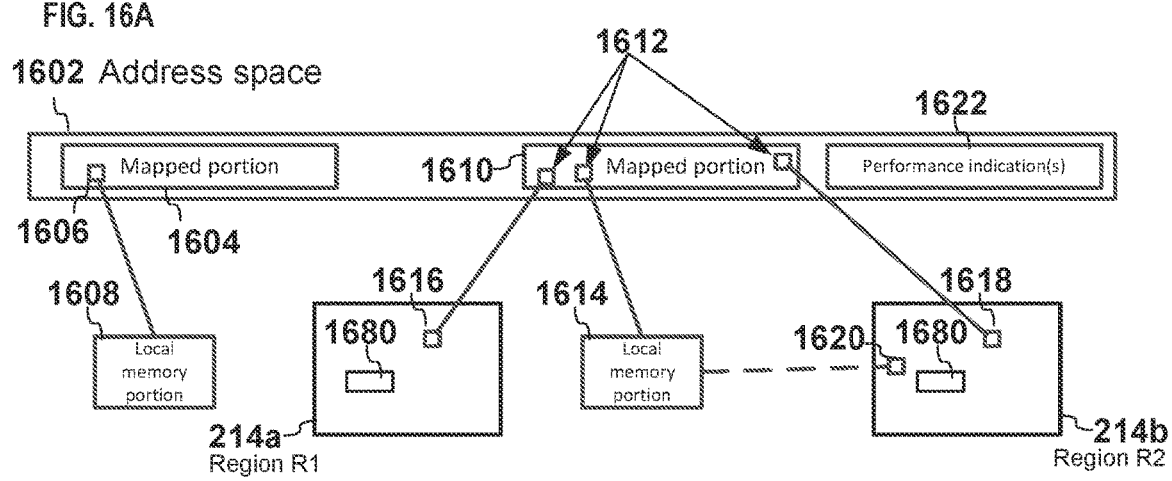
FIG. 16A and FIG. 16B illustrate example mappings and/or associations between address space(s), file data, local primary memory, and/or external primary memory for example systems in which one or more logics operating with the address space(s) may identify performance differences between the mappings and/or associations.
Figure 16B:
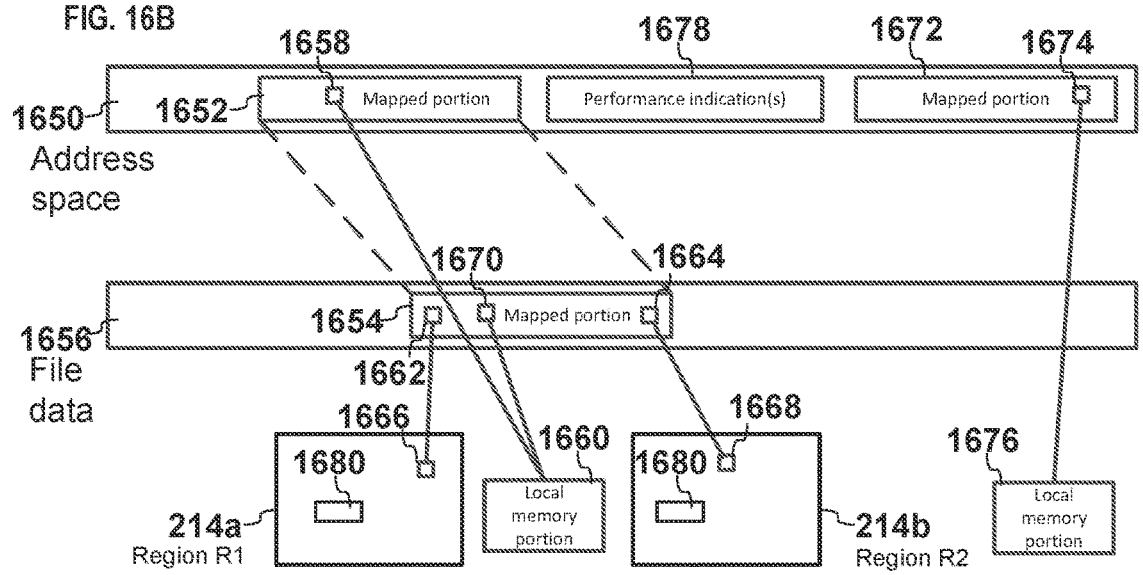

FIG. 16A and FIG. 16B illustrate example mappings and/or associations between address space(s), file data, local primary memory, and/or external primary memory for example systems in which one or more logics operating with the address space(s) may identify performance differences between the mappings and/or associations. As illustrated in FIG. 16A, an address space 1602 may include, associate with, and/or map to a first mapped portion 1604, such as with a mapping of local primary memory. One or more data structures may be updated, modified, and/or replaced to indicate that the portion of the address space 1602 corresponding to the first mapped portion 1604 includes and/or is mapped to local primary memory. As one or more portions 1606 of the address space 1602 for the first mapped portion 1604 are accessed and/or reclaimed, the portion(s) 1606 may become mapped to one or more local memory portions 1608. In some examples, in response to one or more portions 1606 of the address space 1602 for the first mapped portion 1604 being reclaimed, the portions(s) 1606 are unmapped.

Alternatively or in addition, the address space 1602 may include, associate with, and/or map to a second mapped portion 1610. One or more data structures may be updated, modified, and/or replaced to indicate that the portion of the address space 1602 corresponding to the second mapped portion 1610 includes and/or is mapped to external primary memory. As one or more portions 1612 of the address space 1602 for the second mapped portion 1610 are accessed and/or reclaimed, the portion(s) 1612 may become mapped to one or more local memory portions 1614 and/or may become mapped to and/or associated with one or more portions 1616, 1618 of one or more regions 214a, 214b and/or of one or more external memory allocations. In some examples, in response to one or more portions 1612 of the address space 1602 for the second mapped portion 1610 being reclaimed, the portion(s) 1612 may become unmapped. In some examples, one or more portions of local primary memory 1614 may be associated with one or more portions of external primary memory 1620, such as when writing to the portion of external primary memory 1620 (such as prior to reclaiming the portion of local primary memory 1614 with operations such as described for FIG. 13B) and/or when reading from the portion of external primary memory 1620 (such as in response to a page fault and/or other event, such as described for FIG. 13A).

In some examples, one or more of the portion(s) of local primary memory 1614 may hold a cached copy of data of external memory, such as the data of the one or more of the portion(s) of external primary memory 1620. For example, the data may be read from the portion(s) of external primary memory 1620 (such as in response to a page fault and/or other event) and/or the portion(s) of external primary memory 1620 may be freed and/or made available to hold data for other portions of the address space 1602, the mapped portions 1604, 1610, and/or any other data.

Alternatively or in addition, one or more of the portion(s) of local primary memory 1614 may hold data previously held in external memory, such as the data of one or more of the portion(s) of external primary memory 1620. For example, the data may be read from the portion(s) of external primary memory 1620 (such as in response to a page fault and/or other event) and/or the portion(s) of external primary memory 1620 may stay associated with a corresponding portion of the address space 1602, such as the portion 1612 of the address space 1602 that is shown mapped to the local primary memory portion 1614.

As portions 1606, 1612 of the mapped portion(s) 1604, 1610, other portions of the address space 1602, and/or other portions of other address spaces are accessed, the mappings and/or associations illustrated for FIG. 16A may change. For example, other mappings to other portions of local primary memory may be formed using operations similar to those described for FIG. 13A. Alternatively or in addition, mappings to portions of local primary memory may be replaced with associations with external primary memory using operations similar to those described for FIG. 13B.

As illustrated in FIG. 16B, an address space 1650 may include, associate with, and/or map to a third mapped portion 1652, such as with a file-backed memory mapping. The address space 1650 may be the same address space or a different address space as the address space 1602 illustrated in FIG. 16A. The third mapped portion 1652 may be the same as or different than the mapped portion(s) 1604, 1610 illustrated in FIG. 16A. The third mapped portion 1652 may map to a mapped portion 1654 of a file and/or may be included in the file data 1656 for a file.

As portions of the address space 1650 for the third mapped portion 1652 are accessed and/or reclaimed, some portions 1658 of the address space 1650 may become mapped to one or more local memory portions 1660, and/or some portions 1662, 1664 of the file data 1656 may become associated with one or more portions 1666, 1668 of one or more regions 214a, 214b and/or of one or more external memory allocations. For example, a portion 1658 of the third mapped portion 1652 in the address space 1650 may map to a local memory portion 1660. A reference and/or address to the local memory portion 1660 may be stored in a page table entry corresponding to the portion 1658 of the third mapped portion 1652 in the address space 1650. Alternatively, or in addition, a portion 1670 of the mapped portion 1654 in the file data 1656 may map to the local memory portion 1660. For example, a reference to the local memory portion 1660 may be stored in the file data 1656 and/or in a data structure related to the file and/or file data 1656, such as the data structure associating portions of a corresponding file with portions of external primary memory and/or with some other backing store.

Alternatively or in addition, the address space 1650 may include, associate with, and/or map to a fourth mapped portion 1672, such as with a mapping of local primary memory. One or more data structures may be updated, modified, and/or replaced to indicate that the portion of the address space 1650 corresponding to the fourth mapped portion 1672 includes and/or is mapped to local primary memory. As one or more portions 1674 of the address space 1650 for the fourth mapped portion 1672 are accessed and/or reclaimed, the portion(s) 1674 may become mapped to one or more local memory portions 1676.

As portions 1658, 1674 of the mapped portion(s) 1652, 1672, other portions of the address space 1650, and/or other portions of other address spaces are accessed, the mappings and/or associations illustrated for FIG. 16B may change. For example, other mappings to other portions of local primary memory may be formed using operations similar to those described for FIG. 13A. Alternatively or in addition, mappings to portions of local primary memory may be replaced with associations with external primary memory using operations similar to those described for FIG. 13B.

The one or more logics operating with the address space(s) 1602, 1650 may include a virtualization instance and/or a virtualization logic. For example, the one or more logics may include a virtual machine, a hypervisor, a container, a jail, a zone, a cloud computing interface, and/or any other logic which may access the address space(s) 1602, 1650 and/or any portions of the address space(s) 1602, 1650.

In some examples, one or more of the address spaces 1602, 1650 may be a virtual address space. Alternatively or in addition, one or more of the address spaces 1602, 1650 may be a physical address space, such as a guest physical address space of a virtualization instance. In some examples, the address space(s) 1602, 1650 may appear to the virtualization instance to be a physical address space, but also may be or instead may be a virtual address space of the client 130. The address space(s) 1602, 1650 may provide a means of addressing the memory mapped to and/or associated with it. For example, the address space(s) 1602, 1650 may allow access to the local primary memory portions 1608, 1614, 1660, 1676 mapped to the address space(s) 1602, 1650 by directly addressing them with the processor 340 of the client 130 and/or may allow access to the external primary memory portions 1616, 1618, 1666, 1668 using operations similar to those described for FIG. 13A and/or using client-side memory access.

In some examples, all of or a portion 1680 of the external primary memory may not be in any address space 1602, 1650 addressable by the processor 340 of the client 130. For example, the external primary memory may be and/or may include all of or a portion of the memory 210 of one or more memory appliances 110, such as all of or a portion of the region 214. In examples such as these, the external primary memory may be addressable by the processor 240 (if present) and/or by the communication interface 230 of the memory appliance 110, but may require special handling to access the data of the external primary memory from outside of the memory appliance 110, such as from the client 130, the client logic 312, and/or another logic. An example of the special handling may be operations similar to those described for FIG. 13A and/or client-side memory access, as described elsewhere in this disclosure. In contrast, local primary memory and/or memory that is in an address space addressable by the processor 340 of the client 130 may be accessible by performing standard read/write processor operations, cache-fill operations, and/or other standard memory-access operations, such as by accessing the memory 310 via the memory controller 320 of the client 130. In some examples, memory that is in an address space addressable by a processor may be accessible without incurring a page fault, without invoking a page-fault handling logic (such as with an operating system), and/or without the use of a memory-management unit capable of presenting a virtual address space. In some examples where memory is an address space accessible by a processor, the address space accessible by the processor may be a physical address space.

In some examples, an address space, such as the address space 1602 of FIG. 16A and/or the address space 1650 of FIG. 16B, may include, associate with, and/or map to one or more performance indications 1622, 1678. The performance indications 1622, 1678 may also be referred to as performance indication data structures or performance indicators. In these examples, the performance indication(s) 1622, 1678 may be and/or may be included in one or more portions of the address space 1602, 1650 that provide access to one or more data structures providing and/or indicating performance information regarding one or more portions of the address space 1602, 1652, such as the first mapped portion 1604, the second mapped portion 1610, the third mapped portion 1652, the fourth mapped portion 1672, and/or any other portion of the address space 1602, 1650 that is accessible by the application logic 314 and/or by another logic operating with the address space 1620, 1650. For example, the performance indication(s) 1622, 1678 may be and/or may include ACPI System Resource Affinity Table (SRAT) information, ACPI Static Resource Affinity Table (SRAT) information, ACPI System Locality Distance Information Table (SLIT) information, ACPI Heterogeneous Memory Attribute Table (HMAT) information, ACPI Heterogeneous Memory Attributes (HMA), and/or any other data structures that may indicate one or more relative and/or absolute performance attributes of the local primary memory, the external primary memory, the mappings 1604, 1610, 1652, 1672, and/or of any other portion of memory accessible via the address space 1602, 1650 and/or by the application logic 314 and/or another logic operating with the address space 1602, 1650.

The performance attribute(s) may be any one or more attributes, characteristics, properties, and/or aspects of the corresponding memory/memories, mapping(s), memory controller(s), interconnect(s), and/or any other component, subsystem, system, and/or architectural element related to memory access performance. Examples of performance attributes may include latency, bandwidth, operations per second, determinacy, jitter, and/or any other measurable and/or unmeasurable quantity/quality related to performance. The performance attributes may be absolute (for example, "30 GiB/s"), and/or may be relative (for example, "low jitter" relative to a reference measurement of jitter).

While not shown explicitly in FIG. 16A and/or FIG. 16B, the performance indications 1622, 1678 may be mapped to local primary memory, to external primary memory, and/or to a file, such as with the mapped portions 1604, 1610, 1652, 1672. Similarly, as the performance indications 1622, 1678 are accessed, the mappings and/or associations for the performance indications 1622, 1678 may change, such as described for the mapped portions 1604, 1610, 1652, 1672. Alternatively or in addition, the performance indications 1622, 1678 may be stored in local primary memory, external primary memory, a file, and/or any other memory.

The performance indication(s) 1622, 1678 may indicate that two or more of the mapped portion(s) 1604, 1610, 1652, 1672 are associated with different architectural elements, such as architectural elements of a virtualization instance operating with the address space 1602, 1650. The architectural element may be a memory structure that represents a physical device, a virtual device, and/or a grouping of physical and/or virtual devices. For example, the performance indication(s) 1602, 1650 may indicate that the local primary memory (and/or a mapping for it) is associated with a first virtualization instance architectural element and the external primary memory (and/or a mapping for it) is associated with a second virtualization instance architectural element. In some examples, one or more of the different architectural elements may be and/or may include Non-Uniform Memory Access (NUMA) nodes of the virtualization instance and/or may be represented as NUMA nodes to the virtualization instance. In other examples, one or more of the different architectural elements may be and/or may include proximity domains (such as ACPI Proximity Domains) of the virtualization instance and/or may be represented as proximity domains to the virtualization instance. In other examples, one or more of the different architectural elements may be and/or may include memory proximity domains (such as ACPI Memory Proximity Domains) of the virtualization instance and/or may be represented as memory proximity domains to the virtualization instance. In other examples, one or more of the different architectural elements may be and/or may include the client 130, the memory appliance, 110, and/or any components thereof, such as all of or a portion of the processor 240, 340, the memory 210, 310, the memory controller 220, 320, and/or the communications interface 230, 330. The association(s) and/or representation(s) may be achieved by describing the architectural elements with the performance indication(s) 1602, 1650, such as by describing the architectural elements with the ACPI System Resource Affinity Table (SRAT) information, ACPI Static Resource Affinity Table (SRAT) information, ACPI System Locality Distance Information Table (SLIT) information, ACPI Heterogeneous Memory Attribute Table (HMAT) information, ACPI Heterogeneous Memory Attributes (HMA), ACPI Memory Proximity Domain Attributes Structure information, and/or other data structures capable of describing the association(s) and/or representation(s).

Figure 21:
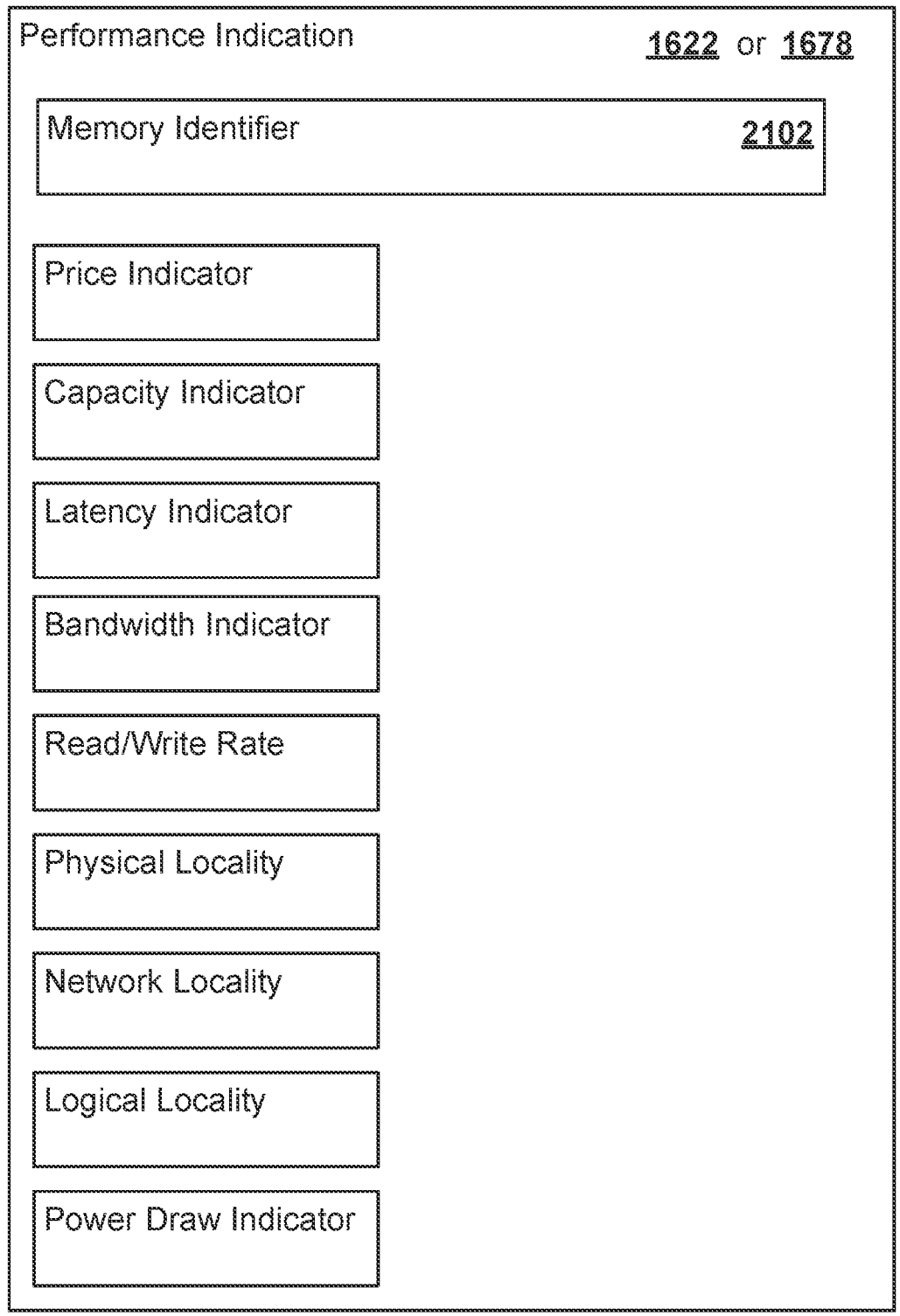
FIG. 21 illustrates a schematic diagram of an example of a performance indication data structure.

The performance indication(s) 1622, 1678 may indicate one or more relative and/or absolute performance attributes and/or any other attributes of the local primary memory, the external primary memory, the mappings 1604, 1610, and/or any other component related to the performance of memory accesses. Examples of the performance indication(s) 1622, 1678 may include an indicator of any of the following (or any combination thereof): price, capacity, latency, bandwidth, operations per second, physical locality, network locality, logical locality, power draw, and/or any other one or more attributes of the memory 210, 310, of the client 130 containing the memory 310, of the memory appliance 110 containing the memory 210, of the communication interface(s) 230, 330 used to access the memory 210, of the interconnect(s) 140, of the memory controller(s) 220, 320 used to access the memory 210, 310, of one or more caches that may hold data of the memory 210, 310, of one or more architectural elements, of one or more virtualization instance architectural elements, and/or of any other one or more physical and/or logical components that may affect the performance of memory-access operations and/or that may be useful in determining which memory to use for different purposes. An example of the performance indication structure 1622 or 1678 is illustrated in FIG. 21. The performance indication(s) 1622, 1678 may include or be associated with a memory identifier 2102. The memory identifier 2102 may be any identifier that identifies the memory, the virtualization instance architectural element containing the memory, the memory appliance 110 containing the memory, the communication interface(s) 230, 330 handling communication with the memory, the interconnect(s) 140 connecting to the memory, the memory controller(s) 220, 320 for the memory, and/or any other logical element or physical component having the property or properties included in the performance indication 1622, 1678. In other examples, the performance indication 1622 or 1678 may include additional or fewer attributes than illustrated, such as only a single attribute. Alternatively or in addition, the performance indication(s) 1622, 1678 may indicate one or more relative distances and/or latencies between virtualization instance architectural elements, such as with an ACPI System Locality Distance Information Table (SLIT). Alternatively or in addition, the performance indication(s) 1622, 1678 may include one or more indicator(s) of any of the following, or any combination thereof: read/write latency and/or bandwidth metrics between virtualization instance architectural elements and/or memories, such as with an ACPI System Locality Latency and Bandwidth Information Structure. In one such example, the memory 210 of the memory appliance 110 may include a first memory and a second memory, where the second memory of the memory appliance 110 differs from the first memory in price, capacity, latency, bandwidth, operations per second, physical locality, network locality, logical locality, interconnect, power draw, and/or any other one or more attributes, such as by being memory of a different type, media, style, package, clock rate, architecture, and/or any other relevant difference. In such an example, the first memory and the second memory be said to be different classes of memory. Alternatively or in addition, the performance indication(s) 1622, 1678 may indicate one or more attributes of one or more caches associated with one or more memories, such as with an ACPI Memory Side Cache Information Structure. The attribute(s) of the cache(s) may include the size of the cache(s), number of cache levels, cache associativity, write policy, cache-line size, latency, bandwidth, performance, and/or any other one or more attributes of the cache(s) that may affect the performance of memory-access operations and/or that may be useful in determining which memory to use for different purposes. In examples such as this, the cache(s) may be and/or may include cache memories (such as with a CPU cache), and/or the cache(s) may be and/or may include local primary memory used to hold cached portions of external primary memory.

The client logic 312 and/or another logic may determine a number of virtualization instance architectural elements to present and/or may determine the associations between virtualization instance architectural elements and the mapped portions. In some examples, the mapped portions may be associated with the virtualization instance architectural elements based upon the type of memory mapped (for example, local primary memory versus external primary memory), the performance attributes, grouping and/or architecture of physical architectural elements, and/or any other one or more distinguishing characteristics. For example, a first mapped portion of external primary memory and a second mapped portion of external primary memory may have different performance attributes described for each and/or may be associated with different virtualization instance architectural elements. In examples such as this, the performance indication(s) 1622, 1672 may indicate a performance difference between the mappings and/or between the virtualization instance architectural elements. In other examples, the associations may be based upon physical architectural elements of the client 130, the memory appliance 110, the interconnect(s) 140, and/or any other physical component. For example, mappings to external primary memory of the same memory appliance 110 may be associated with different virtualization instance architectural elements if one or more physical architectural elements differ between the external primary memory that is mapped, between the mappings, and/or between the way that each mapping causes the external primary memory to be accessed. For example, two mappings of external primary memory may use different communications interface(s) 230, 330, interconnect(s) 140, memory controllers 220, and/or any other physical component to access the memory 210, any one or more of which may result in a meaningful performance difference between the two mappings. In another example, the two mappings of external primary memory may be for portions of the memory 210 that are each associated with different physical architectural elements of the memory appliance 110, such as being part of different NUMA nodes of the memory appliance 110. In another example, the two mappings of external primary memory may be for one or more portions of memory included in different memory appliances, such as with one mapped portion being mapped to memory of a first memory appliance and another mapped portion being mapped to memory of a second memory appliance. In examples such as these, the system may include multiple memory appliances 110 of varying performances, physical distance, logical distance, network distance, number of interconnect switch hops, and/or of any other differing performance attributes and/or physical characteristics, wherein the performance indication(s) 1622, 1672 may be used to differentiate between mappings to two or more different memory appliances 110.

In some examples, the performance indication(s) 1622, 1678 may be created, destroyed, modified, and/or updated during operation of the application logic 314 and/or virtualization instance. For example, the performance indication(s) 1622, 1678 may be provided, conveyed, delivered, indicated, and/or identified via a transitory means, such as with a message, a function call, a programmatic method invocation, a programmatic signal, an electrical signal, an optical signal, a wireless signal, and/or any other mechanism used to provide, convey, deliver, indicate, and/or identify information between logics. In some examples, the performance indication(s) may be indicated via one or more ACPI Device Configuration Objects, such as ACPI System Locality Information (_SLI) object(s), ACPI Proximity (_PXM) object(s), ACPI Heterogeneous Memory Attributes (_HMA) object(s), and/or any other data structure and/or mechanism that may describe and/or indicate the performance indication(s) 1622, 1678 and/or one or more portions thereof.

The application logic 314, virtualization instance, one or more logics operating with the virtualization instance, and/or any other logic may operate differently based upon the performance indication(s) 1622, 1678. For example, a logic operating with the virtualization instance may be configured to use memory with faster performance for frequently-accessed data and/or recently-accessed data and/or may be configured to use memory with slower performance for infrequently-accessed data and/or not-recently-accessed data. Alternatively or in addition, the logic operating with the virtualization instance may be configured to use memory with a shorter distance for frequently-accessed data and/or recently-accessed data and/or may be configured to use memory with a longer distance for infrequently-accessed data and/or not-recently-accessed data. Alternatively or in addition, the logic operating with the virtualization instance may be configured to migrate data from one portion of memory to another based upon whether the data is frequently accessed, infrequently accessed, recently accessed, not recently accessed, and/or matches or does not match any other one or/or more access patterns. Alternatively or in addition, the logic operating with the virtualization instance may be configured to migrate data from one portion of memory (a source portion) to another (a destination portion) based upon whether the performance indication(s) indicate that the source portion has faster performance, slower performance, higher bandwidth, lower bandwidth, lower latency, higher latency, a larger cache, a smaller cache, larger capacity, smaller capacity, a shorter distance, a longer distance, more-durable media, less-durable media, higher power draw, lower power draw, and/or any other one or more characteristics relative to the destination portion. For example, the data may be migrated from the portion 1658 of the third mapped portion 1652 to the portion 1674 of the fourth mapped portion 1672 in response to identifying that the data is accessed frequently. The data may be migrated by copying the data from one portion of memory to another, and/or by updating associations between the portions of memory 1658, 1674 and the address space(s) 1602, 1650, the file data 1656, and/or any other data structures that may reference the portion(s) 1658, 1674, such as with NUMA page migration. In some examples, the data may be migrated without copying the data by: reassociating a portion of local primary memory holding the data from one mapped portion to another; converting anonymous memory to file-backed memory as described for FIG. 11; and/or converting file-backed memory to anonymous memory as described in FIG. 12. The logic operating with—or configured to operate with—the virtualization instance may include any logic configured to execute within the virtualization instance. Examples of logic operating with—or configured to operate with—the virtualization instance may include a guest operating system, and/or any virtualization logic, such as a hypervisor.

The term "frequently-accessed" means accessed more frequently than a threshold frequency. The term "infrequently-accessed" means accessed less than a threshold frequency. The threshold for "frequently-accessed" may not necessarily be the same as the threshold for "infrequently-accessed". The term "recently-accessed" means accessed within a predetermined timeframe. Memory with slower performance means memory that may be read and/or written a rate that is slower than another memory available to be allocated such as memory with higher latency, lower bandwidth, lower operations per second, and/or less performant metrics for any other performance attributes. Memory with faster performance means memory that may be read and/or written at a rate that is faster than other memory available to be allocated, such as memory with lower latency, higher bandwidth, higher operations per second, and/or more performant metrics for any other performance attributes. The phrase "shorter distance" in this context means closer to the client device in the context of physical locality, network locality, and/or logical locality than another memory available to be allocated. The phrase "longer distance" in this context means further from the client device in the context of physical locality, network locality, and/or logical locality than another memory available to be allocated. The term "more-durable" in this context means media which is more likely to retain its contents over time, which is more likely to retain its contents after repeated reading and/or writing over time, which is more likely than a threshold probability to retain its data after more repeated read and/or write operations than for other media, and/or which has any other properties and/or attributes associated with improved media durability. In contrast, the term "less-durable" in this context means media which is less likely to retain its contents over time, which is less likely to retain its contents after repeated reading and/or writing over time, which is more likely than a threshold probability to retain its data after fewer repeated read and/or write operations than for other media, and/or which has any other properties and/or attributes associated with reduced media durability. The term "higher power draw" in this context means memory which requires more electric power to operate, more thermal energy to maintain the temperature of the memory within a target operating range, and/or which has any other properties and/or attributes associated with higher power usage at the current time and/or over time. In contrast, the term "lower power draw" in this context means memory which requires less electric power to operate, less thermal energy to maintain the temperature of the memory within the target operating range, and/or which has any other properties and/or attributes associated with lower power usage at the current time and/or over time.

During operation, the mapped portions 1604, 1610, 1652, 1672 and/or the performance indication(s) 1622, 1678 may be added, removed, modified, updated, and/or changed. For example, additional memory may be made available to address space(s) 1602, 1650, and/or excess memory may be removed from the address space(s) 1602, 1650.

In some examples, such as the example illustrated in FIGS. 16A and 16B, a portion 1680 of the external memory is not in any address space addressable by the processor 340 of the client device 130 or at least not mapped to the address space 1602, 1650 of the virtualization instance 362. Alternatively, all of the external memory may be mapped to an address space(s) addressable by the processor 340 of the client device 130.

Figure 17A:
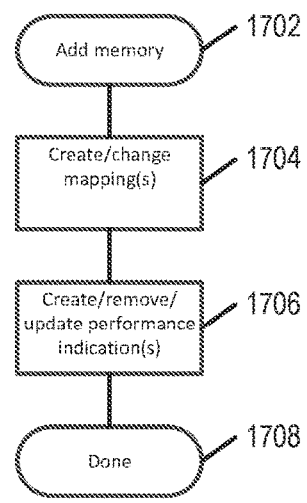
FIG. 17A, FIG. 17B, and FIG. 17C illustrate example flow diagrams for adding, removing, and/or changing the memory available within an address space and/or to an associated logic.
Figure 17B:
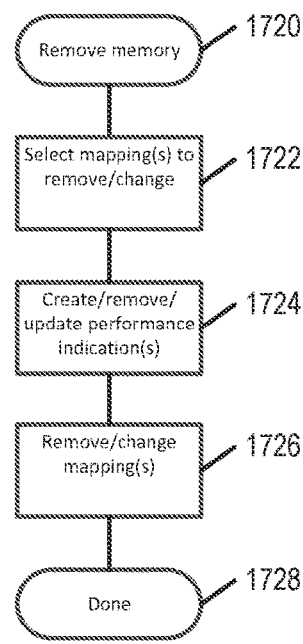
Figure 17C:
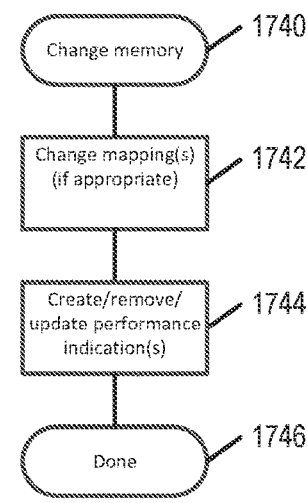

FIG. 17A, FIG. 17B, and FIG. 17C illustrate example flow diagrams for adding, removing, and changing, respectively, the memory available within an address space and/or to an associated logic. One or more of these flow diagrams may be useful for systems which may benefit from adding memory, removing memory, and/or changing the available memory, such as for a virtualization instance. FIG. 17A illustrates an example flow diagram for adding memory for an address space and/or an associated logic. Operations may begin (1702) in response to one or more triggering events and/or conditions, such as a request to add memory. For example, an administrator may request that memory be added. Alternatively or in addition, a logic, such as the allocation logic 412, the client logic 312, and/or the application logic 314, may determine that memory should be added, such as by detecting a low memory condition and/or by any other triggering event(s) and/or condition(s).

Upon starting the operations for adding memory (1702), the client logic 312, application logic 314, and/or another logic may create and/or change one or more mapped portions (1704). In some examples with a triggering event, the portion(s) to change may be specified by the triggering event. Alternatively or in addition, the portion(s) may be selected via some other strategy. For example, with a request to expand an existing mapped portion, the portion to change may be specified by the request. In another example, a hypervisor logic may select a portion to change based upon the portion having adequate available and/or unused address space adjacent to the portion, and/or for any other reason. In other examples, no portion may be specified and/or one or more new portions may be created and/or mapped to the address space(s) 1602, 1650. In some examples, creating and/or changing one or more mapped portions (1704) may include removing one or more existing mapped portions, such as by replacing one or more mapped portions with one or more other mapped portions of larger aggregate capacity.

One or more of the created and/or changed mapped portions may be associated with one or more new and/or existing regions 214 and/or external memory allocations, and/or one or more existing regions and/or external memory allocations may be resized, such as described elsewhere in this disclosure. Alternatively or in addition, one or more of the created and/or changed mapped portions may be associated with local primary memory, such as with the first mapped portion 1604 and/or the fourth mapped portion 1672.

Creating and/or changing one or more mapped portions (1704) may include triggering a memory hot-add logic and/or event with the virtualization instance. Triggering the memory hot-add logic and/or event may cause a logic operating with the virtualization instance to be notified of additional memory being available to the virtualization instance, such as with an ACPI general-purpose event, an ACPI Device Object Notification, an ACPI device status control method (_STA), and/or any one or more mechanisms capable of causing a logic operating with the virtualization instance to be notified of additional memory. In other examples, triggering a memory hot-add logic and/or event may be delayed until a later step, such as while and/or after creating, updating, and/or removing (1706) one or more performance indication(s) 1622, 1678.

Alternatively or in addition, creating and/or changing one or more mapped portions (1704) may include adjusting parameters with a memory ballooning logic, such as to cause a memory ballooning logic operating with the virtualization instance to free and/or release memory to one or more other logics operating with the virtualization instance. The freed and/or released memory may correspond to the created and/or changed mapped portion(s), such as by freeing and/or releasing one or more portions of the address space(s) 1602, 1650 that have been updated for the created and/or changed mapped portion(s). In other examples, adjusting parameters with a memory ballooning logic may be delayed until a later step, such as while and/or after creating, updating, and/or removing (1706) one or more performance indication(s) 1622, 1678.

Upon creating and/or changing one or more mapped portions (1704), the client logic 312, application logic 314, and/or another logic may create, update, and/or remove (1706) one or more performance indication(s) 1622, 1678. For example, if one or more mapped portions were created, one or more performance indication(s) 1622, 1678 may be created and/or updated to describe the created mapped portion(s). Alternatively or in addition, if one or more mapped portions were changed, one or more performance indication(s) 1622, 1678 may be created, updated, and/or removed to described the changed mapped portions. Alternatively or in addition, if one or more mapped portions were removed and/or replaced, one or more performance indications 1622, 1678 may be created, updated, and or removed to described the removed and/or replaced mapped portions. Alternatively or in addition, no performance indication(s) 1622, 1678 may be created, updated, and/or removed, such as if existing performance indication(s) already adequately describe the created and/or changed mapped portions. Upon creating, updating, and/or removing (1706) one or more performance indication(s), the operations for adding memory may be complete (1708).

FIG. 17B illustrates an example flow diagram for removing memory for an address space and/or an associated logic. Operations may begin (1720) in response to one or more triggering events and/or conditions, such as a request to remove memory. For example, an administrator may request that memory be removed and/or a logic, such as the allocation logic 412, the client logic 312, and/or the application logic 314, may determine that memory should be removed, such as by detecting a low memory condition for other address space(s) and/or logic(s), by detecting that existing mapped portions are underutilized, and/or by any other triggering event(s) and/or condition(s).

Upon starting the operations for removing memory (1720), the client logic 312, application logic 314, and/or another logic may select (1722) one or more mapped portions to remove and/or change. The aggregate size of the selected portions may be larger than the amount of memory to be removed and/or a smaller amount may be removed than requested and/or intended, such as if an adequate amount may not be achievable and/or may not be achievable without undesired side effects. For example, if the aggregate size of all mapped portions is less than the requested amount to remove, it may be impossible to fully satisfy the request to remove memory. In another example, if the aggregate size of all mapped portions minus an amount of memory that is currently and/or recently in use is less than the requested amount to remove, it may be impossible and/or undesirable to fully satisfy the request to remove memory. In examples such as these, a lesser amount may be selected and/or the request to remove memory may fail.

The selected portion(s) may be selected using any one or more strategies and/or may optimize for the performance of one or more logic(s) operating with the address space(s) from which the portion(s) are selected, for the performance of one or more other logics not operating with the address space(s), for the adherence to one or more parameters of the request to remove memory, and/or for any other one or more relevant metrics. In one example, the selected portion(s) may include one or more portions identified in the request to remove memory. In another example, the selected portion(s) may include one or more of the least utilized portions of the address space(s) 1602, 1650. In another example, the selected portion(s) may include one or more portion(s) mapped to one or more types of memory (e.g. external primary memory and/or local primary memory) specified in the request to remove memory. In another example, the selected portions may include one or more portion(s) mapped to one or more types of memory which may be needed for operation of one or more other logics. Other examples may include one or more portions selected based on any other criteria, and/or a combination of criteria, such as a combination of these and/or other examples.

Selecting the one or more mapped portions to remove and/or change (1722) may include triggering a memory hot-remove logic and/or event with the virtualization instance. Triggering the memory hot-remove logic and/or event may cause a logic operating with the virtualization instance to be notified of memory being removed from the virtualization instance, such as with an ACPI general-purpose event, an ACPI Device Object Notification, an ACPI Eject Request Device Object Notification, an ACPI Eject control method (EJx), an ACPI device status control method (_STA), and/or any one or more mechanisms capable of causing a logic operating with the virtualization instance to be notified of memory being removed. In other examples, triggering a memory hot-remove logic and/or event may be delayed until a later step, such as while and/or after creating, updating, and/or removing (1724) one or more performance indications 1622, 1678, and/or while and/or after removing and/or changing (1726) one or more mapped portions.

Alternatively or in addition, selecting the one or more mapped portions to remove and/or change (1722) may include adjusting parameters with a memory ballooning logic, such as to cause a memory ballooning logic operating with the virtualization instance to allocate memory within the virtualization instance and/or to release memory to a hypervisor, the client logic 312, the application logic 314, and/or another logic. The allocated and/or released memory may correspond to the selected mapped portion(s), such as one or more portions of the address space(s) 1602, 1650 that would be updated for the selected mapped portion(s). In other examples, adjusting parameters with a memory ballooning logic may be delayed until a later step, such as while and/or after creating, updating, and/or removing (1724) one or more performance indications 1622, 1678, and/or while and/or after removing and/or changing (1726) one or more mapped portions.

Upon selecting the one or more mapped portions to remove and/or change (1722), the client logic 312, application logic 314, and/or another logic may create, update, and/or remove (1724) one or more performance indications 1622, 1678. Creating, updating, and/or removing (1724) one or more performance indications 1622, 1678 may be performed in a similar manner as described for step (1706) for FIG. 17A, and/or may differ in that the mapped portions may be not yet removed and/or changed in this case, but the mapped portions that will be changed may have already been selected (1722). In other examples, the mapped portions may be removed and/or changed (1724) prior to creating, updating, and/or removing (1724) one or more performance indications 1622, 1678.

Upon (and/or prior to) creating, updating, and/or removing (1724) one or more performance indication(s), the client logic 312, application logic 314, and/or another logic may remove and/or change (1726) one or more mapped portions. The one or more mapped portions removed and/or changed may include the mapped portions that may have been previously selected, and/or may include other portions not previously selected. In examples where removing and/or changing (1726) one or more mapped portions precedes creating, updating, and/or removing (1706) one or more performance indications(s), the one or more mapped portions may be selected (1722) as part of removing and/or changing (1726) the one or more mapped portions.

Upon completion of previously described operations (1722), (1724), and/or (1726) for removing memory for an address space and/or an associated logic, the operations may be complete (1728).

FIG. 17C illustrates an example flow diagram for changing memory for an address space and/or an associated logic. Operations may begin (1740) in response to one or more triggering events and/or conditions, such as a request to change memory. For example, an administrator may request that memory be added, removed, and/or changed and/or a logic, such as the allocation logic 412, the client logic 312, and/or the application logic 314, may determine that memory should be added, removed, and/or changed, such as by detecting a low memory condition, by detecting that existing mapped portions are underutilized, by detecting one or more changes in attributes and/or characteristics of one or more physical components, by detecting behaviors and/or access patterns of one or more logics operating with the address space(s) 1602, 1650 and/or of any other logics, and/or by any other triggering event(s) and/or condition(s). For example, a logic, such as the allocation logic 412, the client logic 312, and/or the application logic 314, may detect that the latency, bandwidth, and/or any other performance metric of one or more memories has changed and/or may determine to change the performance indication(s) 1622, 1678 to reflect current conditions. In another example, a logic, such as the allocation logic 412, the client logic 312, and/or the application logic 314, may detect that one or more logics operating with the address space(s) 1612, 1650 are frequently accessing a different percentage versus expectations of one or more portions mapped to external primary memory and/or may determine to change the amount of local primary memory available to cache the mapped portion(s).

Upon starting the operations for changing memory (1740), the client logic 312, application logic 314, and/or another logic may change one or more mapped portions (1742), if appropriate for the desired and/or requested change. For example, the logic(s) may grow/shrink the mapped portion, replace the mapped portion(s) with other mapped portion(s), change all or part of the mapped portion(s) from being mapped to local primary memory to being mapped to external primary memory, change all or part of the mapped portion(s) from being mapped to external primary memory to being mapped to local primary memory, change the amount of local primary memory available to cache external primary memory for the mapped portion(s), change which region(s) 214 and/or external memory allocation(s) are mapped to the mapped portion(s), change the memory affinity of the mapped portion(s), change the NUMA node affinity of the mapped portion(s), change the virtualization instance architectural element association of the mapped portion, and/or perform any other one or more changes related to the mapped portion(s).

In some examples, an amount of local primary memory mapped to the address space(s) 1602, 1650 and/or an amount of local primary memory used to cache data in external primary memory may be increased and/or decreased. For example, the amount of local primary memory mapped to the address space(s) 1602, 1650 and/or the amount of local primary memory used to cache data in the external primary memory mapped to the address space(s) 1602, 1650 may be determined based upon memory access behavior of the logic(s) operating with the virtualization instance. In one example, if a relatively large percentage of the mapped portion 1610 is frequently accessed, the amount of local primary memory 1614 used to cache data in the external primary memory mapped to the mapped portion 1610 may be increased. For example, if more than a threshold amount (for example, a threshold percentage or a threshold ratio) of the mapped portion 1610 is accessed more frequently than a threshold frequency, then the amount of local primary memory 1614 used to cache data in the external primary memory mapped to the mapped portion 1610 may be increased. Alternatively or in addition, all of or a portion of the mapped portion may be converted from being mapped to external primary memory to being mapped to local primary memory, such as by converting file-backed memory to anonymous memory, such as described for FIG. 12. In examples such as these, the third mapped portion 1652 of FIG. 16B may be considered a file-backed portion, and/or the fourth mapped portion 1672 of FIG. 16B may be considered an anonymous memory portion, and/or operations to convert file-backed memory to anonymous memory may be able to convert a mapped portion similar to the third mapped portion 1652 to another mapped portion similar to the fourth mapped portion 1672.

In some example systems, such as those in which swap memory is used to hold data previously held in local primary memory and/or in anonymous memory, the system may be configured to preferentially reclaim some portion of memory over others. In some examples, the system may be configured to preferentially reclaim memory from file-backed memory mappings over anonyms memory mappings (or vice versa). In other examples, the system may be configured to preferentially reclaim memory from mapped portions associated with external memory over mapped portions that are only and/or primarily associated with local primary memory (or vice versa). In some examples, preferential reclaiming may be achieved by increasing and/or decreasing the amount (and/or a target value for the amount) of local primary memory mapped to the address space(s) 1602, 1650 and/or an amount of local primary memory used to cache data in external primary memory. For examples, the amount of local primary memory used to hold one or more cached copies of data of the external primary memory may be reduced in response to a low memory condition at the client 130 and/or the amount of local primary memory backing mapped portions of local primary memory may not be reduced and/or may be reduced by a lesser extent than the amount of local primary memory used to hold the one or more cached copies of data of the external primary memory. In other words, rather than allowing the mapping of local primary memory to be swapped-out to swap memory, a likelihood that the data of the external primary memory mapping will be written-back to the external primary memory is increased, and a likelihood that the local primary memory used to hold cached copies will be reclaimed is increased.

Changing the one or more mapped portions (1742) may include triggering a memory hot-add logic and/or event with the virtualization instance, may include triggering a memory hot-remove logic and/or event with the virtualization instance, and/or may include may include adjusting parameters with a memory ballooning logic, such as described elsewhere in this disclosure. Alternatively, one or more of these activities may be delayed to a later step, such as while and/or after creating, updating, and/or removing one or more performance indications (1744).

Upon optionally changing the one or more mapped portions (1742), the client logic 312, application logic 314, and/or another logic may create, update, and/or remove (1744) one or more performance indications 1622, 1678. Creating, updating, and/or removing (1744) one or more performance indications 1622, 1678 may be performed in a similar manner as described for step (1706) for FIG. 17A and/or as described for step (1724) for FIG. 17B. Alternatively or in addition, creating, updating, and/or removing (1744) the one or more performance indications may include updating one or more indications of the one or more relative and/or absolute performance attributes and/or any other attributes of the local primary memory, the external primary memory, the mappings 1604, 1610, and/or any other component related to the performance of memory accesses. For example, if a change has been identified in the performance of the interconnect 140 and/or communications interface(s) 230, 330 between the client 130 and the memory appliance 110 that includes the region 214 associated with a mapped portion, then the client logic 312, application logic 314, and/or another logic may update one or more distances, latencies, bandwidths, and/or other relevant performance attributes indicated by the performance indication(s) 1622, 1678. Alternatively or in addition, creating, updating, and/or removing (1744) the one or more performance indications may include changing information describing one or more associations between the mapped portion(s), one or more architectural elements, one or more virtualization instance architectural elements, and/or one or more proximity domains. For example, if the client logic 312, application logic 314, and/or another logic determines to use one or more alternate paths through the interconnect(s) 140 and/or one or more alternate communications interfaces 230, 330 between the client 130 and the memory appliance 110, then the client logic 312, application logic 314, and/or other logic may update information describing one or more associations affected by the change, such as by associating the mapped portion(s) with a different virtualization instance architectural element.

Upon creating, updating, and/or removing (1744) the one or more performance indications, the operations may be complete (1746).

Figure 18:
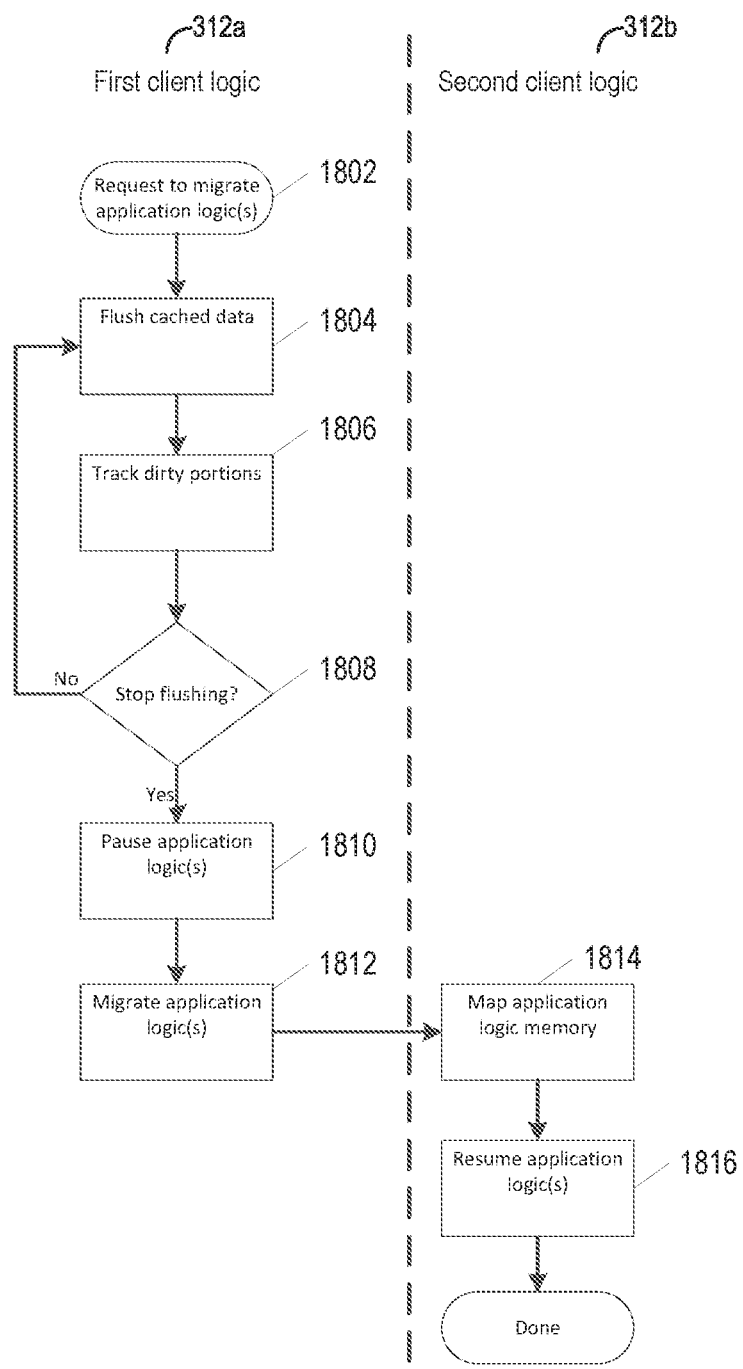
FIG. 18 illustrates an example flowchart for migrating an application logic from a first client to a second client.

FIG. 18 illustrates an example flowchart for migrating an application logic from a first client to a second client. One or more application logics 314 may allocate external memory, as described herein, while operating on a first client and subsequently be migrated to a second client.

In one example, the one or more application logics 314 being migrated may include a container, a jail, and/or a zone and/or may be included in a container, a jail, and/or a zone. In another example, the one or more application logics 314 may include a virtual machine and/or may be included in a virtual machine. In another example, the one or more application logics 314 may include applications executing with an operating system.

The client logic 312 of the first client 130 (a first client logic 312a) may receive a request to migrate one or more application logics 314 (1802). In response to the request, the first client logic 312a may flush cached data (1804) for portions allocated by the application logic(s) 314 to the region 214 and/or to the external memory allocation X1, X2, X3 (1804). Flushing cached data (1804) may include flushing dirty data from the memory 310 of the client 130. Alternatively or in addition, flushing cached data (1804) may include discarding cached copies of data that are otherwise stored in the external memory allocation X1, X2, X3 and/or the region 214. Alternatively or in addition, discarding cached copies of data may be performed later, such as when migrating the application logic(s) (1812). Alternatively or in addition, if the memory of the application logic(s) 314 is backed by a file and/or secondary storage, the first client logic 312a may flush the cached data to the file and/or secondary storage (1804). The first client logic 312a may track which portions of the memory have been written after flushing (1806).

Flushing the cached data (1804) may be performed one or more times. For example, the first client logic 312a may iteratively flush the cached data (1804) and/or may track (1806) which portions have been re-dirtied while flushing. The first client logic 312a may iterate until some end point is reached (1808), such as: if none of the data is dirty after an iteration, if more data is dirty after performing an iteration than before starting the iteration, if a maximum number of iterations has been performed, etc. After the end point is reached, the application logic(s) 314 may be paused (1810) and/or migrated (1812) to the second client.

The application logic(s) 314 may be migrated (1812) using currently known or later discovered techniques for migrating application logic(s) 314 between physical machines. For example, the application logic(s) 314 may be migrated by shutting down and restarting at the second client, by using Checkpoint-Restore in Userspace (CRIU), by using LXD Live Migration, etc. In examples where the memory-allocation data structures include a reference to the first client and/or to a process identifier within the first client, migrating the application logic(s) 314 (1812) may include updating the memory-allocation data structures and/or other data structures to reference the second client and/or a process identifier within the second client. Alternatively, the memory-allocation data structures and/or other data structures may not be updated, such as if the process identifier will be the same after migrating.

Migrating the application logic(s) 314 (1812) may include copying the memory of the application logic(s) 314 from the first client to the second client. Copying the memory may be performed between when the application logic(s) 314 are paused on the first client (1810) and when resumed on the second client (1816), such as when migrating the application logic(s) (1812). Alternatively or in addition, copying the memory may be performed prior to pausing the application logic(s) 314 (1810), such as with a pre-copy. Copying the memory prior to pausing the application logic(s) 314 (1810) may be performed one or more times. For example, the first client logic 312a may iteratively copy the memory and/or may track which portions have been written to while copying. The pre-copy may be repeated until some end point is reached, such as: if none of the data has been written during a pre-copy iteration, if more data remains to be copied after performing a pre-copy iteration than before starting the iteration, if a maximum number of iterations has been performed, etc. Alternatively or in addition, copying the memory may be performed after the application logic(s) 314 are resumed on the second client (1816), such as with a post-copy. With a post-copy, portions of the memory may be copied on-demand, such as during a page fault. Alternatively or in addition, ownership, management, administration, control, and/or access to the memory of the application logic 314 may be transferred from the first client to the second client, such as described elsewhere in this disclosure. Some or all of the memory of the application logic(s) 314 may not be copied, such as if the memory of the application logic(s) 314 is stored in external memory and/or is accessible from the second client. For example, the client logic 312 may discard cached copies of data that are otherwise stored in the external memory allocation and/or the region. Discarding cached copies of data may reduce the total amount of data to be migrated with the application logic(s) 314.

Information about external memory allocated by the application logic(s) 314 may be accessed by the client logic 312 of the second client (a second client logic 312b) from the memory-allocation data structures and/or may be used to map the corresponding portions of the region 214 and/or of the external memory allocation X1, X2, X3 to the virtual address space of the application logic(s) 314 at the second client (1814). Upon mapping the portions to the application logic(s) 314 at the second client, the application logic(s) 314 may be resumed (1816).

Figure 19:
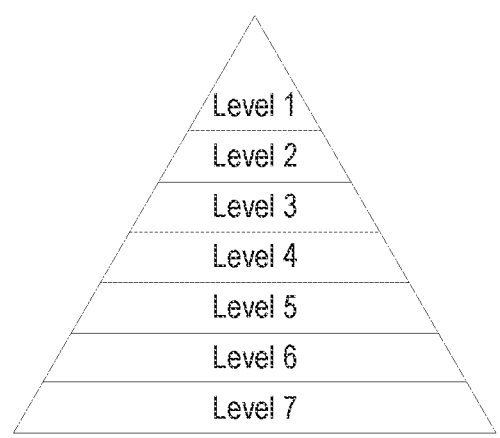
FIG. 19 illustrates a memory architecture diagram of an example system providing multiple tiers of memory.

FIG. 19 illustrates a memory architecture diagram of an example system providing multiple tiers of memory. The system may provide one or more tiers of memory. A tier may be a collection of memory with a common set of attributes, such as price, capacity, latency, bandwidth, operations per second, physical locality, network locality, logical locality, and/or any other attributes of the memory and/or of the device containing the memory. The attributes of a tier involving memory of a memory appliance may include any of the characteristics and/or configurations of the memory appliance 110.

The attributes of one tier may differ from those of another tier. In one example, price and performance may decrease for lower tiers while capacity increases. This may enable the system to naturally demote data from higher levels to lower levels as other data proves to be used more often and/or more recently.

In at least one example, the highest-level tiers may be provided by the hardware of the client 130. For example, level 1 may be provided by the L1 cache of the processor of the client 130, level 2 may be provided by the L2 cache of the processor of the client 130, level 3 may be provided by the L3 cache of the processor of the client 130, level 4 may be provided by the memory 310 of the client 130, and/or another level may be provided by the backing store 360 of the client 130.

In at least one example, one or more tiers may be provided by one or more memory appliances. For example: level 5 may be provided by one or more memory appliances with very low latency and/or high bandwidth; level 6 may be provided by one or more memory appliances with higher latency, lower bandwidth, and/or higher capacity; level 7 may be provided by the backing store of one or more memory appliances and/or of the client.

A logic, such as the client logic 312 and/or the region access logic 212 may cause data for one or more portions of the region 214 to be migrated to lower-numbered tiers by causing the data of the portions to be faulted-in at the desired level. In one example, the client logic 312 may attempt to read the data, causing the data to be loaded into the memory of the client 312 and/or into one or more levels of processor cache of the client. Alternatively, or in addition, the client logic 312 may pre-fetch the data, such as by issuing a pre-fetch request with an operating system of the client. The pre-fetch request may be a memory advisory request, indicating that the client logic will need the data. In another example, the client logic 312 may send a pre-fetch request to the region access logic 212. Such as described in FIG. 10A of "PAGING OF EXTERNAL MEMORY", which published as US Patent App Publication 2016/0077761, and which is hereby incorporated by reference, the pre-fetch request may cause the data to be loaded into the memory 210 of the memory appliance 110. In another example, the client logic 312 may send a pin request to the region access logic 212. Such as described for FIG. 10B of "PAGING OF EXTERNAL MEMORY", the pin request may cause the data to be loaded into the memory 210 of the memory appliance 110.

Alternatively, or in addition, a logic, such as the client logic 312 and/or the region access logic 212 may cause the data for one or more portions of the region 214 to be migrated away from lower-numbered tiers by unpinning the corresponding portions of memory and/or by causing the portions to be invalidated and/or reclaimed at the desired level. Causing the portions to be invalidated and/or reclaimed at the desired level may be as described elsewhere in this document. Alternatively, or in addition, the client logic 312 may send an unpin request to the region access logic 212. Such as described for FIG. 10O of "PAGING OF EXTERNAL MEMORY", the unpin request may cause the data to be unpinned from the memory of the memory appliance 110. Alternatively, or in addition, the client logic 312 may send a reclaim request to the region access logic. Such as described for FIG. 10D of "PAGING OF EXTERNAL MEMORY", the reclaim request may cause the portions to be invalidated and/or reclaimed from the memory of the memory appliance 110.

Alternatively, or in addition, the operating system of the client and/or of the memory appliance 110 may cause the data for one or more portions of the region 214 to be migrated away from lower-numbered tiers by causing the portions to be invalidated and/or reclaimed.

The client 130, the memory appliance 110, and the management server 120 may be configured in any number of ways. In one example, the memory appliance 110 may be included in a computer. For example, the processor may be the CPU of the computer, the memory may be the memory of the computer, and the computer may include the communication interface 330. Alternatively or in addition, the memory appliance 110 may be a peripheral of a computer, including but not limited to a PCI device, a PCI-X device, a PCIe device, an HTX (HyperTransport eXpansion) device, or any other type of peripheral, internally or externally connected to a computer.

In a second example, the memory appliance 110 may be added to a computer or another type of computing device that accesses data in the memory appliance 110. For example, the memory appliance 110 may be a device installed in a computer, where the client 130 is a process executed by a CPU of the computer. The memory in the memory appliance 110 may be different than the memory accessed by the CPU of the computer. The processor in the memory appliance 110 may be different than the CPU of the computer.

In a third example, the memory appliance 110, the client 130, and/or the management server 120, may be implemented using a Non-Uniform Memory Architecture (NUMA). In NUMA, the processor may comprise multiple processor cores connected together via a switched fabric of point-to-point links. The memory controller may include multiple memory controllers. Each one of the memory controllers may be electrically coupled to a corresponding one or more of the processor cores. Alternatively, multiple memory controllers may be electrically coupled to each of the processor cores. Each one of the multiple memory controllers may service a different portion of the memory than the other memory controllers.

In a fourth example, the processor of the memory appliance 110, the client 130, and/or the management server 120 may include multiple processors that are electrically coupled to the interconnect, such as with a bus. Other components of the memory appliance 110, the client 130, and/or the management server 1202, such as multiple memories included in the memory, the communication interface, the memory controller, and the storage controller may also be electrically coupled to the interconnect.

In a fifth example, the external memory system may include multiple memory appliances, multiple regions, multiple region metadatas, multiple management servers, multiple external memory allocation metadatas, multiple allocation logics, multiple client logics, and/or multiple application logics.

In a sixth example, the client 130 may provide additional services to other systems and/or devices. For example, the client 130 may include a Network Attached Storage (NAS) appliance. Alternatively or in addition, the client 130 may include a Redundant Array of Independent Disks (RAID) head. Alternatively or in addition, the client 130 may provide file-level access to data stored in the memory appliance 110. Alternatively, or in addition, the client 130 may include a database, such as an in-memory database.

In a seventh example, multiple clients may utilize one or more memory appliances as shared memory. For example, the clients may include or interoperate with an application logic that relies on massive parallelization and/or sharing of large data sets. Examples of application logic that may use massive parallelization include logic that performs protein folding, genetic algorithms, seismic analysis, or any other computationally intensive algorithm and/or iterative calculations where each result is based on a prior result. The application logic 314 may store application data, application state, and/or checkpoint data in the regions of the one or more memory appliances and/or in an external memory allocation. The additional capabilities of the one or more memory appliances, such as low latency access and persistence to the backing store, may be exploited by the clients in order to protect against application crashes, a loss of power to the clients, or any other erroneous or unexpected event on any of clients. The clients may access the one or more memory appliances in a way that provides for atomic access. For example, the client-side memory access operations requested by the clients may include atomic operations, including but not limited to a fetch and add operation, a compare and swap operation, or any other atomic operation now known or later discovered. An atomic operation may be a combination of operations that execute as a group or that do not execute at all. The result of performing the combination of operations may be as if no operations other than the combination of operations executed between the first and last operations of the combination of operations. Thus, the clients may safely access the one or more memory appliances without causing data corruption.

The application logic 314, the client logic 312, the allocation logic 412, the observer logic 218, and/or the region access logic 212 may be co-located, separated, or combined. The actions performed by combined logic may perform the same or similar feature as the aggregate of the features performed by the logics that are combined. In a first example, all five logics may be co-located in a single device. In a second example, the region access logic 212 and the observer logic 218 may be combined into a single logic. In a third example, the client logic 312 and the observer logic 218 may be combined into a single logic. In a fourth example, the client logic 312 and the region access logic 212 may be combined. In a fifth example, the observer logic 218 may be in a device different from the memory appliance 110, such as the management server 120 and/or a metadata server. A metadata server may be one or more hardware and/or software entities that may participate in the processing of operations, but may not directly handle the data stored in the memory appliance 110. The metadata server may track statistics, coordinate persistence, coordinate data duplication, and/or perform any other activity related to the memory access operations. In a sixth example, the region access logic 212 and the allocation logic 412 may be combined into a single logic. In a seventh example, the client logic 312 and the allocation logic 412 may be combined into a single logic. In an eight example, the client logic 312 and the application logic 314 may be combined into a single logic. Other combinations of the various components are possible, just a few of which are described here.

The application logic 314, the client logic 312, the allocation logic 412, the observer logic 218, and/or the region access logic 212 may include computer code. The computer code may include instructions executable with the processor. The computer code may be written in any computer language now known or later discovered, such as C, C++, C#, Java, or any combination thereof. In one example, the computer code may be firmware. Alternatively or in addition, all or a portion of the application logic 314, the client logic 312, the allocation logic 412, the observer logic 218, the region access logic 212 and/or the processor may be implemented as a circuit. For example, the circuit may include an FPGA (Field Programmable Gate Array) configured to perform the features of the application logic 314, the client logic 312, the allocation logic 412, the observer logic 218, and/or the region access logic 212. Alternatively, or in addition, the circuit may include an ASIC (Application Specific Integrated Circuit) configured to perform the features of the application logic 314, the client logic 312, the allocation logic 412, the observer logic 218, and/or the region access logic 212. The circuit may be embedded in a chipset, a processor, and/or any other hardware device.

Alternatively, or in addition, a portion of the application logic 312, the client logic 312, the allocation logic 412, the observer logic 218, and/or the region access logic 212 and the processor may be implemented as part of the one or more communication interfaces or other hardware component. For example, the one or more communication interfaces or other hardware component may modify a portion of the memory when a write operation is performed. The observer logic 218 may periodically check the portion of memory and may take further action based on the contents of the portion and the region associated with the portion. The further action may include determining statistics related to the operations that are being and/or were performed, identifying portions that are being and/or have been written to and/or read from, persisting the contents of the portions to the backing store 260, duplicating the contents of the portions to a different region, a different memory appliance, an external server, and/or a backup device, and/or taking any other action related to the operations.

A method may be provided for allocating memory in response to a memory allocation request, the method comprising: selecting whether to allocate local primary memory or external primary memory based on a determination of available memory, wherein a portion of local primary memory is used to hold a cached copy of data in the external primary memory.

Alternatively or in addition, method may be provided for allocating memory in response to a memory allocation request, the method comprising: selecting whether to allocate anonymous memory or file-backed memory, based on a determination of available local primary memory or available file space, wherein a portion of local primary memory is used to hold a cached copy of data of the file.

In some examples, an allocated portion is converted from anonymous memory to file-backed memory by copying the data to a new portion of local primary memory associated with the file. Alternatively or in addition, an allocated portion is converted from anonymous memory to file-backed memory without copying data of the allocated portion by associating the allocated portion with the file.

Alternatively or in addition, the data is read from swap backing store before associating the allocated portion with the file. Alternatively or in addition, an allocated portion is converted from file-backed memory to anonymous memory by copying the data to a second portion of local primary memory not associated with the file. Alternatively or in addition, an allocated portion is converted from file-backed memory to anonymous memory without copying data of the allocated portion by dis-associating the allocated portion from the file and updating one or more page table entries to reference the allocated portion. Alternatively or in addition, the determination is controllable by setting a configurable parameter indicating how much local primary memory or external primary memory to use. Alternatively or in addition, the determination is controllable by a usage indicator, which may be set as a configurable parameter indicating how memory will be used. (For example, class of usage such as: application, streaming, random access, etc.)

A method may be provided comprising: allocating a region of external primary memory in a memory appliance; allocating a portion of local primary memory; mapping an address within an address space to the portion of local primary memory, allocating, at a client device, a portion of external primary memory from the region of external primary memory; and reclaiming the portion of local primary memory by copying data from the portion of local primary memory to the portion of external primary memory and associating the address within the address space with the portion of external primary memory, wherein the data in the portion of the external primary memory is accessible via client-side memory access in which a communication interface of the memory appliance is configured to access the portion of external primary memory on the memory appliance. In some examples, the portion of external primary memory is not in an address space addressable by a processor of the client device.

In some examples, allocating the portion of external primary memory is included in reclaiming the portion of local primary memory. Alternatively or in addition, the region of external primary memory or the memory appliance is associated with the address space or with an application logic associated with the address space. Alternatively or in addition, the application logic is a virtualization instance. Alternatively or in addition, the application logic is a virtual machine, a container, a jail, or a zone. Alternatively or in addition, the region of external primary memory is provisioned to an entity associated with the address space. Alternatively or in addition, the portion of local primary memory is a portion of anonymous memory. Alternatively or in addition, the portion of local primary memory is a portion of a memory-mapped file. Alternatively or in addition, the region of external primary memory or the memory appliance is associated with the memory-mapped file. Alternatively or in addition, associating the address within the address space with the portion of external primary memory includes updating a page table data structure or a data structure that tracks one or more portions of memory that correspond to one or more portions of a file.

Alternatively or in addition, associating the address within the address space with the portion of external primary memory includes storing an identifier for the portion of external primary memory in a data structure. In some examples, the identifier indicates one or more regions of external primary memory or one or more memory appliances that contain the portion of external primary memory. Alternatively or in addition, the data structure is a first data structure, and wherein the identifier is usable with a second data structure to identify one or more regions of external primary memory or one or more memory appliances that contain the portion of external primary memory. Alternatively or in addition, the second data structure is a distributed hash table. Alternatively or in addition, the data is encrypted prior to or while writing to the portion of external primary memory.

In some examples, the portion of external primary memory is a first portion of external primary memory, the method further comprising: selecting a second portion of external primary memory; and copying data from the first portion of external primary memory or from the portion of local primary memory to the second portion of external primary memory. In some examples, the first portion of external primary memory and the second portion of external primary memory are included in different memory appliances.

In some examples, the method further comprises associating the address within the address space with the second portion of external primary memory. Alternatively or in addition, the client device is a first client device, wherein the portion of local primary memory is a first portion of local primary memory for the first client device, and further comprising: migrating an application logic from the first client device to a second client device; copying the data from the portion of external primary memory to a second portion of local primary memory for the second client device; an accessing the second portion of local primary memory by the application logic while operating with the second client device.

In some examples, the application logic is a virtualization instance. Alternatively or in addition, the application logic is a virtual machine, a container, a jail, or a zone. Alternatively or in addition, an offset of the portion of external primary memory and the address within the address space are not in a linear relationship relative to other portions of external primary memory and other addresses within the address space.

Alternatively or in addition, the portion of external primary memory is not in an address space addressable by a processor of the client device. Alternatively or in addition, the portion of external primary memory is not addressable by a processor of the client device. Alternatively or in addition, the portion of external primary memory is not addressable by a processor of the client device via a load instruction or a store instruction of the processor's instruction set.

In some examples, the portion of local primary memory is a first portion of local primary memory, and the method further comprises: allocating, in response to a memory access operation, a second portion of local primary memory; copying data from the portion of external primary memory to the second portion of local primary memory; and mapping the address within the address space to the second portion of local primary memory.

Figure 20:
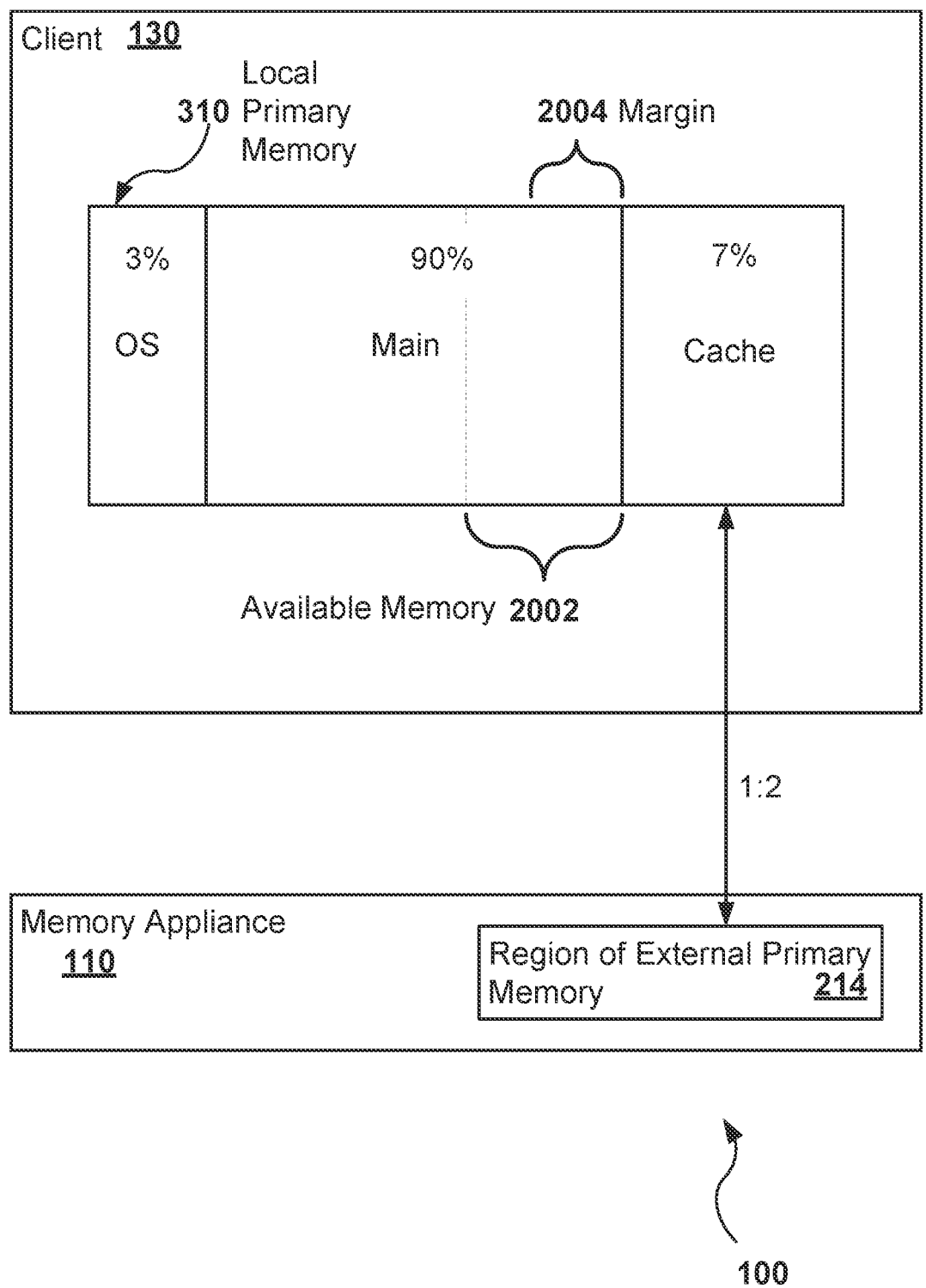
FIG. 20 illustrates a schematic diagram of an example of the system in which a type of memory to allocate is selected from a group of memory types based on an available memory determination.

FIG. 20 illustrates a schematic diagram of an example of the system 100 in which a type of memory to allocate is selected from a group of memory types (310, 214) based on an available memory determination 2002. In the illustrated example, a planned division of the local primary memory 310 is to provide 3% of local primary memory to an operating system, 90% of the local primary memory to applications (designated "main" in FIG. 20), and 7% to a cache for the region 214 of external primary memory. Of course, the particular divisions of the local primary memory 310 and the corresponding percentages planned may be different in other examples.

The ratio of the size of the cache to the size of the region 214 of external primary memory in the illustrated example is 1:2. The ratio may be different in other examples. This means that the size of the region 214 is twice the size of the cache. For example, the client device 130 may include 128 gigabytes of local primary memory 310. In such an example, 7% of the 128 gigabytes is to be reserved for the cache, so the size of the region 214 of external primary memory would be 18 gigabytes (7%×128 gigabytes×2).

With 7% of the 128 gigabytes reserved for the cache, that leaves 93% of the 128 gigabytes to the operating system and applications, which is 119 gigabytes. In this example, the size of the address space in the client 130 is (1) the amount of the local primary memory 310 reserved for the operating system and application, plus (2) the size of the region 214 of external memory (which is 119 gigabytes plus 18 gigabytes, or a total of 137 gigabytes).

In response to a memory allocation request, such as an invocation of malloc( ), the system 100 selects a type of memory to allocate from a group of memory types based on an available memory determination 2002. In this example, the available memory determination 2002 is the amount of unallocated local primary memory 310. If the available memory 2002 is greater than a margin 2004, then the selected type of memory is local primary memory. Alternatively, if the available memory 2002 is less than or equal to the margin 2004, then the selected type of memory is external primary memory.

An advantage of the system 100 shown in FIG. 20 may be that local primary memory will be allocated before external primary memory, resulting in potentially a better performing system. Another advantage may be that even if the client device 130 allocates more memory than is available in local primary memory, swapping may be avoided so long as the total amount of allocated memory remains within (1) the amount of the local primary memory 310 reserved for the operating system and application, plus (2) the size of the region 214 of external memory (which is 119 gigabytes plus 18 gigabytes, or a total of 137 gigabytes). Another potential advantage of the system 100 may be that only the 18 gigabytes of external memory are needed to make 137 gigabytes available at the client device 130.

In some examples, a method is provided comprising allocating a portion of memory by: selecting a type of memory to allocate in a client device from a group of memory types in response to a memory allocation request and/or in response to a request to access a portion of an address space addressable by a processor of the client device, wherein the selection of the type of memory to allocate is based on an available memory determination, wherein the group of memory types includes a local primary memory, wherein the group of memory types further includes an external primary memory and/or a memory-mapped file, wherein the external primary memory is memory that is located in a memory appliance external to the client device but is treated as primary memory at the client device; selecting a portion of the local primary memory, a portion of the external primary memory, and/or a portion of the memory-mapped file for the portion of memory to allocate at the client device depending on the selected type of memory; and mapping at least the selected portion to the address space.

The type of memory to allocate may be selected from the group of memory types including the local primary memory and the external primary memory, and wherein data in the external primary memory is accessible via client-side memory access in which a communication interface of the memory appliance is configured to access the data in memory of the memory appliance.

Alternatively or in addition, the type of memory to allocate may be selected from the group of memory types including the local primary memory and the memory-mapped file.

Alternatively or in addition, the type of memory to allocate may be selected in response to a memory allocation request, which includes an invocation of an operating system programmatic procedure configured to allocate memory for a caller of the operating system programmatic procedure.

Alternatively or in addition, the available memory determination may include a determination that an amount of allocated local primary memory is less than a limit and, therefore, the local primary memory is selected as the type of memory to allocate.

Alternatively or in addition, the available memory determination may include a determination that an amount of local primary memory used to cache the external primary memory and/or to cache the memory-mapped file is within a limit and, wherein the external primary memory and/or memory-mapped file is selected as the type of memory to allocate.

Alternatively or in addition, the available memory determination may include a determination that a ratio of an amount of allocated local primary memory to an amount of local primary memory used to cache the external primary memory and/or to cache the memory-mapped file is within a limit and, therefore, the local primary memory is selected as the type of memory to allocate.

Alternatively or in addition, the type of memory to allocate may be selected from the group of memory types including the local primary memory and the memory-mapped file, wherein the available memory determination includes a determination of available local primary memory and/or available file space in the memory-mapped file.

Alternatively or in addition, the allocated portion of memory may be converted from the local primary memory to the memory-mapped file by copying data in the selected portion of the local primary memory to a second portion of local primary memory that is associated with the memory-mapped file.

Alternatively or in addition, the allocated portion of memory may be converted from the local primary memory to the memory-mapped file without copying data of the selected portion of the local primary memory by associating the selected portion of the local primary memory with the memory-mapped file. In some examples, data may be read into the selected portion of the local primary memory from a swap backing store before associating the selected portion of the local primary memory with the memory-mapped file.

Alternatively or in addition, the allocated portion of memory may be converted from the memory-mapped file to the local primary memory by copying data from the portion of the memory-mapped file to a second portion of the local primary memory not associated with the memory-mapped file.

Alternatively or in addition, the allocated portion of memory may be converted from the memory-mapped file to the local primary memory without copying data of the allocated portion of memory by dis-associating the allocated portion of memory from the memory-mapped file and updating one or more page table entries to reference the allocated portion of memory.

Alternatively or in addition, the available memory determination is controlled by setting a configurable parameter indicating a limit on a usable amount of the local primary memory and/or the external primary memory.

In some examples, a client device may be provided comprising: a processor; and a local primary memory in communication with the processor, the local primary memory comprising: an application logic unit; and a client logic unit configured to: receive a memory allocation request from the application logic unit to allocate a portion of memory and/or receive a request to access a portion of an address space addressable by the processor; select a type of memory to allocate at the client device from a group of memory types in response to the memory allocation request and/or in response to the request to access the portion of the address space, wherein the selection of the type of memory to allocate is based on an available memory determination, wherein the group of memory types includes the local primary memory, wherein the group of memory types further includes an external primary memory and/or a memory-mapped file, wherein the external primary memory is memory that is located in a memory appliance external to the client device but is treated as primary memory at the client device; select a portion of the local primary memory, a portion of the external primary memory, and/or a portion of the memory-mapped file for the portion of memory to allocate at the client device depending on the selected type of memory; and map at least the selected portion to the address space.

The selection of the type of memory to allocate may be based on the available memory determination and on a configurable parameter indicating a manner in which the allocated portion of memory is to be used.

Alternatively or in addition, the client logic unit may be configured to map the at least the selected portion to the address space before the memory allocation request and/or the request to access the portion of the address space is received.

Alternatively or in addition, the client logic unit may include a swap implementation of an operating system.

Alternatively or in addition, the application logic unit may include a virtual machine, a container, a jail, or a zone.

In still other examples, a computer readable storage medium may be provided comprising computer executable instructions executable by a processor of a client device, the computer executable instructions comprising instructions executable to allocate a portion of memory by: selecting a type of memory to allocate in the client device from a group of memory types in response to a memory allocation request, wherein the selection of the type of memory to allocate is based on an available memory determination, wherein the group of memory types includes a local primary memory and an external primary memory, wherein the external primary memory is memory that is located in a memory appliance external to the client device but is treated as primary memory at the client device, wherein data in the external primary memory is accessible via client-side memory access in which a communication interface of the memory appliance is configured to access the data in memory of the memory appliance; selecting a portion of the local primary memory and/or a portion of the external primary memory for the portion of memory to allocate at the client device depending on the selected type of memory; and mapping at least the selected portion to an address space addressable by the processor.

The system may be implemented in many different ways. Each module or unit, such as the client logic unit, the region access unit, the allocation logic unit, the configuration unit, and/or any other logic described herein may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 210, for example, that comprises instructions executable with the processor 240 or other processor to implement one or more of the features of the module. When any one of the module includes the portion of the memory that comprises instructions executable with the processor, the module may or may not include the processor. In some examples, each module may just be the portion of the memory 210 or other physical memory that comprises instructions executable with the processor 240 or other processor to implement the features of the corresponding module without the module including any other hardware. Because each module includes at least some hardware even when the included hardware comprises software, each module may be interchangeably referred to as a hardware module.

Figure 22:
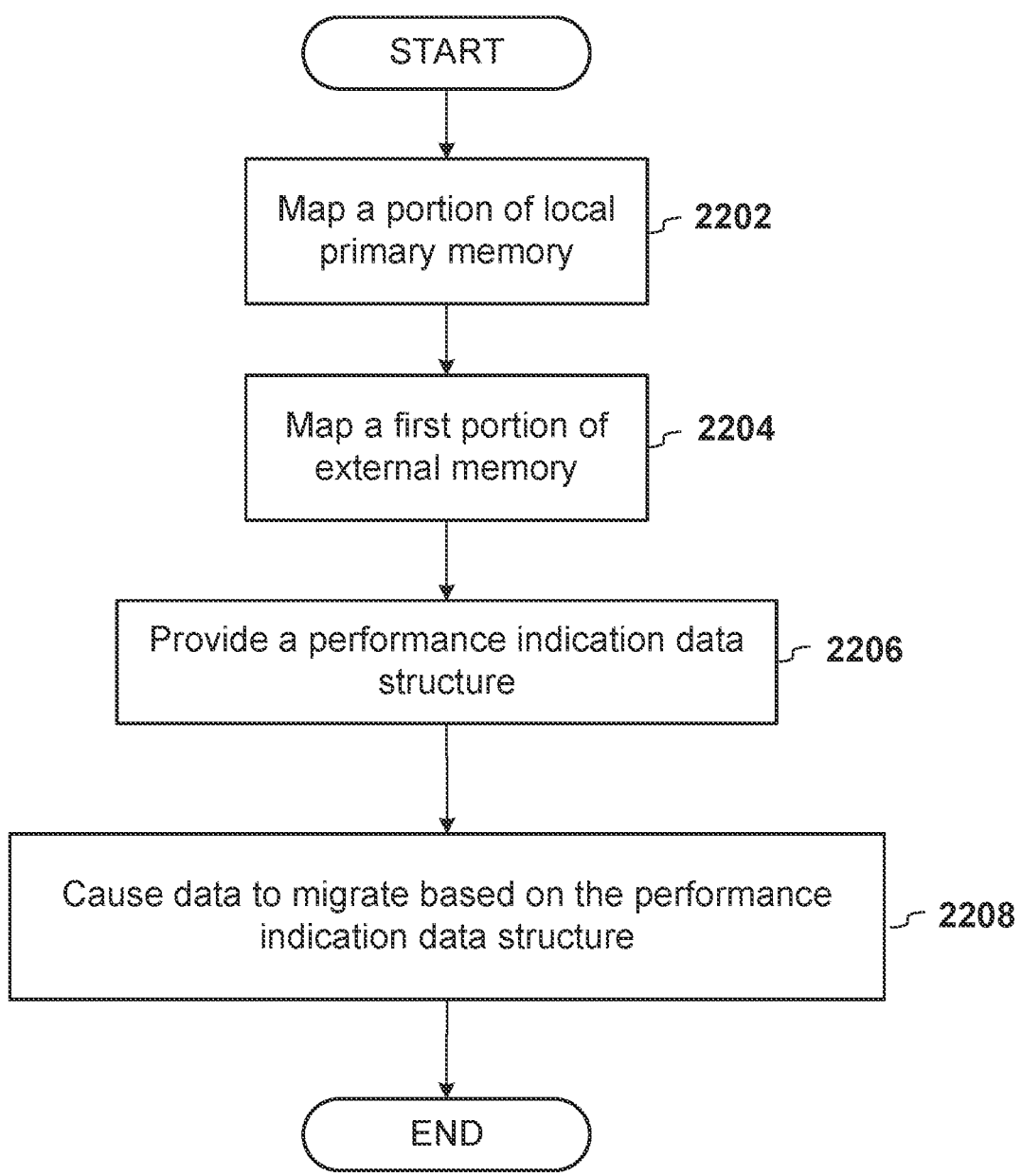
FIG. 22 illustrates a flow diagram of an example of operations to leverage a performance indication data structure.

FIG. 22 illustrates a flow diagram of an example of a method to leverage the performance indication data structure(s) 1622, 1678. The method may include additional, fewer, and/or different operations than shown in FIG. 22. The operations may be performed in a different order than illustrated.

Operations may begin by mapping (2202) the portion 1608, 1676 of a local primary memory to the address space 1602, 1650 of the virtualization instance 362 at the client device 130, wherein the address space 1602, 1650 is addressable by the processor 340 of the client device 130.

Next, a first portion 1618, 1620 of external memory may be mapped (2204) to the address space 1602, 1650, wherein the external memory is memory that is external to the client device 130 but treated as primary memory at the client device 130, and wherein the second portion 1680 of the external memory is not in any address space addressable by the processor 340 of the client device 130 or at least not mapped to the address space 1602, 1650 of the virtualization instance 362.

The performance indication data structure(s) 1622, 1678 may be provided (2206) indicating a performance difference between the portion 1608 of the local primary memory mapped to the address space 1602, 1650 and the first portion 1618, 1620 of external memory mapped to the address space 1602, 1650. For example, the virtualization instance 362 and/or logic configured to operate with the virtualization instance, such as the virtualization logic 364, may have already created the performance indication data structure(s) 1622, 1678. Alternatively or in addition, the performance indication data structure(s) 1622, 1678 may have already been created by some other component. The term "providing" in the sense meant here simply means that the performance indication data structure(s) 1622, 1678 is/are available to the virtualization instance 362 and/or the logic configured to operate with the virtualization instance.

The virtualization instance 362 and/or the logic configured to operate with the virtualization instance, such as the virtualization logic 364, may cause data to migrate (2208) between the external memory and the local primary memory based on the performance indication data structure(s) 1622, 1678. For example, the virtualization instance 362 and/or the logic configured to operate with the virtualization instance may change the mappings to a different type of memory. The virtualization instance 362 and/or the logic configured to operate with the virtualization instance may copy the data from the one type of memory to the other type of memory synchronously and/or asynchronously.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

In some examples, when it is said that an interface is performing some action, the action may be performed by the interface directly, and/or the action may be performed by a logic which provides and/or implements the interface, such as by an interface-implementing logic. The interface-implementing logic may be any logic which provides the interface and/or implements the logic that performs actions described as being performed by the interface. The interface-implementing logic may be and/or may include any of the logics described herein. For example, if the actions described as being performed by one or more data interfaces are performed by the client logic 312, then the interface-implementing logic for the corresponding data interface(s) may be and/or may include the client logic. In examples where the action is performed by the interface, the actions performed may be performed in response to an invocation of the interface. In examples where the action is performed by the interface-implementing logic, the actions performed may be performed in response to an invocation of the corresponding interface.

The respective logic, software or instructions for implementing the processes, methods and/or techniques discussed throughout this disclosure may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code, or any type of other processor, operating alone or in combination. Likewise, processing strategies may include multiprocessing, multitasking, parallel processing and/or any other processing strategy known now or later discovered. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, CPU, GPU, or system.

The logic illustrated in the flow diagrams may include additional, different, or fewer operations than illustrated. The operations illustrated may be performed in an order different than illustrated.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A method comprising:
mapping a portion of a local primary memory to an address space of a virtualization instance at a client device, wherein the address space is addressable by a processor of the client device, and wherein the virtualization instance is executed via the processor of the client device;
mapping a first portion of external memory to the address space, wherein the external memory is memory that is external to the client device but treated as primary memory at the client device, and wherein a second portion of the external memory is not in any address space addressable by the processor of the client device; and
providing a performance indication data structure indicating a performance difference between the portion of the local primary memory mapped to the address space and the first portion of external memory mapped to the address space; and
causing data to migrate between the external memory and the local primary memory based on the performance indication data structure by the virtualization instance, wherein the data is caused to migrate by the virtualization instance and/or a logic configured to operate with the virtualization instance,
wherein the performance indication data structure indicates that the local primary memory is associated with a first virtualization instance architectural element and the external primary memory is associated with a second virtualization instance architectural element.

2. The method of claim 1, further comprising caching data from the first portion of the external memory in a second portion of the local primary memory.

3. The method of claim 1, wherein, in response to the migration of data, a second portion of the local primary memory holds data previously held in the external memory or wherein the second portion of the external memory and/or a third portion of the external memory mapped to the address space holds data previously held in the portion of the local primary memory.

4. The method of claim 1, wherein the virtualization instance and/or the logic configured to operate with the virtualization instance causes the data to be migrated in response to access of the data.

5. The method of claim 1, wherein the data is migrated without copying the data by reassociating the portion of local primary memory holding the data from one mapping to another.

6. The method of claim 1, wherein the external memory is included in a memory appliance and wherein data of the external memory is accessible via client-side memory access in which a communication interface of the memory appliance is configured to access the external memory in the memory appliance.

7. The method of claim 1, wherein one or more mappings to the address space are created, destroyed, modified, and/or updated during operation of the virtualization instance.

8. The method of claim 1, wherein the performance indication data structure is created, destroyed, modified, and/or updated during operation of the virtualization instance.

9. The method of claim 1, wherein the performance indication data structure indicates one or more relative and/or absolute performance attributes of the local primary memory, the external primary memory, and/or one or more mappings to the address space.

10. The method of claim 1, wherein the first virtualization instance architectural element and the second virtualization instance architectural element are Non-Uniform Memory Architecture nodes, ACPI Proximity Domains, and/or ACPI Memory Proximity Domains.

11. The method of claim 1, wherein the performance indication data structure includes ACPI System Resource Affinity Table information, ACPI Static Resource Affinity Table information, ACPI Heterogeneous Memory Attributes, ACPI Heterogeneous Memory Attributes information, and/or ACPI Memory Proximity Domain Attributes Structure information.

12. The method of claim 1, wherein the logic configured to operate with the virtualization instance causes the data to migrate to memory with faster performance for frequently-accessed data and/or recently-accessed data, and/or wherein the logic configured to operate with the virtualization instance causes the data to migrate to memory with slower performance for infrequently-accessed data and/or not-recently-accessed data.

13. The method of claim 1, wherein the logic configured to operate with the virtualization instance causes the data to migrate to memory with a shorter distance for frequently-accessed data and/or recently-accessed data, and/or wherein the logic configured to operate with the virtualization instance causes the data to migrate to memory with a longer distance for infrequently-accessed data and/or not-recently-accessed data.

14. A method, comprising:
mapping a portion of a local primary memory to an address space of a virtualization instance at a client device, wherein the address space is addressable by a processor of the client device, and wherein the virtualization instance is executed via the processor of the client device;
mapping a first portion of external memory to the address space, wherein the external memory is memory that is external to the client device but treated as primary memory at the client device, and wherein a second portion of the external memory is not in any address space addressable by the processor of the client device; and
providing a performance indication data structure indicating a performance difference between the portion of the local primary memory mapped to the address space and the first portion of external memory mapped to the address space; and causing data to migrate between the external memory and the local primary memory based on the performance indication data structure by the virtualization instance, wherein the data is caused to migrate by the virtualization instance and/or a logic configured to operate with the virtualization instance,
wherein the mapping of the first portion of the external memory creates a first mapping of external memory, and wherein the performance indication data structure indicates a performance difference between the first mapping of external memory and a second mapping of external memory.

15. The method of claim 14, wherein the first mapping of external memory maps one or more portions of memory of a first memory appliance and the second mapping of external memory maps one or more portions of memory of a second memory appliance.

16. The method of claim 14, wherein the first mapping of external memory maps one or more portions of a first memory of a memory appliance and the second mapping of external memory maps one or more portions of a second memory of the memory appliance.

17. The method of claim 1, wherein in response to a low memory condition at the client device, an amount of the local primary memory used to hold one or more cached copies of data of the external primary memory is reduced and an amount of the local primary memory backing the mapping of local primary memory is not reduced or is reduced by a lesser extent than the amount of the local primary memory used to hold the one or more cached copies of data of the external primary memory.

18. The method of claim 1, wherein an amount of the local primary memory mapped to the address space and/or an amount of the local primary memory used to cache data in the external primary memory is determined based on memory access behavior of the logic configured to with the virtualization instance.

19. The method of claim 1, wherein the external primary memory is added to the virtualization instance in response to a memory hot-add event.

20. The method of claim 1, wherein the external primary memory is removed from the virtualization instance in response to a memory hot-remove event.

21. The method of claim 1, wherein the local primary memory and/or the external primary memory is added to and/or removed from the virtualization instance using memory ballooning.

22. The method of claim 1, wherein the causing data to migrate between the external memory and the local primary memory is based on the performance indication data structure indicating a source portion having a lower power draw and/or higher power draw than a destination portion.

* * * * *